(12) United States Patent
Hirano

(10) Patent No.: US 11,867,976 B2
(45) Date of Patent: *Jan. 9, 2024

(54) IMAGING LENS

(71) Applicant: TOKYO VISIONARY OPTICS CO., LTD., Tokyo (JP)

(72) Inventor: Hitoshi Hirano, Tokyo (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,966

(22) Filed: Aug. 2, 2021

(65) Prior Publication Data

US 2021/0356702 A1    Nov. 18, 2021

Related U.S. Application Data

(63) Continuation of application No. 16/788,516, filed on Feb. 12, 2020.

(30) Foreign Application Priority Data

Feb. 26, 2019   (JP) ................................. 2019-032943

(51) Int. Cl.
*G02B 9/64*       (2006.01)
*G02B 13/00*      (2006.01)
*G02B 15/14*      (2006.01)

(52) U.S. Cl.
CPC ............. *G02B 9/64* (2013.01); *G02B 13/002* (2013.01); *G02B 13/005* (2013.01); *G02B 15/14* (2013.01)

(58) Field of Classification Search
CPC ...... G02B 9/64; G02B 13/002; G02B 13/005; G02B 15/14
USPC ................................... 359/708, 754
See application file for complete search history.

(56) References Cited

U.S. PATENT DOCUMENTS

| 3,539,246 | A | * | 11/1970 | Kazamaki | ............... | G02B 13/04 |
| | | | | | | 359/740 |
| 2004/0223070 | A1 | * | 11/2004 | Shirasuna | ...... | G02B 15/144113 |
| | | | | | | 348/335 |
| 2007/0229976 | A1 | * | 10/2007 | Kawana | ......... | G02B 15/143507 |
| | | | | | | 359/689 |
| 2009/0219624 | A1 | * | 9/2009 | Yamamoto | ......... | G02B 15/1465 |
| | | | | | | 359/684 |
| 2010/0271601 | A1 | * | 10/2010 | Amano | ................ | G02B 15/177 |
| | | | | | | 359/683 |

(Continued)

FOREIGN PATENT DOCUMENTS

| JP | S62-027712 | 2/1987 |
| JP | S63161422 | 7/1988 |
| JP | H11014905 | 1/1999 |

(Continued)

*Primary Examiner* — James R Greece
(74) *Attorney, Agent, or Firm* — Hamre, Schumann, Mueller & Larson, P.C.

(57) ABSTRACT

An imaging lens includes a first lens having positive refractive power; a second lens having negative refractive power; a third lens having negative refractive power; a fourth lens having negative refractive power; a fifth lens; a sixth lens; a seventh lens; an eighth lens; and a ninth lens having negative refractive power, arranged in this order from an object side to an image plane side. The ninth lens is formed in a shape so that a surface thereof on the image plane side has an aspherical shape having an inflection point.

5 Claims, 30 Drawing Sheets

(56) References Cited

U.S. PATENT DOCUMENTS

2017/0276916 A1\* 9/2017 Inoue ................ G02B 15/1465
2018/0275380 A1 9/2018 Sudoh

FOREIGN PATENT DOCUMENTS

| JP | 2004-333770 | 11/2004 |
| JP | 2006-184430 | 7/2006 |
| JP | 2018-156011 | 10/2018 |

\* cited by examiner

IMAGING LENS

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a portable device, e.g., a cellular phone and a portable information terminal, a digital still camera, a security camera, an onboard camera, and a network camera.

In case of a lens configuration comprised of nine lenses, since the number of lenses that composes the imaging lens is many, it has higher flexibility in designing and can satisfactorily correct aberrations. For example, as the conventional imaging lens having a nine-lens configuration, an imaging lens described in Patent Reference has been known.

Patent Reference: Japanese Patent Application Publication No. 2018-156011

According to the conventional imaging lens of Patent Reference, it is achievable to relatively satisfactorily aberrations. In case of the conventional imaging lens described in the Patent Reference, however, a total track length is long relative to a focal length of the whole lens system, so that it is not suitable to mount in a small-sized camera, such as the one to be built in a smartphone. In case of the conventional imaging lens described in Patent Reference, it is difficult to downsize the imaging lens while more satisfactorily correcting the aberrations.

In view of the above-described problems in the conventional techniques, an object of the present invention is to provide an imaging lens that can attain both a small size and satisfactorily corrected aberrations in a balanced manner.

Further objects and advantages of the present invention will be apparent from the following description of the invention.

SUMMARY OF THE INVENTION

In order to attain the objects described above, according to a first aspect of the present invention, an imaging lens of the invention forms an image of an object on an imaging element. More specifically, the imaging lens of the invention includes a first lens having positive refractive power, a second lens having negative refractive power, a third lens having negative refractive power, a fourth lens having negative refractive power, a fifth lens, a sixth lens, a seventh lens, an eighth lens and a ninth lens having negative refractive power, arranged in the order from an object side to an seventh lens. The ninth lens L9 has an image plane-side surface formed as an aspheric shape having an inflection point.

According to the imaging lens of the invention, four of the nine lenses, which are disposed on the object side, are arranged so that the refractive powers thereof are in the order of "positive-negative-negative-negative" from the object side. When the first lens having positive refractive power is disposed to be the closest to the object side, it is achievable to downsize the imaging lens. In addition, disposing the second lens having negative refractive power on an image plane side of the first lens, it is achievable to satisfactorily correct the chromatic aberration. However, with the downsizing of the imaging lens, the first lens tends to have stronger refractive power. In order to achieve further downsizing of the imaging lens and satisfactory correction of the chromatic aberration, the second lens needs to have stronger refractive power. In the imaging lens of the invention, two lenses having negative refractive power are arranged on the image plane side of the second lens. According to such configuration, the negative refractive power is shared by the three lenses, i.e., the second lens, the third lens and the fourth lens. Since increase of the refractive power of the second lens is restrained, it is suitably achievable to both downsize the imaging lens and satisfactory correct the chromatic aberration. Here, the three lenses, the second lens, the third lens and the fourth lens, have negative refractive powers. Therefore, it is achievable to take wider range of light beams in the imaging lens, and thereby it is possible to achieve wider angle of the imaging lens.

According to the imaging lens of the invention, the ninth lens disposed to be the closest to the image plane side has negative refractive power. Therefore, it is achievable to secure the back focal length, while satisfactorily correcting the field curvature and the distortion at the periphery of an image. In addition, according to the invention, an image plane-side surface of the ninth lens is formed as an aspheric shape having an inflection point. Therefore, it is achievable to satisfactorily correct paraxial aberrations and aberrations at the periphery thereof, while restraining an incident angle of a light beam emitted from the imaging lens to the image plane of an imaging element within the range of chief ray angle (CRA).

Here, in the invention, a "lens" refers to an optical element having refractive power. Accordingly, the "lens" of the invention does not include an optical element such as a prism and a flat plate filter to change a traveling direction of a light beam. Those optical elements may be disposed before or after the imaging lens or between lenses as necessary.

When the whole lens system has a focal length f and a composite focal length of the first lens, the second lens and the third lens is f123, the imaging lens having the above-described configuration preferably satisfies the following conditional expression (1):

$$0 < f123 \quad (1)$$

When the image lens satisfies this conditional expression (1), it is achievable to reduce a ratio of the total track length to the maximum image height of an image plane, and thereby to suitably attain downsizing of the imaging lens.

When a composite focal length of the fourth lens, the fifth lens and the sixth lens is f456, the imaging lens having the above-described configuration preferably satisfies the following conditional expression (2):

$$0 < f456 \quad (2)$$

For downsizing of the imaging lens, it is preferred to dispose a lens(es) having a positive refractive power on the object side. However, when the positive refractive powers of the lens(es) are too strong, it is difficult to correct the aberrations. When the imaging lens satisfies the conditional expression (2), the positive refractive powers are shared among the fourth lens, the fifth lens and the sixth lens. Therefore, it is achievable to suitably restrain generation of the aberrations.

When a composite focal length of the seventh lens, the eighth lens and the ninth lens is f7839, the imaging lens having the above-described configuration preferably satisfies the following conditional expression (3):

$$f789 < 0 \quad (3)$$

When the imaging lens satisfies the conditional expression (3), the composite refractive power of the three lenses disposed close to the image plane is negative. Accordingly, the imaging lens can securely have a telephoto function, and it is suitably achievable to downsize the imaging lens.

When the whole lens system has the focal length f and the first lens has a focal length f1, the imaging lens having the above-described configuration preferably satisfies the following conditional expression (4):

$$0.2 < f1/f < 2.0 \qquad (4)$$

In order to further downsize the imaging lens, the first lens, which is disposed to be the closest to the object side, preferably has strong refractive power. When the positive refractive power of the first lens is too strong, however, it is difficult to correct the aberrations. When the imaging lens satisfies the conditional expression (4), it is achievable to suitably downsize the imaging lens as well as suitably restraining generation of the aberrations including spherical aberration.

The imaging lens having the above-described configuration preferably further satisfy the following conditional expression (4a):

$$0.4 < f1/f < 2.0 \qquad (4a)$$

The imaging lens having the above-described configuration preferably satisfy the following conditional expression (4b):

$$0.4 < f1/f < 1.6 \qquad (4b)$$

According to a second aspect of the invention, when the first lens has a focal length f1 and the second lens has a focal length f2, the imaging lens having the above-described configuration preferably satisfies the following conditional expression (5):

$$-6 < f2/f1 < -1 \qquad (5)$$

When the imaging lens satisfies the conditional expression (5), it is achievable to satisfactorily correct the chromatic aberration and the spherical aberration, while downsizing the imaging lens.

When the whole lens system has a focal length f and a composite focal length of the first lens and the second lens is f12, the imaging lens having the above-described configuration preferably satisfies the following conditional expression (6):

$$0.5 < f12/f < 2.5 \qquad (6)$$

When the imaging lens satisfies the conditional expression (6), it is achievable to satisfactorily correct the spherical aberration, while downsizing the imaging lens.

The imaging lens having the above-described configuration preferably further satisfy the following conditional expression (6a):

$$0.7 < f12/f < 2.1 \qquad (6a)$$

According to the imaging lens having the above-described configuration, the second lens is preferably formed in a shape such that a paraxial curvature radios of a surface thereof on the object-side and a paraxial curvature radius of a surface thereof on the image plane side are both positive, i.e., so as to have a shape of a meniscus lens directing a convex surface thereof to the object side near the optical axis. When the second lens is formed in such a shape, it is achievable to increase the lens aperture diameter of the imaging lens, i.e., decrease the F number. Especially, in case of a configuration having the aperture stop on the object side of the first lens, i.e., so-called "aperture in front" type, such shape of the second lens is effective.

According to the imaging lens having the above-described configuration, the third lens is preferably formed in a shape such that a paraxial curvature radius of an object-side surface thereof and a paraxial curvature radius of an image plane-side surface thereof are both positive, so as to have a shape of a meniscus lens directing a convex surface thereof to an object side near the optical axis. When the third lens is formed in such a shape, it is achievable to suitably increase the diameter of the lens aperture of the imaging lens.

According to a third aspect of the invention, when the second lens has a focal length f2 and the third lens has a focal length f3, the imaging lens having the above-described configuration preferably satisfies the following conditional expression (7):

$$4 < f3/f2 < 12 \qquad (7)$$

When the imaging lens satisfies the conditional expression (7), it is achievable to satisfactorily correct the chromatic aberration. In addition, when the imaging lens satisfies the conditional expression (7), it is achievable to suitably restrain within a satisfactory range so-called "manufacturing error sensitivity", i.e., sensitivity to deterioration of image-forming performance in decentering, tilting, etc., which occurs in manufacturing of the imaging lens.

When the whole lens system has a focal length f and a composite focal length of the second lens and the third lens is f23, the imaging lens having the above-described configuration preferably satisfies the following conditional expression (8):

$$-6.0 < f23/f < -0.5 \qquad (8)$$

When the imaging lens satisfies the conditional expression (8), it is achievable to satisfactorily correct the chromatic aberration, while downsizing the imaging lens.

The imaging lens having the above-described configuration preferably satisfy the following conditional expression (8a):

$$-4 < f23/f < -1 \qquad (8a)$$

When the whole lens system has a focal length f and a composite focal length of the third lens and the fourth lens is f34, the imaging lens having the above-described configuration preferably satisfies the following conditional expression (9):

$$-12 < f34/f < -4 \qquad (9)$$

When the imaging lens satisfies the conditional expression (9), it is achievable to satisfactorily correct the chromatic aberration and the spherical aberration in a balanced manner.

The imaging lens having the above-described configuration preferably further satisfies the following conditional expression (9a):

$$-10 < f34/f < -5 \qquad (9a)$$

When the whole lens system has the focal length f and a distance on an optical axis between the third lens and the fourth lens is D34, the imaging lens having the above-described configuration preferably satisfies the following conditional expression (10):

$$0.03 < D34/f < 0.10 \qquad (10)$$

When the imaging lens satisfies the conditional expression (10), it is achievable to satisfactorily correct the field curvature and the distortion, while securing the back focal length. In addition, it is also achievable to suitably restrain the incident angle of a light beam emitted from the imaging lens to a image plane within the range of CPA.

When the whole lens system has a focal length f and a composite focal length of the fifth lens and the sixth lens is f56, the imaging lens having the above-described configuration preferably satisfies the following conditional expression (11):

$$0.5 < f56/f < 8.0 \tag{11}$$

When the imaging lens satisfies the conditional expression (11), it is achievable to satisfactorily correct the coma aberration and the astigmatism, while downsizing the imaging lens.

The imaging lens having the above-described configuration preferably further satisfy the following conditional expression (11a):

$$1.0 < f56/f < 6.0 \tag{11a}$$

According to the imaging lens having the above-described configuration, the seventh lens is preferably formed in a shape such that a paraxial curvature radius of a surface thereof on the object-side and a paraxial curvature radios of a surface thereof on the image plane side are both positive, or such that those paraxial curvature radii are both negative, i.e., so as to have a shape of a meniscus lens near the optical axis.

When the seventh lens has strong refractive power, it is often difficult to correct the spherical aberration, the field curvature and the distortion. When the seventh lens is formed to have a shape of a meniscus lens near the optical axis, it is achievable to satisfactorily correct the spherical aberration, the field curvature and the distortion.

To form the seventh lens to have a shape of a meniscus lens near the optical axis, when a paraxial curvature radius of an object-side surface of the seventh lens is R7f and a paraxial curvature radius of an image plane-side surface of the seventh lens is R7r, the imaging lens having the above-described configuration preferably satisfies the following conditional expression (12):

$$0.2 < R7f/R7r < 3.0 \tag{12}$$

When the imaging lens satisfies the conditional expression (12), the seventh lens can have a generally flat shape, i.e., a shape close to the one having less sag amount. Therefore, it is achievable to restrain the manufacturing cost of the imaging lens through improving the workability in the production. In addition, when the imaging lens satisfies the conditional expression (12), it is achievable to satisfactorily correct the field curvature and the distortion.

According to the imaging lens having the above-described configuration, the seventh lens is preferably formed in a shape such that a paraxial curvature radius of an object-side surface thereof and a paraxial curvature radius of an image plane-side surface thereof are both negative, so as to have a shape of a meniscus lens directing a concave surface thereof to an object side near the optical axis.

According to the imaging lens having the above-described configuration, the eighth lens is preferably formed in a shape such that a paraxial curvature radius of a surface thereof on the object-side and a paraxial curvature radius of a surface thereof on the image plane side are both positive, or such that those paraxial curvature radii are both negative, i.e., so as to have a shape of a meniscus lens near the optical axis.

To form the eighth lens to have a shape of a meniscus lens near the optical axis, when a paraxial curvature radius of an object-side surface of the eighth lens is R8f and a paraxial curvature radius of an image plane-side surface of the eighth lens is R8r, the imaging lens having the above-described configuration preferably satisfies the following conditional expression (13):

$$0.2 < R8f/R8r < 3.0 \tag{13}$$

When the imaging lens satisfies the conditional expression (13), the eighth lens can have a generally flat shape. Therefore, it is achievable to restrain the manufacturing cost of the imaging lens. In addition, when the imaging lens satisfies the conditional expression (13), it is achievable to satisfactorily correct the field curvature and the distortion.

According to the imaging lens having the above-described configuration, the eighth lens is preferably formed in a shape such that a paraxial curvature radius of an object-side surface thereof and a paraxial curvature radius of an image plane-side surface thereof are both positive, so as to have a shape of a meniscus lens directing a convex surface thereof to an object side near the optical axis. When the eighth lens is formed to have such a shape, it is achievable to satisfactorily correct the spherical aberration, the field curvature and the distortion, while downsizing the imaging lens.

According to the imaging lens having the above-described configuration, the eighth lens is preferably formed in a shape so as to have the both surfaces thereof formed as aspheric shapes having inflection points. In addition, when the object side-side surface and the image plane-side surface of the eighth lens are both formed as aspheric shapes having inflection points, it is achievable to suitably restrain an incident angle of a light beam emitted from the imaging lens to the image plane of an imaging element within the range of CRA.

When a thickness of the seventh lens on the optical axis is T7 and the thickness of the eighth lens on the optical axis is T8, the imaging lens having the above-described configuration preferably satisfies the following Conditional expression (14):

$$0.5 < T8/T7 < 4.0 \tag{14}$$

When the imaging lens satisfies the conditional expression (14), it is achievable to secure the back focal length, while downsizing the imaging lens.

When the whole lens system has the focal length f and a distance on an optical axis between the eighth lens and the ninth lens is D89, the imaging lens having the above-described configuration preferably satisfies the following conditional expression (15):

$$0.02 < D89/f < 0.15 \tag{15}$$

When the size of the imaging lens is made smaller, a lens disposed closer to the image plane in the imaging lens tends to have a larger effective diameter. When a plurality of such lenses having large effective diameters is disposed, typically, interference occurs between lenses and it is difficult to produce and/or assemble the imaging lens because of the too narrow intervals between the lenses. When the imaging lens satisfies the conditional expression (15), it is achievable to secure the back focal length, while suitably securing a distance on the optical axis between the eighth lens and the ninth lens. When the imaging lens satisfies the conditional expression (15), it is also achievable to satisfactorily correct the field curvature, the astigmatism and the distortion in a well-balanced manner, while downsizing the imaging lens.

When the whole lens system has a focal length f and a composite focal length of the eighth lens and the ninth lens is f89, the imaging lens having the above-described configuration preferably satisfies the following conditional expression (16):

$$-5.0 < f89/f < -0.1 \tag{16}$$

When the imaging lens satisfies the conditional expression (16), it is achievable to satisfactorily correct the field curvature and the distortion, while securing the back focal length. In addition, it is also achievable to suitably restrain the incident angle of a light beam emitted from the imaging lens to an image plane within the range of CRA.

According to a fourth aspect of the invention, when the whole lens system has the focal length f and a paraxial curvature radius of an image plane-side surface of the ninth lens is R9r, the imaging lens having the above-described configuration preferably satisfies the following conditional expression (17):

$$0.2 < R9r/f < 0.8 \quad (17)$$

The image plane-side surface of the ninth lens is a surface positioned closest to the image plane side in the imaging lens. Difficulty of correcting the astigmatism, the coma aberration and the distortion varies depending on the magnitude of the refractive power of the image plane-side surface of the ninth lens. When the imaging lens satisfies the conditional expression (17), it is achievable to secure the back focal length, while downsizing the imaging lens. When the imaging lens satisfies the conditional expression (17), it is also achievable to correct the astigmatism, the coma aberration and the distortion in a well-balanced manner.

According to a fifth aspect of the invention, when the whole lens system has the focal length f and the ninth lens has a focal length f9, the imaging lens having the above-described configuration preferably satisfies the following conditional expression (18):

$$-3.5 < f9/f < -0.2 \quad (18)$$

When the imaging lens satisfies the conditional expression (18), it is achievable to satisfactorily correct the field curvature and the distortion, while securing the back focal length. In addition, it is also achievable to suitably restrain the incident angle of a light beam emitted from the imaging lens to a image plane within the range of CRA.

To satisfactorily correct the axial chromatic aberration and the chromatic aberration of magnification, when the first 0.0 lens has Abbe's number vd1 and the second lens has Abbe's number vd2, the imaging lens having the above-described configuration preferably satisfies the following conditional expressions (19) and (20):

$$35 < vd1 < 75 \quad (19)$$

$$15 < vd2 < 35 \quad (20)$$

To satisfactorily correct the chromatic aberration of magnification, when the ninth lens has Abbe's number vd9, the imaging lens having the above-described configuration preferably satisfies the following conditional expression (21):

$$35 < vd9 < 75 \quad (21)$$

When the whole lens system has the focal length f and a distance on the optical axis from an object-side surface of the first lens to the image plane is TL, the imaging lens having the above-described configuration preferably satisfies the following conditional expression (22):

$$1.0 < TL/f < 1.4 \quad (22)$$

When the imaging lens satisfies the conditional expression (22), it is achievable to suitably downsize the imaging lens.

Here, between the imaging lens and the image plane, typically, there is disposed an insert such as an infrared cut-off filter and cover glass. In this specification, for the distance on the optical axis of those inserts, a distance in the air is employed.

In these years, as smartphones, etc. to mount an imaging lens are smaller, an imaging element has a larger size than before. Especially, in case of an imaging lens to be mounted in a thin portable device, such as smartphones, it is necessary to hold the imaging lens within a limited space. Therefore, there is a strict limitation in the total length of the imaging lens in the optical axis relative to a size of the imaging element. When the distance on the optical axis from the object-side surface of the first lens to the image plane is TL and the maximum image height is Hmax, the imaging lens having the above-described configuration preferably satisfies the following conditional expression (23):

$$1.0 < TL/H\,\text{max} < 1.8 \quad (23)$$

When the imaging lens satisfies the conditional expression (23), it is achievable to suitably downsize the imaging lens.

In case that the fifth lens has positive refractive power, when the whole lens system has the focal length f and the fifth lens has a focal length f5, the imaging lens having the above-described configuration preferably satisfies the following conditional expression (24):

$$1 < f5/f < 15 \quad (24)$$

When the imaging lens satisfies the conditional expression (24), it is achievable to satisfactorily correct the coma aberration and the astigmatism, while downsizing the imaging lens.

The imaging lens having the above-described configuration preferably further satisfy the following conditional expression (24a):

$$1 < f5/f < 13 \quad (24a)$$

In case that the sixth lens has positive refractive power, when the whole lens system has the focal length f and the sixth lens has a focal length f6, the imaging lens having the above-described configuration preferably satisfies the following conditional expression (25):

$$1 < f6/f < 10 \quad (25)$$

When the imaging lens satisfies the conditional expression (25), it is achievable to satisfactorily correct the coma aberration and the astigmatism, while downsizing the imaging lens.

The imaging lens having the above-described configuration preferably further satisfy the following conditional expression (25a):

$$1 < f6/f < 8 \quad (25a)$$

According to the invention, the respective lenses from the first lens to the ninth lens are preferably arranged at certain air intervals. When the respective lenses are arranged at certain air intervals, the imaging lens of the invention can have a lens configuration that does not contain any cemented lens. In such lens configuration like this, since it is easy to form all of the nine lenses that compose the imaging lens from plastic materials, it is achievable to suitably restrain the manufacturing cost of the imaging lens.

According to the imaging lens of the invention, it is preferred to form both surfaces of each of the first through the ninth lenses as aspheric shapes. Forming the both surfaces of each lens as aspheric surfaces, it is achievable to more satisfactorily correct aberrations from proximity of the optical axis of the lens to the periphery thereof. Especially, it is achievable to satisfactorily correct aberrations at periphery of the lens(es).

According to the imaging lens having the above-described configuration, the first lens is preferably formed in a shape directing a convex surface thereof to the object side. When the first lens is formed in such a shape, it is achievable to suitably downsize the imaging lens.

According to the imaging lens having the above-described configuration, in the eighth lens and the ninth lens, at least two surfaces thereof are preferably formed as aspheric shapes having inflection points. In addition to the image plane-side surface of the ninth lens, when one or more lens surfaces are further formed as an aspheric shape having an inflection point, it is achievable to more satisfactorily correct aberrations at periphery of an image, while suitably restraining an incident angle of a light beam emitted from the imaging lens to the image plane within the range of CRA.

According to the imaging lens having the above-described configuration, when the imaging lens has an angle of view 2ω, the imaging lens preferably satisfies 65°≤2ω. When the imaging lens satisfies this conditional expression, it is possible to suitably attain a wider angle of the imaging lens, and thereby to suitably attain both downsizing and wider angle of the imaging lens in a balanced manner.

In case of an imaging element with a high pixel count, a light-receiving area of each pixel decreases, so that an image tends to be dark. As a method of correcting such darkness of the image, there is a method of improving light-receiving sensitivity of the imaging element by using an electrical circuit. However, when the light-receiving sensitivity increases, a noise component, which does not directly contribute to formation of an image, is also amplified. Accordingly, in order to obtain fully bright image without such electrical circuit, when the whole lens system has the focal length f and the imaging lens has a diameter of entrance pupil Dep, the imaging lens having the above-described configuration preferably satisfies the following conditional expression (26):

$$f/\text{Dep} < 2.4 \tag{26}$$

Here, according to the present invention, as described above, the shapes of the lenses are specified using positive/negative signs of the paraxial curvature radii thereof. Whether the paraxial curvature radius of the lens is positive or negative is determined based on general definition. More specifically, taking a traveling direction of light as positive, if a center of a paraxial curvature radius is on the image plane side when viewed from a lens surface, the paraxial curvature radius is positive. If a center of a paraxial curvature radius is on the object side, the paraxial curvature radius is negative. Therefore, "an object-side surface having a positive paraxial curvature radius" means the object-side surface has a convex shape. "An object-side surface having a negative paraxial curvature radius" means the object side surface has a concave shape. In addition, "an image plane-side surface having a positive paraxial curvature radius" means the image plane-side surface is a concave surface. "An image plane-side surface having a negative paraxial curvature radius" means the image plane side surface is a convex surface. Here, since a paraxial curvature radius is used herein to specify shapes of the lenses, it may not fit to general shapes of the lenses in their sectional views all the time.

According to the imaging lens of the invention, it is achievable to provide an imaging lens having a small, size, which is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13, 16, 19, 22, 25 and 28 are schematic sectional views of the imaging lenses in Numerical Data Examples 1 to 10 according to the embodiment, respectively. Since the imaging lenses in those Numerical. Data Examples have the same basic configuration, the lens configuration of the embodiment will be described with reference to the sectional view of Numerical Data Example 1.

Figure 1:
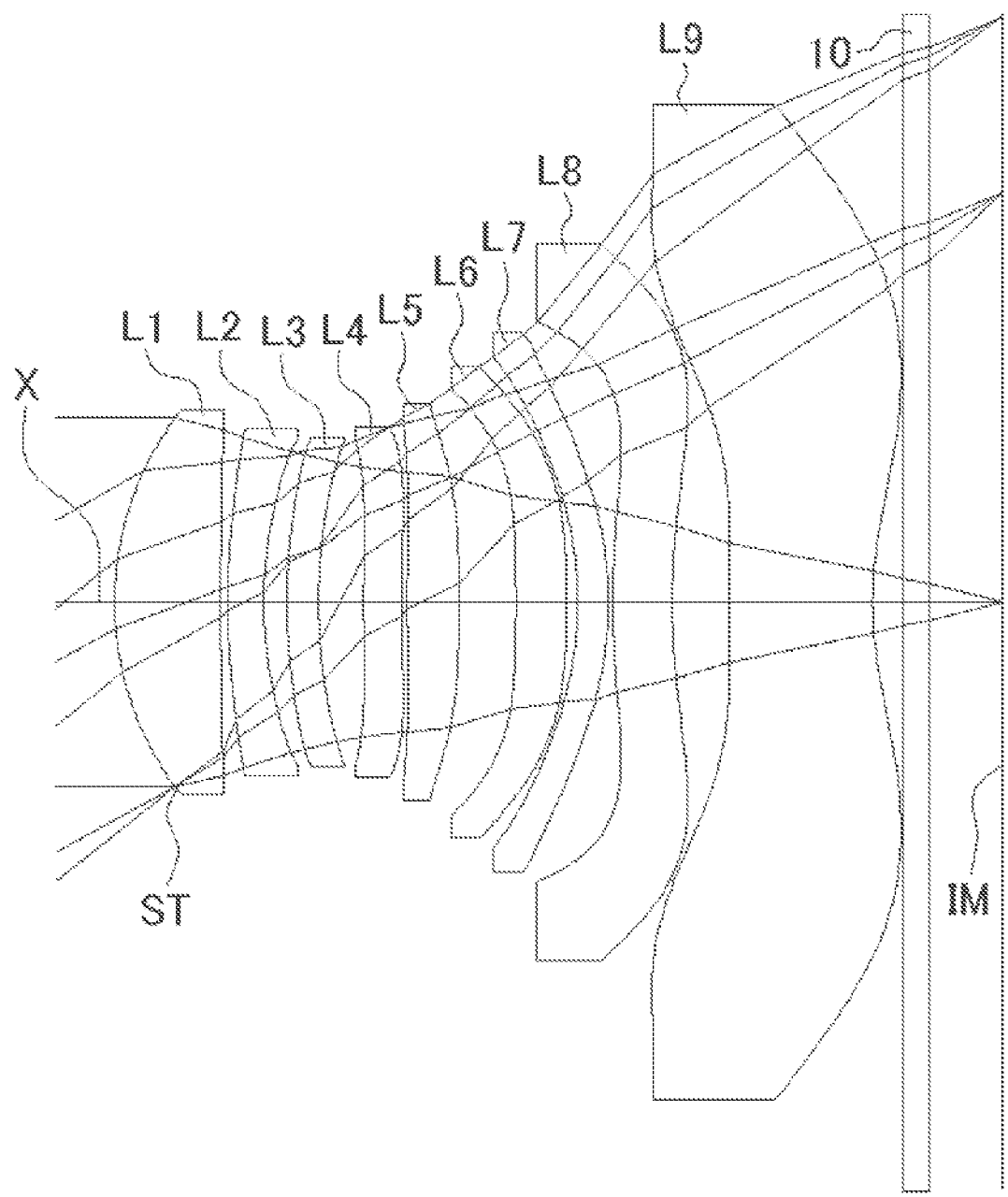
FIG. 1 is a sectional view of a schematic configuration of an imaging lens in Numerical Data Example 1 of the present invention.

As shown in FIG. 1, the imaging lens of the embodiment includes a first lens L1 having positive refractive power; a second lens L2 having negative refractive power; a third lens L3 having negative refractive power; a fourth lens L4 having negative refractive power; a fifth lens L5; a sixth lens L6; a seventh lens L7; an eighth lens L8; and a ninth lens having negative refractive power, arranged in the order from an object side to an image plane side. In addition, between the ninth lens L9 and an image plane IM of an imaging element, there is provided a filter 10. Here, the filter 10 is omissible.

The first lens L1 is formed in a shape such that a paraxial curvature radius r1 of a surface thereof on the object-side and a paraxial curvature radius r2 of a surface thereof on the image plane side are both positive. The first lens L1 has a shape of a meniscus lens directing a convex surface thereof to the object side near the optical axis. The shape of the first lens L1 may not be limited to the one in Numerical Data Example 1. The first lens L1 can be formed in any shape as long as the refractive power thereof is positive. In addition to the shape in Numerical Data Example 1, the first lens L1 can be formed in a shape such that the paraxial curvature radius r1 and the paraxial curvature radius r2 are both negative, or such that the paraxial curvature radius r1 is positive and the paraxial curvature radius r2 is negative. In the former case, the first lens is formed to have a shape of a meniscus lens directing a concave surface thereof to the object side near the optical axis. In the latter case, the first lens is formed to have a shape of a biconvex lens near the optical axis. In view of downsizing the imaging lens, the first lens L1 may be preferably formed in a shape such that the paraxial curvature radius r1 is positive.

According to Numerical Data Example 1, there is provided an aperture stop ST on the object-side surface of the first lens L1. Here, the position of the aperture stop ST may not be limited to the one in Numerical Data Example 1. The aperture stop ST can be provided closer to the object-side than the first lens L1. Alternatively, the aperture stop ST can be provided between the first lens L1 and the second lens L2; between the second lens L2 and the third lens L3; between the third lens L3 and the fourth lens L4; or the like.

The second lens L2 is formed in a shape such that a paraxial curvature radius r3 of a surface thereof on the object-side and a paraxial curvature radius r4 of a surface thereof on the image plane side are both positive. The second lens L2 has a shape of a meniscus lens directing a convex surface thereof to the object side near the optical axis. The shape of the second lens L2 may not be limited to the one in Numerical Data Example 1. The second lens L2 can be formed in any shape as long as the refractive power thereof is negative. The second lens L2 can be formed in a shape such that the paraxial curvature radius r3 and the paraxial curvature radius r4 are both negative, or such that the paraxial curvature radius r3 is negative and the paraxial curvature radius r4 is positive. The first of the above-described shapes is a shape of a meniscus lens directing a concave surface thereof to the object side near the optical axis, and the latter one is a shape of a biconcave lens near the optical axis.

The third lens L3 is formed in a shape such that a paraxial curvature radius r5 of a surface thereof on the object-side and a paraxial curvature radius r6 of a surface thereof on the image plane side are both positive. The third lens L3 has a shape of a meniscus lens directing a convex surface thereof to the object side near the optical axis. The shape of the third lens L3 may not be limited to the one in Numerical Data Example 1. The third lens L3 can be formed in any shape as long as the refractive power thereof is negative. For example, the third lens L3 can be formed in a shape such that the paraxial curvature radius r5 is negative and the paraxial curvature radius r6 is positive, so as to have a shape of a biconcave lens near the optical axis. Alternatively, the third lens L3 can be formed in a shape such that the both paraxial curvature radii r5 and r6 are negative, so as to have a shape of a meniscus lens directing the concave surface thereof to the object side near the optical axis.

The fourth lens L4 is formed in a shape such that a paraxial curvature radius r7 of a surface thereof on the object-side and a paraxial curvature radius r8 of a surface thereof on the image plane side are both positive. The fourth lens L4 has a shape of a meniscus lens directing a convex surface thereof to the object side near the optical axis. The shape of the fourth lens L4 may not be limited to the one in Numerical Data Example 1. The Numerical Data Example 2 is an example of a shape, in which the paraxial curvature radius r7 is negative and the paraxial curvature radius r8 is positive, so as to have a shape of a biconcave lens near the optical axis. Other than the shapes described above, the fourth lens L4 can be formed in a shape such that the paraxial curvature radii r7 and r8 are both negative and so as to have a shape of a meniscus lens directing a concave surface thereof to the object side near an optical axis. The fourth lens L4 can be formed in any shape as long as the refractive power thereof is negative.

The fifth lens L5 has positive refractive power. The refractive power of the fifth lens L5 is not limited to positive refractive power. Numerical Data Examples 7 through 10 are examples of lens configurations, in which the fifth lens L5 has negative refractive power.

The fifth lens L5 is formed in a shape such that a paraxial curvature radius r9 of a surface thereof on the object-side is positive and a paraxial curvature radius r10 of a surface thereof on the image plane side is negative. The fifth lens L5 has a shape of a biconvex lens near the optical axis. The shape of the fifth lens L5 may not be limited to the one in Numerical Data Example 1. Numerical Data Examples 7 through 10 are examples of a shape, in which the paraxial curvature radii r9 and r10 are both positive, i.e., a shape of a meniscus lens directing a convex surface thereof to the object side near the optical axis. For example, the fifth lens L5 can be formed in a shape such that the paraxial curvature radius r9 and the paraxial curvature radius r10 are both negative, so as to have a shape of a meniscus lens directing a concave surface thereof to the object side near the optical axis. Alternatively, the fifth lens L5 can be formed in a shape such that the paraxial curvature radius r9 is negative and the paraxial curvature radius r10 is positive, so as to have a shape of a biconcave lens near the optical axis.

The sixth lens L6 has positive refractive power. The refractive power of the sixth lens L6 is not limited to positive refractive power. Numerical Data Examples 4 through 6 are examples of lens configurations, in which the sixth lens L6 has negative refractive power.

The sixth lens L6 is formed in a shape such that a paraxial curvature radius r11 of a surface thereof on the object-side and a paraxial curvature radius r12 of a surface thereof on the image plane side are both negative. The sixth lens L6 has a shape of a meniscus lens directing a concave surface thereof to the object side near the optical axis. The shape of the sixth lens L6 may not be limited to the one in Numerical Data Example 1. The Numerical Data Examples 2 and 7 through 10 are examples of shapes, in which the paraxial curvature radius r11 is positive and the paraxial curvature radius r12 is negative, so as to have a shape of a biconvex lens near the optical axis. Numerical Data Example 4 is an example of a shape, in which the paraxial curvature radii r11 and r12 are both positive, i.e., a shape of a meniscus lens directing a convex surface thereof to the object side near the optical axis. The Numerical Data Example 6 is an example of a shape, in which the paraxial curvature radius r11 is negative and the paraxial curvature radius r12 is positive, so as to have a shape of a biconcave lens near the optical axis.

The seventh lens L7 has positive refractive power. The refractive power of the seventh lens L7 is not limited to positive refractive power. Numerical Data Examples 2, 3, 6, 9 and 10 are examples of lens configurations, in which the seventh lens L7 has negative refractive power.

The seventh lens L7 is formed in a shape such that a paraxial curvature radius r13 (=R7f) of a surface thereof on the object-side and a paraxial curvature radius r14 (=R7r) of a surface thereof on the image plane side are both negative. The seventh lens L7 has a shape of a meniscus lens directing a concave surface thereof to the object side near the optical axis. In addition, according to the imaging lens of the embodiment, the seventh lens L7 is formed in a shape such that an object-side surface thereof directs a concave surface thereof to the object side at the periphery of the lens and has a shape such that an image plane-side surface thereof directs a convex surface thereof to the image plane side at the periphery of the lens. With such shape of the seventh lens L7, it is achievable to suitably restrain the incident angle of a light beam emitted from the imaging lens to the image plane IM within the range of CRA, while satisfactorily correcting the chromatic aberration of magnification and the field curvature. Here, the shape of the seventh lens L7 may not be limited to the one in Numerical Data Example 1. Alternatively, the seventh lens L7 can be formed in a shape such that the paraxial curvature radios r13 is positive and the paraxial curvature radius r14 is negative, so as to have a shape of a biconvex lens near the optical axis. In addition, the seventh lens L7 can be also formed in a shape such that the paraxial curvature radii r13 and r14 are both positive, so as to have a shape of a meniscus lens directing a convex surface thereof to the object side near an optical axis. Other than the shapes described above, the seventh lens L7 can be formed in a shape such that the paraxial curvature radius r13 is negative and the paraxial curvature radius r14 is positive, so as to have a shape of a biconcave lens near the optical axis.

The eighth lens L8 has negative refractive power. The refractive power of the eighth lens L8 is not limited to negative refractive power. Numerical Data Examples 2, 4, 6, 7 and 9 are examples of lens configurations, in which the eighth lens L8 has positive refractive power.

The eighth lens L8 is formed in a shape such that a paraxial curvature radius r15 (=R8f) of a surface thereof on the object-side and a paraxial curvature radius r16 (=R8r) of a surface thereof on the image plane side are both positive. The eighth lens L8 has a shape of a meniscus lens directing a convex surface thereof to the object side near the optical axis. In addition, according to the imaging lens of the invention, the eighth lens L8 is formed in a shape, such that an object-side surface thereof directs its concave surface to the object side at the periphery of the lens, and such that an image plane-side surface thereof directs its convex surface to the image plane side at the periphery of the lens. Both surfaces of the eighth lens L8 are formed as aspheric shapes having inflection points. Accordingly, the eighth lens L8 of the embodiment has a shape of a meniscus lens directing the convex surface thereof to the object side near the optical axis, and has a shape of a meniscus lens directing a concave surface thereof to the object side at the periphery of the lens. With such shape of the eighth lens L8, it is achievable to suitably restrain the incident angle of a light beam emitted from the imaging lens to the image plane IM within the range of CRA, while satisfactorily correcting the chromatic aberration of magnification and the field curvature. The shape of the eighth lens L8 may not be limited to the one in Numerical Data Example 1. For example, the eighth lens L8 can be formed in a shape such that the paraxial curvature radii r15 and r16 are both negative, so as to have a shape of a meniscus lens directing a concave surface thereof to the object side near an optical axis. In addition to the shapes described above, the eighth lens L8 can be formed in a shape such that the paraxial curvature radius r15 is positive and the paraxial curvature radius r16 is negative, or such that the paraxial curvature radius r15 is negative and the paraxial curvature radius r16 is positive.

The ninth lens L9 is formed in a shape such that a paraxial curvature radius r17 of a surface thereof on the object-side and a paraxial curvature radius r18 (=R9r) of a surface thereof on the image plane side are both positive. The ninth lens L9 has a shape of a meniscus lens directing a convex surface thereof to the object side near the optical axis. The shape of the ninth lens L9 may not be limited to the one in Numerical Data Example 1. The Numerical Data Examples 2, 7 and 9 are examples of a shape, in which the paraxial curvature radius r17 is negative and the paraxial curvature radius r18 is positive, so as to have a shape of a biconcave lens near the optical axis. In addition to the shapes described above, the ninth lens L9 can be formed in a shape such that the paraxial curvature radii r17 and r18 are both negative. The ninth lens L9 can be formed in any shape as long as the refractive power thereof is negative.

Furthermore, the image plane-side surface of the ninth lens L9 is formed as an aspheric shape having an inflection point. Here, the "inflection point" means a point where the positive/negative sign of a curvature radius changes on the curve, i.e., a point where a direction of curving of the curve on the lens surface changes. According to the imaging lens of the embodiment, the image plane-side surface of the ninth lens L9 is formed as an aspheric shape having a pole. With such shape of the ninth lens L9, it is achievable to satisfactorily correct an off-axis chromatic aberration of magnification as well as an axial chromatic aberration, and to suitably restrain the incident angle of a light beam emitted from the imaging lens to the image plane IM within the range of CRA. According to the imaging lens of Numerical Data Example 1, the both surfaces of the eighth lens L8 and the ninth lens L9 are formed as aspheric shapes having inflection points. Therefore, it is achievable to more satisfactorily correct aberrations at the periphery of an image, while restraining an incident angle of a light beam emitted from the imaging lens to the image plane within the range of CRA. Here, depending on the required optical performance and downsizing of the imaging lens, among lens surfaces of the eighth lens L8 and the ninth lens L9, lens surfaces other than the image plane-side surface of the ninth lens L9 can be formed as aspheric shapes without to inflection points or spherical surfaces.

According to the embodiment, the imaging lens satisfies the following conditional expressions (1) through (23) and (26):

$$0 < f123 \quad (1)$$

$$0 < f456 \quad (2)$$

$$f789 < 0 \quad (3)$$

$$0.2 < f1/f < 2.0 \quad (4)$$

$$0.4 < f1/f < 2.0 \quad (4a)$$

$$0.4 < f1/f < 1.6 \quad (4b)$$

$$-6 < f2/f1 < -1 \quad (5)$$

$$0.5 < f12/f < 2.5 \quad (6)$$

$$0.7 < f12/f < 2.1 \quad (6a)$$

$$4 < f3/f2 < 12 \quad (7)$$

$$-6.0 < f23/f < -0.5 \quad (8)$$

$$-4 < f23/f < -1 \quad (8a)$$

$$-12 < f34/f < -4 \quad (9)$$

$$-10 < f34/f < -5 \quad (9a)$$

$$0.03 < D34/f < 0.10 \quad (10)$$

$$0.5 < f56/f < 8.0 \quad (11)$$

$$1.0 < f56/f < 6.0 \quad (11a)$$

$$0.2 < R7f/R7r < 3.0 \quad (12)$$

$$0.2 < R8f/R8r < 3.0 \quad (13)$$

$$0.5 < T8/T7 < 4.0 \quad (14)$$

$$0.02 < D89/f < 0.15 \quad (15)$$

$$-5.0 < f89/f < -0.1 \quad (16)$$

$$0.2 < R9r/f < 0.8 \quad (17)$$

$$-3.5 < f9/f < -0.2 \quad (18)$$

$$35 < vd1 < 75 \quad (19)$$

$$15 < vd2 < 35 \quad (20)$$

$$35 < vd9 < 75 \quad (21)$$

$$1.0 < TL/f < 1.4 \quad (22)$$

$$1.0 < TL/H\,max < 1.8 \quad (23)$$

$$f/Dep < 2.4 \quad (26)$$

In the above conditional expression,
f: Focal length of the whole lens system
f1: Focal length of the first lens L1
f2: Focal length of the second lens L2
f3: Focal length of the third lens L3
f9: Focal length of the ninth lens L9
f12: Composite focal length of the first lens L1 and the second lens L2
f23: Composite focal length of the second lens L2 and the third lens L3
f34: Composite focal length of a third lens L3 and a fourth lens L4.
f56: Composite focal length of the fifth lens L5 and the sixth lens L6
f89: Composite focal length of the eighth lens L8 and the ninth lens L9
f123: Composite focal length of the first lens L1, the second lens L2 and the third lens L3
f456: Composite focal length of the fourth lens L4, the fifth lens L5 and the sixth lens L6
f789: Composite focal length of the seventh lens L7, the eighth lens L8 and the ninth lens L9
T7: Thickness of the seventh lens L7 on an optical axis
T8: Thickness of the eighth lens L8 on an optical axis
vd1: Abbe's number of the first lens L1
vd2: Abbe's number of the second lens L2
vd9: Abbe's number of the ninth lens L9
R7f: Paraxial curvature radius of an object-side surface of the seventh lens L7
R7r: Paraxial curvature radius of an image plane-side surface of the seventh lens L7
R8f: Paraxial curvature radius of an object-side surface of the eighth lens L8
R8r: Paraxial curvature radius of an image plane-side surface of the eighth lens L8
R9r: Paraxial curvature radius of an image plane-side surface of the ninth lens L9
D34: Distance on the optical axis X between the third lens L3 and the fourth lens L4
D89: Distance on the optical axis X between the eighth lens L8 and the ninth lens L9
Hmax: Maximum image height
TL: Distance on an optical axis X from the object-side surface of the first lens L1 to the image plane IM (the filter 10 is a distance in the air)
Dep: Diameter of entrance pupil.

When the fifth lens L5 has positive refractive power as in the lens configurations of Numerical Data Examples 1 through 6, the imaging lens further satisfies the following conditional expression (24) and (24a):

$$1 < f5/f < 15 \quad (24)$$

$$1 < f5/f < 13 \quad (24a)$$

In the above conditional expression,
f5: Focal length of the fifth lens L5

When the sixth lens L6 has positive refractive power as in the lens configurations of Numerical Data Examples 1 through 3 and 7 through 10, the imaging lens further satisfies the following conditional expression (25) and (25a):

$$1 < f6/f < 10 \quad (25)$$

$$1 < f6/f < 8 \quad (25a)$$

In the above conditional expression,
f6: Focal length of the sixth lens L6

Here, it is not necessary to satisfy all of the conditional expressions, and it is achievable to obtain an effect corresponding to the respective conditional expression when any single one of the conditional expressions is individually satisfied.

According to the embodiment, lens surfaces of the respective lenses are formed as aspheric surfaces. An equation that expresses those aspheric surfaces is shown below:

$$Z = \frac{C \cdot H^2}{1 + \sqrt{1 - (1+k) \cdot C^2 \cdot H^2}} + \sum (An \cdot H^n) \quad \text{[Equation 1]}$$

In the above conditional expression,
Z: Distance in a direction of the optical axis
H: Distance from the optical axis in a direction perpendicular to the optical axis
C: Paraxial curvature (=1/r, r: paraxial curvature radius)
k: Conic constant
An: The nth aspheric coefficient Next, Numerical Data Examples of the imaging lens of the embodiment will be described. In each Numerical Data Example, f represents a focal length of the whole lens system, Fno represents an F-number, and a represents a half angle of view, respectively. In addition, i represents a surface number counted from the object side, r represents a paraxial curvature radius, d represents a distance on the optical axis between lens surfaces (surface spacing), nd represents a refractive index at a reference wavelength of 588 nm, and vd represents an Abbe's number at the reference wavelength, respectively. Here, surfaces indicated with surface numbers i affixed with * (asterisk) are aspheric surfaces.

Numerical Data Example 1

Basic Lens Data

TABLE 1

| f = 5.95 mm Fno = 2.0 ω = 38.3° | | | | | | |
|---|---|---|---|---|---|---|
| | i | r | d | nd | vd | [mm] |
| | | ∞ | ∞ | | | |
| L1 | 1*(ST) | 2.532 | 0.863 | 1.5443 | 65.9 | f1 = 5.017 |
| | 2* | 30.618 | 0.056 | | | |
| L2 | 3* | 5.410 | 0.295 | 1.6707 | 19.2 | f2 = -12.569 |
| | 4* | 3.223 | 0.188 | | | |
| L3 | 5* | 4.712 | 0.257 | 1.6707 | 19.2 | f3 = -100.747 |
| | 6* | 4.308 | 0.369 | | | |
| L4 | 7* | 27.584 | 0.309 | 1.5443 | 55.9 | f4 = -96.621 |
| | 8* | 18.022 | 0.045 | | | |
| L5 | 9* | 24.003 | 0.424 | 1.5443 | 55.9 | f5 = 17.378 |
| | 10* | -15.273 | 0.462 | | | |
| L6 | 11* | -25.919 | 0.416 | 1.5443 | 55.9 | f6 = 23.661 |
| | 12* | -8.652 | 0.087 | | | |
| L7 | 13* | -3.115 | 0.252 | 1.6707 | 19.2 | f7 = 58.814 |
| | 14* | -2.961 | 0.035 | | | |
| L8 | 15* | 6.408 | 0.485 | 1.5443 | 55.9 | f8 = -102.382 |
| | 16* | 5.594 | 0.461 | | | |
| L9 | 17* | 12.450 | 1.173 | 1.5443 | 55.9 | f9 = -6.657 |
| | 18* | 2.714 | 0.250 | | | |
| | 19 | ∞ | 0.210 | 1.5168 | 64.2 | |
| | 20 | ∞ | 0.598 | | | |
| (IM) | | ∞ | | | | | f12 = 7.270 mm
f23 = -10.950 mm
f34 = -49.636 mm
f56 = 10.261 mm
f89 = -6.324 mm
f123 = 7.518 mm
f456 = 11.447 mm
f789 = -7.094 mm
D34 = 0.369 mm
D89 = 0.461 mm
T7 = 0.252 mm
T8 = 0.485 mm
TL = 7.164 mm
fl23 = 4.71 mm
T8 = 3.005 mm

TABLE 2

Aspherical surface data

| i | k | A4 | A6 | A8 | A10 | A12 | A14 | A16 |
|---|---|---|---|---|---|---|---|---|
| 1 | 2.051E-01 | -1.050E-03 | -6.103E-04 | 5.722E-04 | -5.792E-04 | 1.961E-04 | -1.425E-05 | -8.531E-06 |
| 2 | 0.000E+00 | -1.804E-02 | 2.223E-02 | -1.431E-02 | 4.037E-03 | -7.503E-04 | -4.181E-05 | 1.581E-05 |
| 3 | -1.693E+01 | -2.269E-02 | 2.359E-02 | -1.348E-02 | 4.925E-03 | -9.316E-04 | 1.795E-04 | -3.256E-05 |
| 4 | -1.131E+01 | 2.194E-02 | -1.451E-02 | 1.141E-02 | -5.387E-03 | 2.170E-03 | -3.509E-04 | 1.539E-04 |
| 5 | 0.000E+00 | -5.385E-03 | -2.306E-03 | 7.087E-04 | 4.726E-04 | 1.754E-04 | 1.335E-04 | -1.262E-06 |
| 6 | 0.000E+00 | -6.002E-03 | 5.102E-04 | 9.550E-04 | 4.312E-04 | 1.754E-04 | 3.577E-05 | -2.231E-05 |
| 7 | 0.000E+00 | -1.800E-02 | -1.104E-02 | 3.060E-04 | -1.236E-04 | 4.206E-04 | 1.427E-04 | -1.613E-05 |
| 8 | 0.000E+00 | -1.114E-02 | -1.188E-02 | -1.197E-03 | 2.791E-04 | 2.023E-04 | 8.890E-05 | -6.967E-05 |
| 9 | 0.000E+00 | -1.748E-02 | -2.532E-03 | 1.605E-03 | 1.276E-03 | 6.028E-05 | 6.253E-07 | -2.855E-05 |
| 10 | 0.000E+00 | -3.805E-02 | 1.135E-05 | 1.456E-03 | 4.974E-04 | 5.227E-05 | -4.451E-05 | -1.735E-07 |
| 11 | 0.000E+00 | -4.647E-02 | -8.387E-04 | -2.332E-03 | 1.905E-06 | 3.036E-04 | 3.389E-05 | -1.912E-05 |
| 12 | 0.000E+00 | -5.786E-02 | 1.052E-02 | -2.298E-03 | -1.310E-03 | 1.129E-03 | -2.674E-04 | 2.130E-05 |
| 13 | 7.198E-01 | -1.054E-02 | 2.108E-02 | -1.223E-02 | 4.153E-03 | -6.812E-04 | 2.921E-05 | 2.371E-06 |
| 14 | -2.852E+00 | -1.540E-02 | 1.585E-02 | -8.529E-03 | 2.351E-03 | -3.055E-04 | 1.583E-05 | -4.687E-07 |
| 15 | 0.000E+00 | -2.063E-02 | -1.792E-04 | -1.211E-03 | 3.083E-04 | -5.714E-05 | 5.461E-05 | -3.046E-07 |
| 16 | 0.000E+00 | -1.390E-02 | -1.982E-04 | -5.116E-04 | 1.114E-04 | -8.248E-06 | -3.281E-08 | 2.512E-08 |
| 17 | 0.000E+00 | -7.033E-02 | 1.519E-02 | -1.783E-03 | 1.448E-04 | -8.452E-06 | 3.143E-07 | -5.414E-09 |
| 18 | -3.287E+00 | -4.682E-02 | 1.150E-02 | -2.088E-03 | 2.373E-04 | -1.594E-05 | 5.789E-07 | -8.730E-09 |

The values of the respective conditional expressions are as follows:

$f1/f=0.84$ $f2/f1=-2.51$ $f12/f=1.22$ $f3/f2=8.02$ $f23/f=-1.84$ $f34/f=-8.34$ $D34/f=0.06$ $f56/f=1.72$ $R7f/R7r=1.05$ $R8f/R8r=1.15$ $T8/T7=1.92$ $D89/f=0.08$ $f89/f=-1.06$ $R9r/f=0.46$ $f9/f=-1.12$ $TL/f=1.20$ $TL/H$ max=1.52

$f$/Dep=1.98

$f5/f=2.92$ $f6/f=3.98$

Accordingly, the imaging lens of Numerical Data Example 1 satisfies the above-described conditional expressions.

Figure 2:
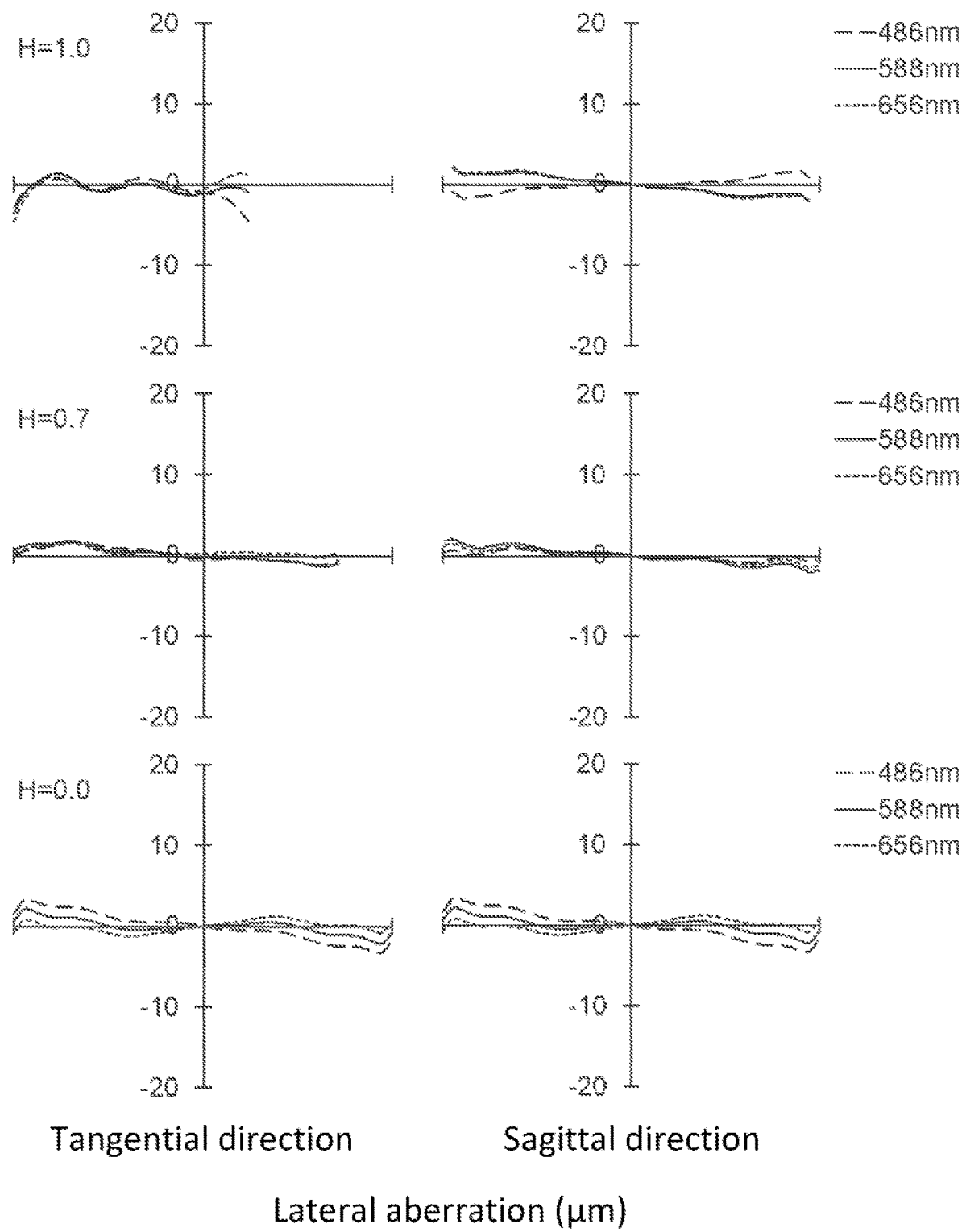
FIG. 2 is an aberration diagram showing a lateral aberration of the imaging lens of FIG. 1.
Figure 3:
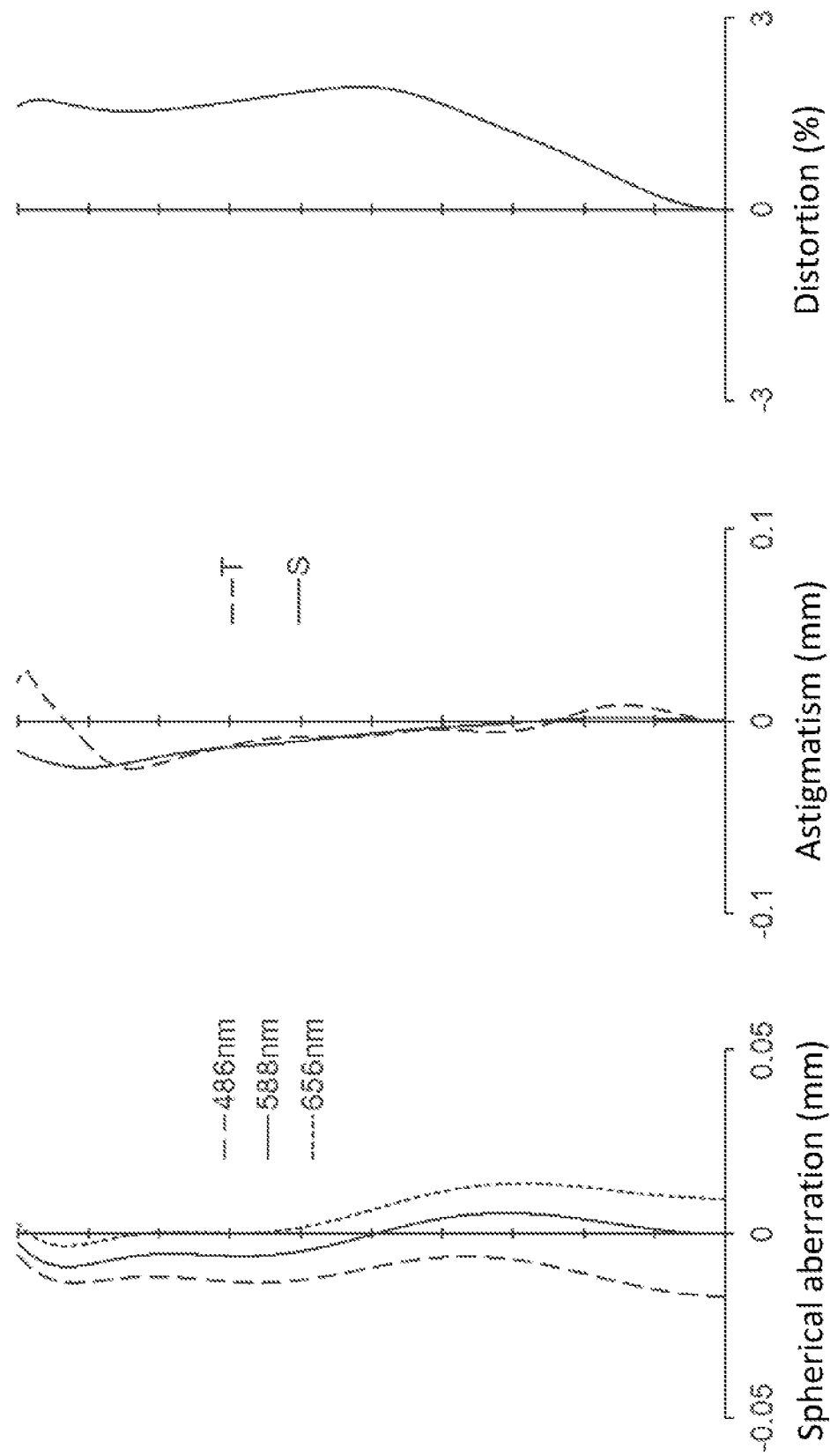
FIG. 3 is an aberration diagram showing a spherical aberration, astigmatism, and a distortion of the imaging lens of FIG. 1.
Figure 4:
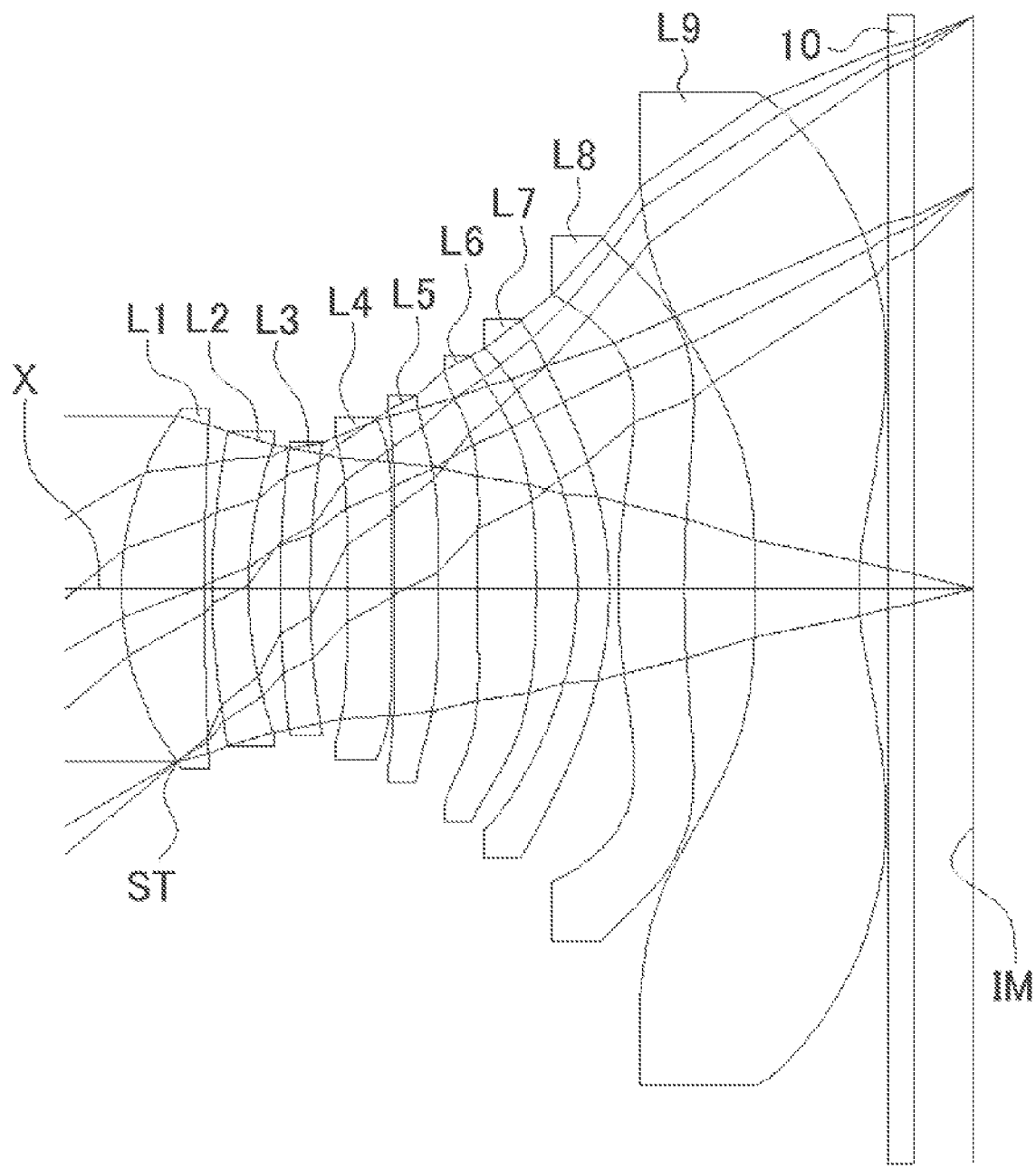
FIG. 4 is a sectional view of a schematic configuration of an imaging lens in Numerical Data Example 2 of the present invention.

FIG. 2 shows a lateral aberration that corresponds to ratios H of the respective image heights to the maximum image height Hmax (hereinafter referred to as "image height ratio H"), which is divided into a tangential direction and a sagittal direction (The same is true for FIGS. 5, 8, 11, 14, 17, 20, 23, 26 and 29). FIG. 3 shows a spherical aberration (mm), astigmatism (mm), and a distortion (n), respectively. The aberration diagrams of the astigmatism and the distortion show aberrations at the reference wavelength (588 nm). Furthermore, in the aberration diagrams of the astigmatism shows sagittal image planes (S) and tangential image planes (T), respectively (The same is true for FIGS. 6, 9, 12, 15, 18, 21, 24, 27 and 30). As shown in FIGS. 2 and 3, according to the imaging lens of Numerical Data Example 1, the aberrations can be satisfactorily corrected.

Numerical Data Example 2

Basic Lens Data

TABLE 3 f = 5.70 mm Fno = 2.0 ω = 39.6°

| | i | r | d | nd | vd | [mm] |
|---|---|---|---|---|---|---|
| | | ∞ | ∞ | | | |
| L1 | 1*(ST) | 2.540 | 0.694 | 1.5443 | 65.9 | f1 = 5.197 |
| | 2* | 22.503 | 0.060 | | | |
| L2 | 3* | 4.894 | 0.306 | 1.6707 | 19.2 | f2 = 14.220 |
| | 4* | 3.153 | 0.263 | | | |
| L3 | 5* | 8.006 | 0.250 | 1.6707 | 19.2 | f3 = −100.875 |
| | 6* | 7.069 | 0.308 | | | |
| L4 | 7* | −819.354 | 0.371 | 1.5443 | 55.9 | f4 = −100.340 |
| | 8* | 58.524 | 0.026 | | | |
| L5 | 9* | 45.287 | 0.366 | 1.5443 | 65.9 | f5 = 56.770 |
| | 10* | −96.990 | 0.326 | | | |
| L6 | 11* | 13.273 | 0.489 | 1.5443 | 55.9 | f6 = 11.875 |
| | 12* | −12.435 | 0.344 | | | |
| L7 | 13* | −2.850 | 0.266 | 1.6707 | 19.2 | f7 = −101.863 |
| | 14* | −3.085 | 0.075 | | | |
| L8 | 15* | 4.502 | 0.554 | 1.5443 | 65.9 | f8 = 15.488 |
| | 16* | 9.241 | 0.586 | | | |
| L9 | 17* | −49.535 | 0.870 | 1.5443 | 55.9 | f9 = −4.708 |
| | 18* | 2.719 | 0.250 | | | |
| | 19 | ∞ | 0.210 | 1.5168 | 64.2 | |
| | 20 | ∞ | 0.494 | | | |
| (IM) | | ∞ | | | | | f12 = 7.289 mm
f23 = −12.320 mm
f34 = −50.487 mm
f56 = 9.915 mm
f89 = −8.110 mm
f123 = 7.621 mm
f456 = 10.922 mm
f789 = −7.084 mm
D34 = 0.308 mm
D89 = 0.586 mm
T7 = 0.266 mm
T8 = 0.554 mm
TL = 7.037 mm
Hmax = 4.71 mm
Dep = 2.877 mm

TABLE 4

Aspherical surface data

| i | k | A4 | A6 | A8 | A10 | A12 | A14 | A15 |
|---|---|---|---|---|---|---|---|---|
| 1 | 2.750E−01 | 3.245E−04 | −2.532E−04 | 6.200E−04 | −5.383E−04 | 2.183E−04 | −1.178E−05 | −1.340E−05 |
| 2 | 0.000E+00 | −1.750E−02 | 2.260E−02 | −1.420E−02 | 4.934E−03 | −7.596E−04 | −4.397E−05 | 1.937E−05 |
| 3 | −1.758E+01 | −2.228E−02 | 2.352E−02 | −1.366E−02 | 4.927E−03 | −9.068E−04 | 1.843E−04 | −2.711E−05 |
| 4 | −1.175E+01 | 2.047E−02 | −1.418E−02 | 1.189E−02 | −5.511E−03 | 1.960E−03 | −3.852E−04 | 2.210E−04 |
| 5 | 0.000E+00 | −5.405E−03 | −1.796E−03 | 2.731E−04 | 2.171E−04 | 9.372E−05 | 1.104E−04 | 1.141E−05 |
| 6 | 0.000E+00 | −3.920E−03 | −3.133E−04 | 4.448E−04 | 2.185E−04 | 8.921E−05 | 1.610E−05 | −8.973E−06 |
| 7 | 0.000E+00 | −2.066E−02 | −1.048E−02 | −1.537E−04 | −5.020E−04 | 2.952E−04 | 1.389E−04 | 4.089E−06 |
| 8 | 0.000E+00 | −7.810E−03 | −1.217E−02 | −1.516E−03 | 2.051E−04 | 1.892E−04 | 8.015E−05 | −7.353E−05 |
| 9 | 0.000E+00 | −1.612E−02 | −2.761E−03 | 1.543E−03 | 8.079E−05 | 4.785E−05 | 2.315E−06 | −2.520E−05 |
| 10 | 0.000E+00 | −4.538E−02 | 3.551E−04 | 1.559E−03 | 4.931E−04 | 5.556E−05 | −3.749E−05 | 5.005E−05 |
| 11 | 0.000E+00 | −4.095E−02 | −1.817E−04 | −2.530E−03 | 4.546E−06 | 3.190E−04 | 4.156E−05 | −1.595E−05 |

TABLE 4-continued

Aspherical surface data

| i | k | A4 | A6 | A8 | A10 | A12 | A14 | A15 |
|---|---|---|---|---|---|---|---|---|
| 12 | 0.000E+00 | −5.205E−02 | 1.027E−02 | −2.148E−03 | −1.283E−03 | 1.130E−03 | −2.580E−04 | 2.130E−05 |
| 13 | 6.302E−01 | −1.011E−02 | 2.162E−02 | −1.219E−02 | 4.153E−03 | −6.792E−04 | 2.930E−05 | 2.256E−06 |
| 14 | −4.147E+00 | −1.798E−02 | 1.536E−02 | −8.551E−03 | 2.351E−03 | −3.049E−04 | 1.707E−05 | −4.111E−07 |
| 15 | 0.000E+00 | −2.095E−02 | 1.608E−04 | −1.258E−03 | 3.239E−04 | −5.522E−05 | 5.525E−06 | −2.425E−07 |
| 16 | 0.000E+00 | −5.255E−03 | −9.330E−04 | −6.364E−04 | 1.130E−04 | −7.993E−06 | −1.924E−08 | 2.525E−08 |
| 17 | 0.000E+00 | −6.868E−02 | 1.528E−02 | −1.782E−03 | 1.446E−04 | −8.473E−06 | 3.133E−07 | −5.377E−09 |
| 18 | −4.573E+00 | −4.428E−02 | 1.154E−02 | −2.092E−03 | 2.371E−04 | −1.594E−05 | 5.789E−07 | −8.720E−09 |

The values of the respective conditional expressions are as follows:

$f1/f=0.91$ $f2/f1=-2.74$ $f12/f=1.28$ $f3/f2=7.09$ $f23/f=-2.16$ $f34/f=-8.86$ $D34/f=0.05$ $f56/f=1.74$ $R7f/R7r=0.92$ $R8f/R8r=0.49$ $T8/T7=2.09$ $D89/f=0.10$ $f89/f=-1.42$ $R9r/f=0.48$ $f9/f=-0.83$ $TL/f=1.24$ $TL/H\ max=1.50$ $f/\mathrm{Dep}=1.98$ $f5/f=9.96$ $f6/f=2.08$ Accordingly, the imaging lens of Numerical Data Example 2 satisfies the above-described conditional expressions.

Figure 5:
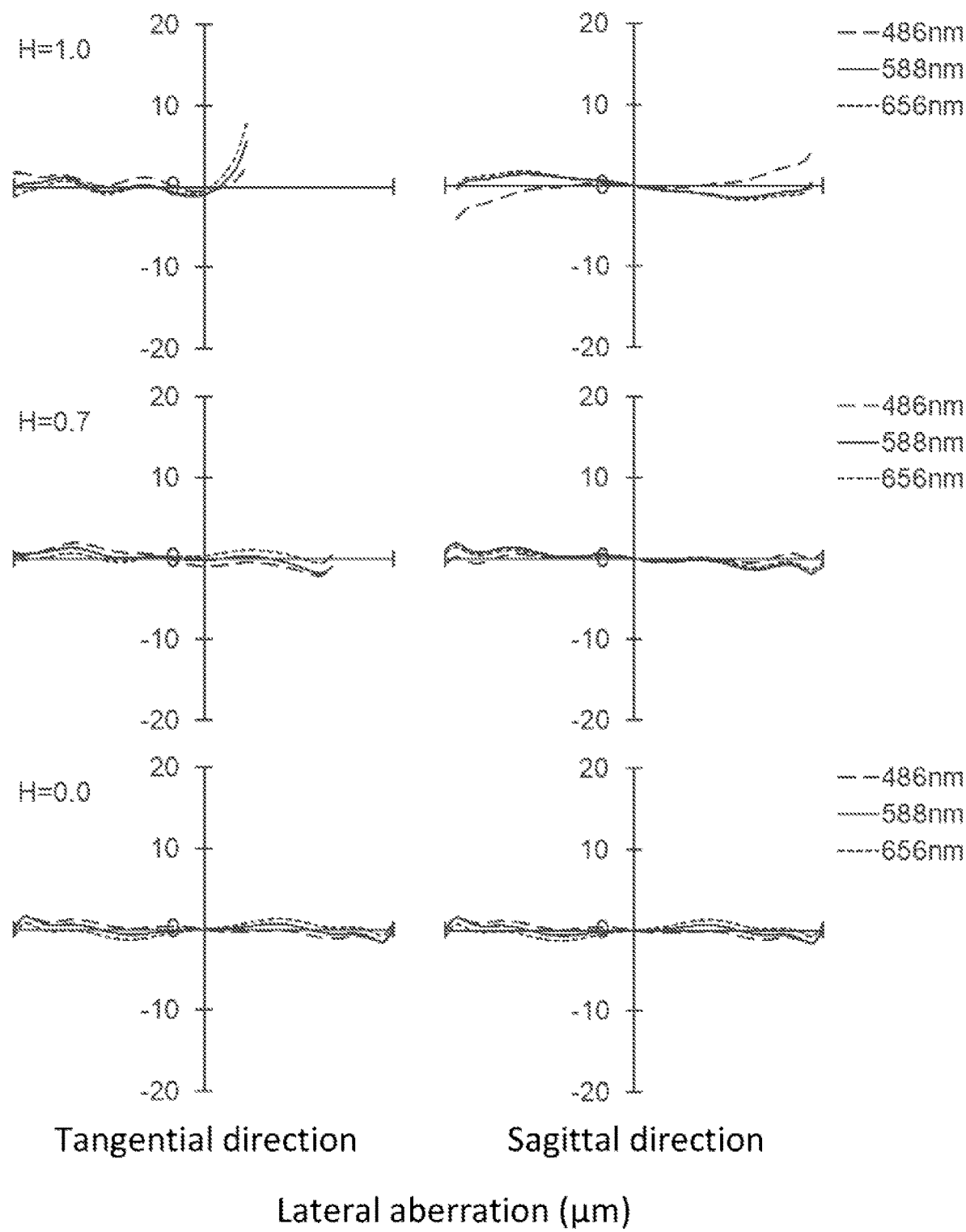
FIG. 5 is an aberration diagram showing a lateral to aberration of the imaging lens of FIG. 4.
Figure 6:
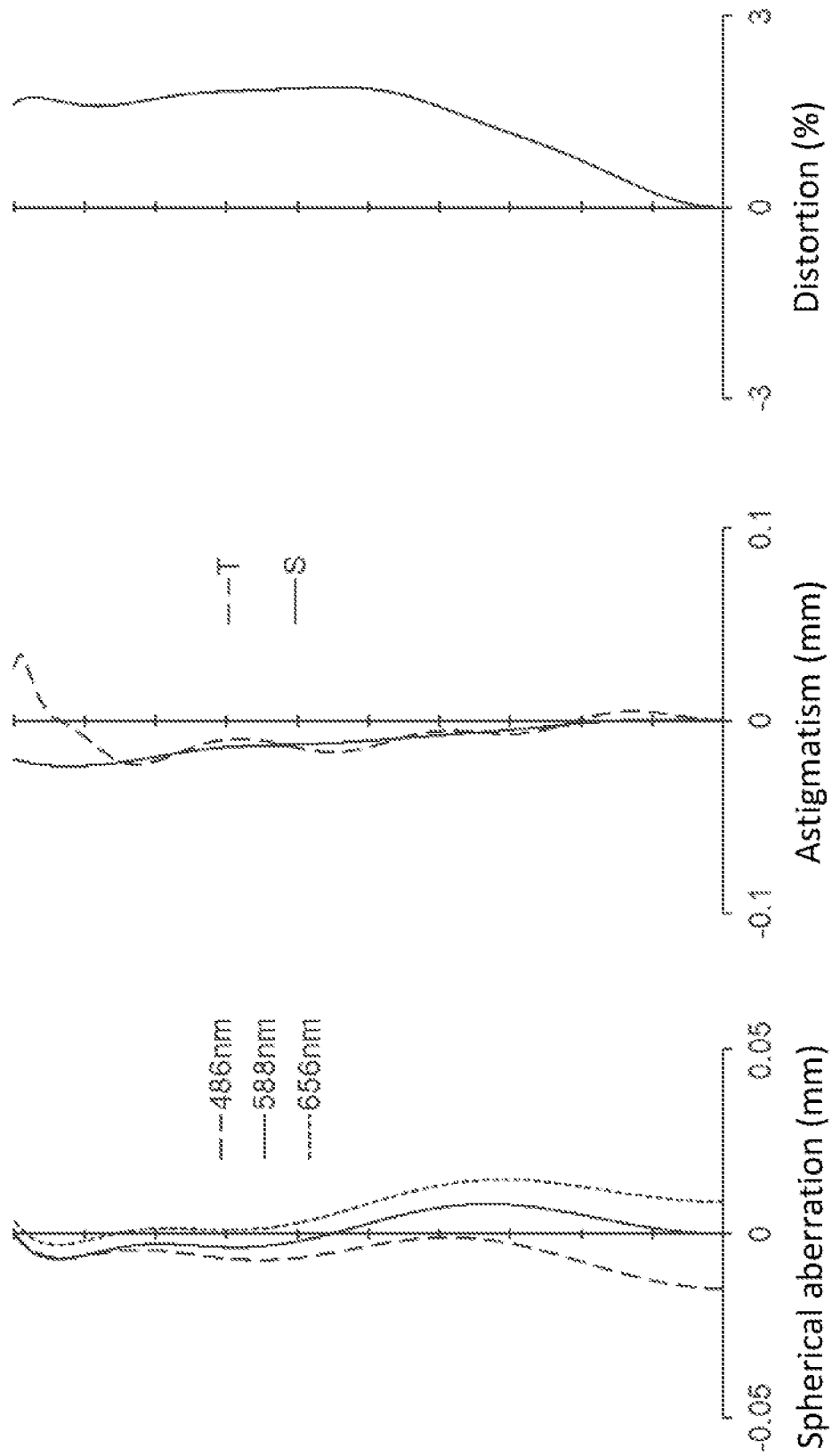
FIG. 6 is an aberration diagram showing a spherical aberration, astigmatism, and a distortion of the imaging lens of FIG. 4.
Figure 7:
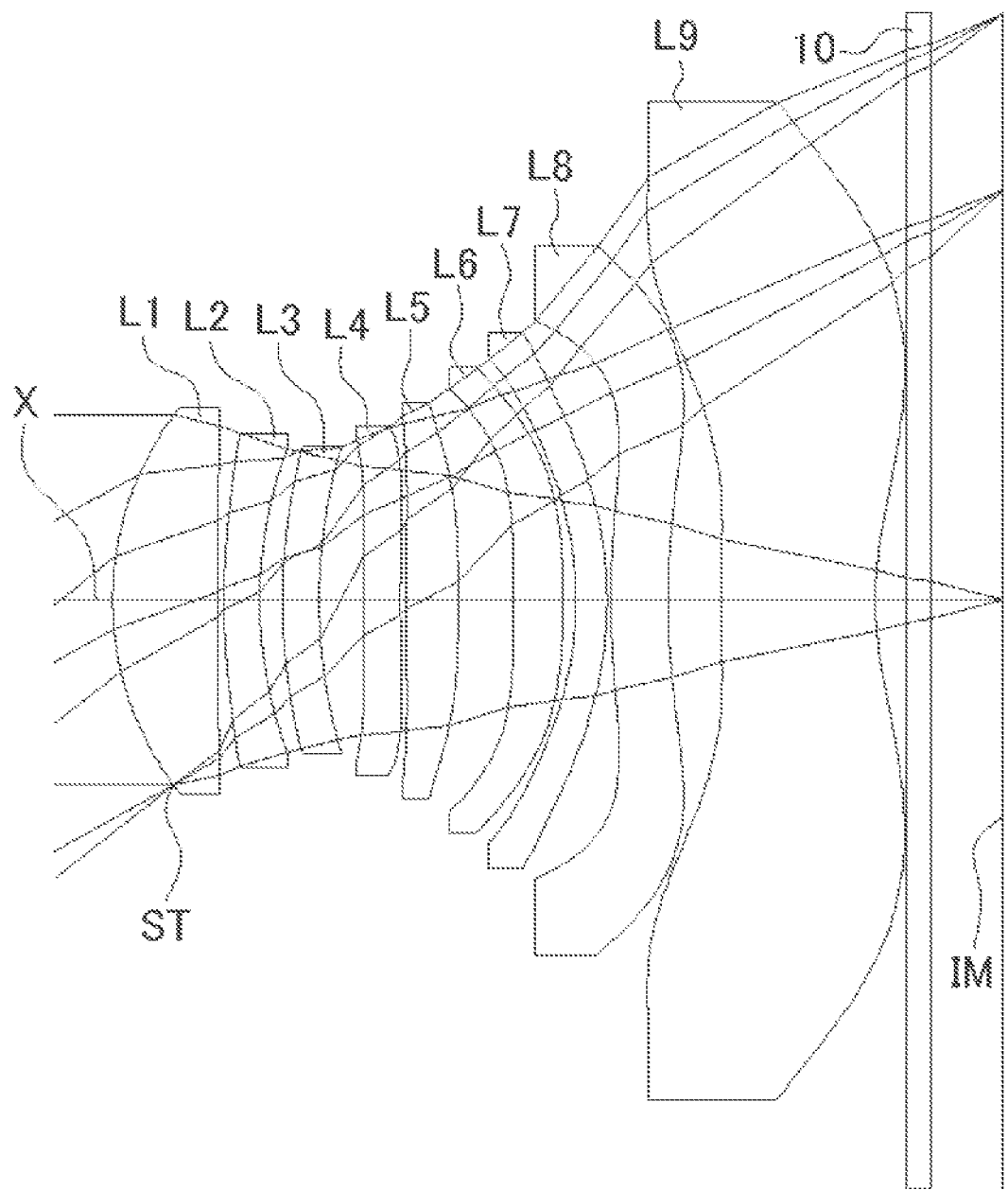
FIG. 7 is a sectional view of a schematic configuration of an imaging lens in Numerical Data Example 3 of the present invention.

FIG. 5 shows a lateral aberration that corresponds to an image height H and FIG. 6 shows a spherical aberration (mm), astigmatism (mm) and a distortion respectively. As shown in FIGS. 5 and 6, according to the imaging lens of Numerical Data Example 2, the aberrations can be also satisfactorily corrected.

Numerical Data Example 3

Basic Lens Data

TABLE 5 f = 5.98 mm Fno = 2.0 ω = 38.2°

| | i | r | d | nd | vd | [mm] |
|---|---|---|---|---|---|---|
| | | ∞ | ∞ | | | |
| L1 | 1*(ST) | 2.527 | 0.853 | 1.5443 | 55.9 | f1 = 4.991 |
| | 2* | 31.864 | 0.055 | | | |
| L2 | 3* | 5.425 | 0.290 | 1.6707 | 19.2 | f2 = −12.418 |
| | 4* | 3.215 | 0.188 | | | |
| L3 | 5* | 4.674 | 0.298 | 1.6707 | 19.2 | f3 = −100.687 |
| | 6* | 4.260 | 0.362 | | | |
| L4 | 7* | 24.516 | 0.300 | 1.5443 | 55.9 | f4 = −64.446 |
| | 8* | 15.919 | 0.045 | | | |
| L5 | 9* | 21.716 | 0.429 | 1.5443 | 55.9 | f5 = 16.818 |
| | 10* | −15.714 | 0.450 | | | |
| L6 | 11* | −29.243 | 0.404 | 1.5443 | 55.9 | f6 = 17.013 |
| | 12* | −7.067 | 0.104 | | | |
| L7 | 13* | −2.973 | 0.255 | 1.6707 | 19.2 | f7 = −100.820 |
| | 14* | −3.217 | 0.030 | | | |
| L8 | 15* | 6.291 | 0.465 | 1.5443 | 55.9 | f8 = −100.281 |
| | 16* | 5.494 | 0.434 | | | |
| L9 | 17* | 10.960 | 1.257 | 1.5443 | 95.9 | f9 = −7.132 |
| | 18* | 2.751 | 0.250 | | | |
| | 19 | ∞ | 0.210 | 1.5168 | 64.2 | |
| | 20 | ∞ | 0.579 | | | |
| (IM) | | ∞ | | | | | f12 = 7.270 mm
f23 = −10.792 mm
f34 = −46.342 mm
f56 = 8.691 mm
f89 = −6.723 mm
f123 = 7.487 mm
f456 = 9.649 mm
f789 = −5.995 mm
D34 = 0.362 mm
D89 = 0.434 mm
Hmax = 4.71 mm
Dep = 3.021 mm

TABLE 6

Aspherical surface data

| i | k | A4 | A6 | A8 | A10 | A12 | A14 | A16 |
|---|---|---|---|---|---|---|---|---|
| 1 | 2.024E−01 | −1.124E−03 | −6.259E−04 | 5.799E−04 | −5.787E−04 | 1.951E−04 | −1.454E−05 | −8.482E−06 |
| 2 | 0.000E+00 | −1.802E−02 | 2.223E−02 | −1.432E−02 | 4.934E−03 | −7.504E−04 | −4.123E−05 | 1.540E−05 |
| 3 | −1.676E+01 | −2.273E−02 | 2.355E−02 | −1.349E−02 | 4.914E−03 | −9.355E−04 | 1.805E−04 | −3.055E−05 |
| 4 | −1.122E+01 | 2.208E−02 | −1.451E−02 | 1.141E−02 | −5.357E−03 | 2.190E−03 | −3.521E−04 | 1.426E−04 |
| 5 | 0.000E+00 | −5.414E−03 | −2.275E−03 | 7.755E−04 | 4.953E−04 | 1.747E−04 | 1.281E−04 | −6.580E−06 |

TABLE 6-continued

Aspherical surface data

| i | k | A4 | A6 | A8 | A10 | A12 | A14 | A16 |
|---|---|---|---|---|---|---|---|---|
| 6 | 0.000E+00 | −5.170E−03 | 4.930E−04 | 9.139E−04 | 4.079E−04 | 1.671E−04 | 3.475E−05 | −1.998E−05 |
| 7 | 0.000E+00 | −1.775E−02 | −1.089E−02 | 2.962E−04 | −1.418E−04 | 4.126E−04 | 1.424E−04 | −1.401E−05 |
| 8 | 0.000E+00 | −1.130E−02 | −1.182E−02 | −1.195E−03 | 2.735E−04 | 2.007E−04 | 8.922E−05 | −6.928E−05 |
| 9 | 0.000E+00 | −1.723E−02 | −2.532E−03 | 1.616E−03 | 1.314E−04 | 6.012E−05 | 9.589E−08 | −2.856E−05 |
| 10 | 0.000E+00 | −3.829E−02 | 1.639E−04 | 1.458E−03 | 4.912E−04 | 5.082E−05 | −4.442E−05 | 4.233E−08 |
| 11 | 0.000E+00 | −4.801E−02 | −1.172E−03 | −2.328E−03 | 2.542E−05 | 3.042E−04 | 3.364E−05 | −1.927E−05 |
| 12 | 0.000E+00 | −5.494E−02 | 1.056E−02 | −2.338E−03 | −1.316E−03 | 1.129E−03 | −2.674E−04 | 2.131E−05 |
| 13 | 6.882E−01 | −8.955E−03 | 2.121E−02 | −1.222E−02 | 4.151E−03 | −6.820E−04 | 2.905E−05 | 2.341E−06 |
| 14 | −2.167E+00 | −1.624E−02 | 1.587E−02 | −8.514E−03 | 2.354E−03 | −3.053E−04 | 1.678E−05 | −5.022E−07 |
| 15 | 0.000E+00 | −2.183E−02 | 5.705E−05 | −1.222E−03 | 2.983E−04 | −5.775E−05 | 5.619E−06 | −2.678E−07 |
| 16 | 0.000E+00 | −1.442E−02 | −2.617E−04 | −5.101E−04 | 1.115E−04 | −8.229E−06 | −3.029E−08 | 2.531E−08 |
| 17 | 0.000E+00 | −7.061E−02 | 1.158E−02 | −1.763E−03 | 1.449E−04 | −8.450E−06 | 3.143E−07 | −5.433E−09 |
| 18 | −2.942E+00 | −4.686E−02 | 1.150E−02 | −2.089E−03 | 2.372E−04 | −1.594E−05 | 6.789E−07 | −8.723E−09 |

The values of the respective conditional expressions are as follows:

$f1/f=0.83$ $f2/f1=-2.49$ $f12/f=1.22$ $f3/f2=8.11$ $f23/f=-1.80$ $f34/f=-77$ $D34/f=0.06$ $f56/f=1.45$ $R7f/R7r=0.92$ $R8f/R8r=1.15$ $T8/T7=1.83$ $D89/f=0.07$ $f89/f=-1.12$ $R9r/f=0.46$ $f9/f=-1.19$ $TL/f=1.20$ $TL/H$ max$=1.53$ $f/$Dep$=1.98$ $f5/f=2.81$ $f6/f=2.84$ Accordingly, the imaging lens of Numerical Data Example 3 satisfies the above-described conditional expressions.

Figure 8:
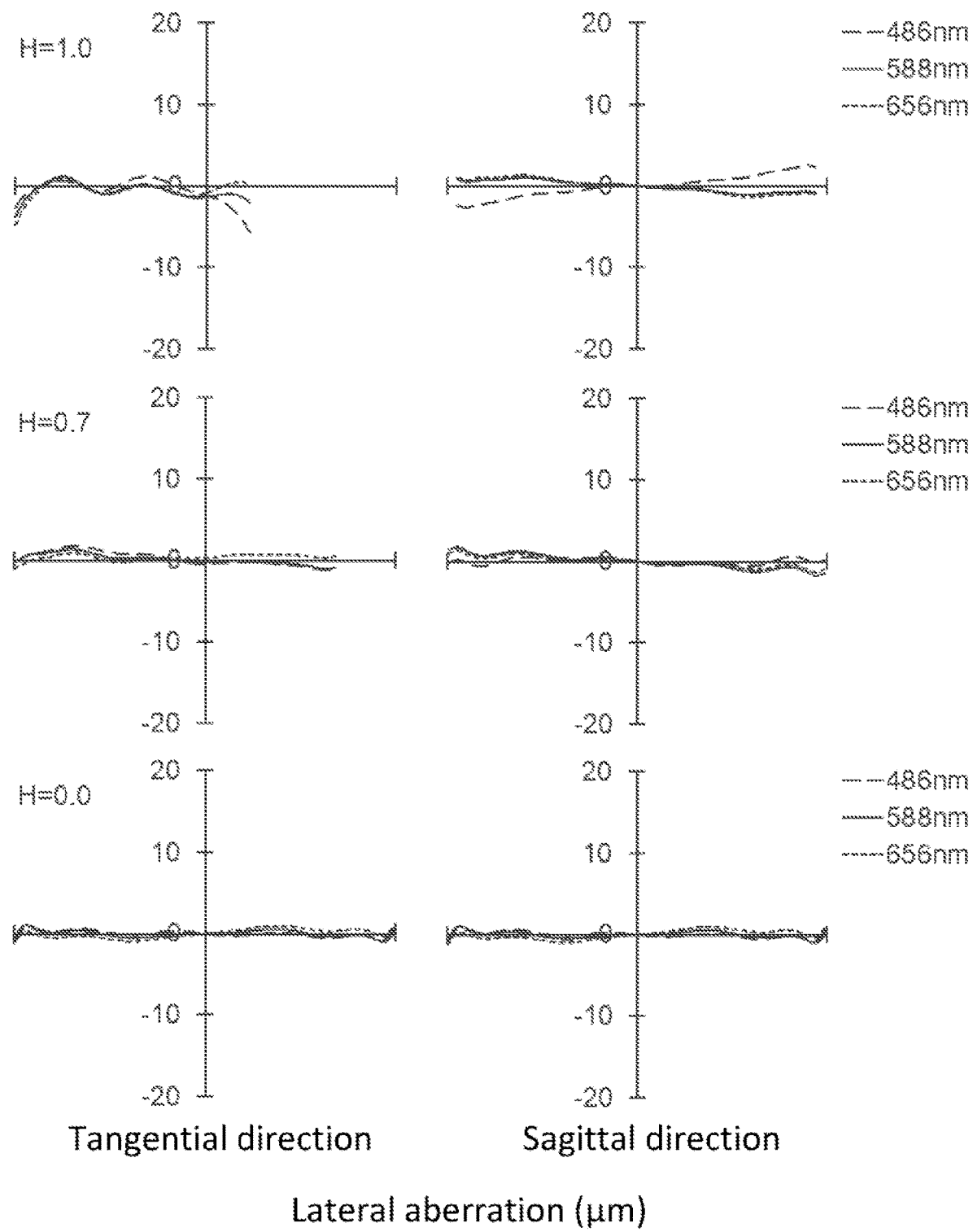
FIG. 8 is an aberration diagram showing a lateral aberration of the imaging lens of FIG. 7.
Figure 9:
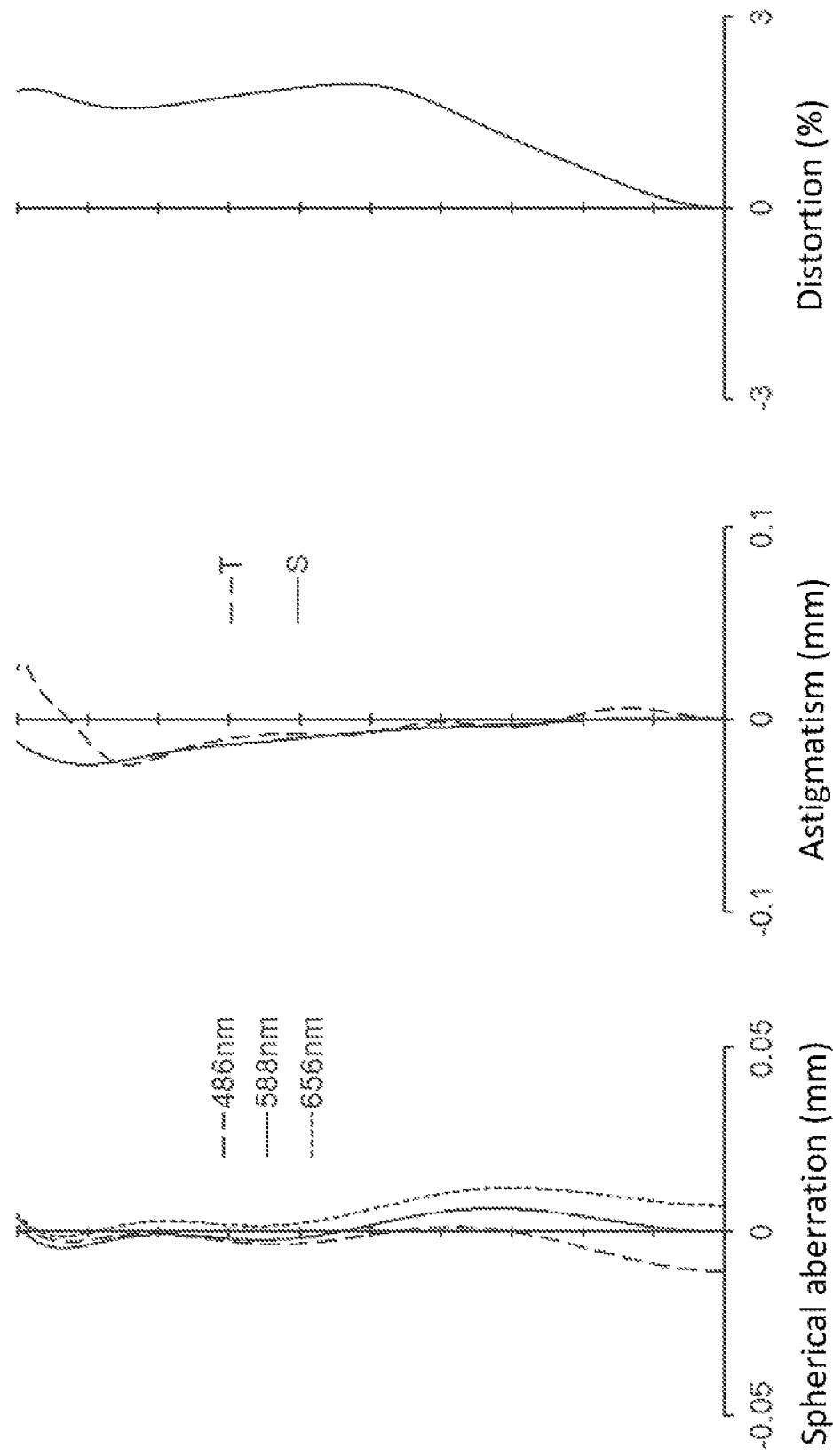
FIG. 9 is an aberration diagram showing a spherical aberration, astigmatism, and a distortion of the imaging lens of FIG. 7.
Figure 10:
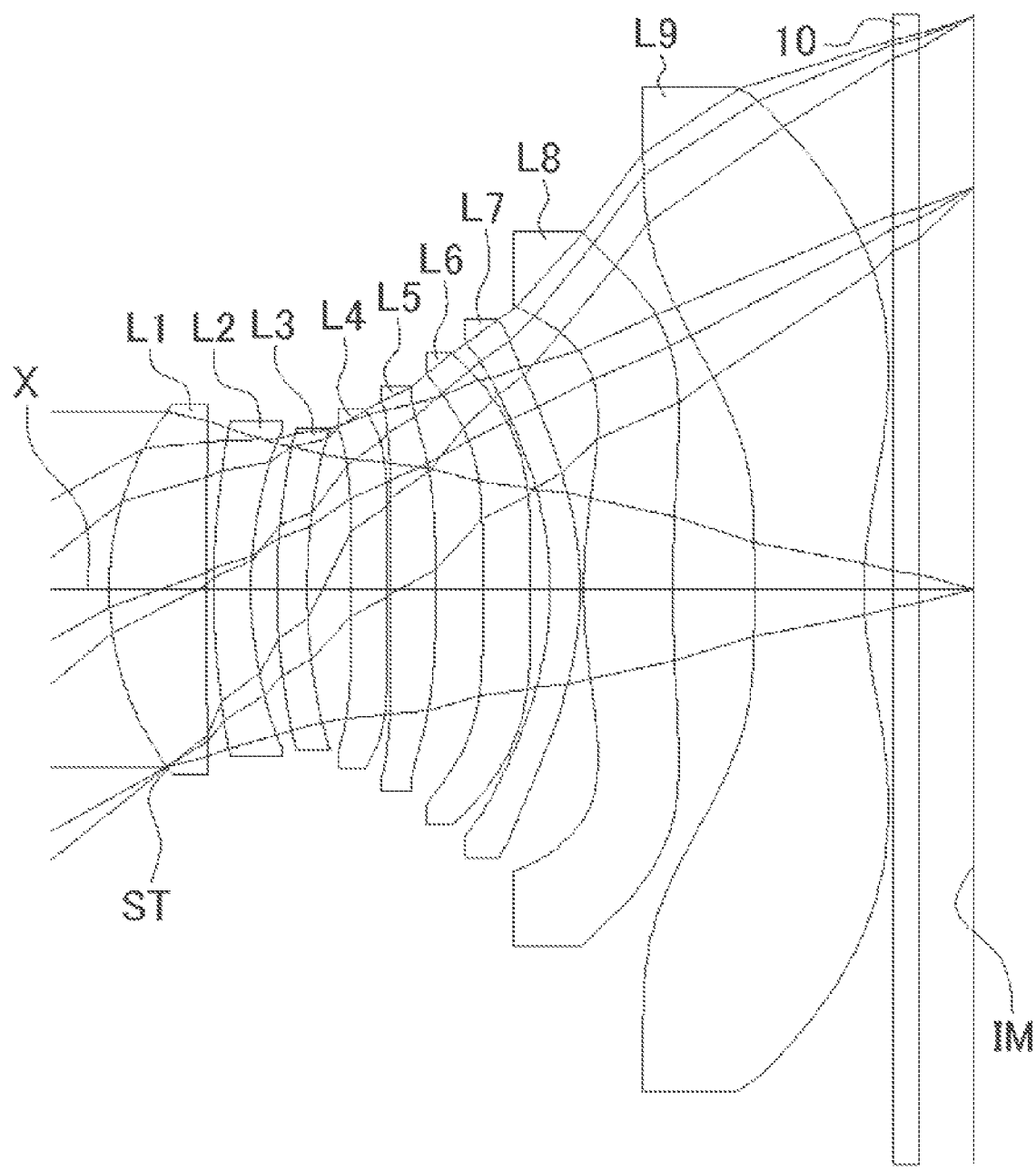
FIG. 10 is a sectional view of a schematic configuration of an imaging lens in Numerical Data Example 4 of the present invention.

FIG. 8 shows a lateral aberration that corresponds to an image height H and FIG. 9 shows a spherical aberration (mm), astigmatism (mm), and a distortion R), respectively.

As shown in FIGS. 8 and 9, according to the imaging lens of Numerical Data Example 3, the aberrations can be also satisfactorily corrected.

Numerical Data Example 4

Basic Lens Data

TABLE 7 f = 5.86 mm Fno = 2.0 ω = 36.8°

| | i | r | d | nd | vd | [mm] |
|---|---|---|---|---|---|---|
| | | ∞ | ∞ | | | |
| L1 | 1*(ST) | 2.530 | 0.805 | 1.5443 | 55.9 | f1 = 5.027 |
| | 2* | 29.731 | 0.061 | | | |
| L2 | 3* | 5.151 | 0.312 | 1.6707 | 19.2 | f2 = −13.023 |
| | 4* | 3.161 | 0.219 | | | |
| L3 | 5* | 5.393 | 0.250 | 1.6707 | 19.2 | f3 = −100.770 |
| | 6* | 4.902 | 0.365 | | | |
| L4 | 7* | 189.535 | 0.300 | 1.5443 | 55.9 | f4 = −100.320 |
| | 8* | 42.368 | 0.030 | | | |
| L5 | 9* | 29.132 | 0.379 | 1.5443 | 55.9 | f5 = 21.364 |
| | 10* | −19.264 | 0.390 | | | |
| L6 | 11* | 1271.897 | 0.396 | 1.5443 | 55.9 | f6 = −100.377 |
| | 12* | 52.379 | 0.165 | | | |
| L7 | 13* | −3.029 | 0.250 | 1.6707 | 19.2 | f7 = 102.379 |
| | 14* | −3.025 | 0.030 | | | |
| L8 | 15* | 4.354 | 0.743 | 1.5443 | 55.9 | f8 = 12.102 |
| | 16* | 12.072 | 0.678 | | | |
| L9 | 17* | 128.811 | 0.912 | 1.5443 | 55.9 | f9 = −5.249 |
| | 18* | 2.788 | 0.250 | | | |
| | 19 | ∞ | 0.210 | 1.5168 | 64.2 | |
| | 20 | ∞ | 0.453 | | | |
| (IM) | | ∞ | | | | | f12 = 7.166 mm
f23 = −11.337 mm
f34 = −50.589 mm
f56 = 26.883 mm
f89 = −13.117 mm
f123 = 7.429 mm
f456 = 36.764 mm
f789 = −15.290 mm
D34 = 0.365 mm
D89 = 0.678 mm
T7 = 0.250 mm
T8 = 0.743 mm
TL = 7.127 mm
Hmax = 4.71 mm
Dep = 2.960 mm

TABLE 8

Aspherical surface data

| i | k | A4 | A6 | A8 | A10 | A12 | A14 | A16 |
|---|---|---|---|---|---|---|---|---|
| 1 | 2.299E−01 | −5.350E−04 | −4.665E−04 | 5.749E−04 | −5.696E−04 | 2.032E−04 | −1.314E−05 | −1.000E−05 |
| 2 | 0.000E+00 | −1.785E−05 | 2.237E−02 | −1.427E−02 | 4.936E−03 | −7.523E−04 | −4.166E−05 | 1.660E−05 |
| 3 | −1.792E+01 | −2.272E−02 | 2.356E−02 | −1.354E−02 | 4.909E−03 | −9.390E−04 | 1.763E−04 | −2.667E−05 |
| 4 | −1.153E+01 | 2.111E−02 | −1.450E−02 | 1.157E−02 | −5.459E−03 | 2.056E−03 | −3.366E−04 | 1.785E−04 |
| 5 | 0.000E+00 | −5.403E−03 | −1.935E−03 | 5.235E−04 | 3.578E−04 | 1.499E−04 | 1.314E−04 | 1.230E−05 |
| 6 | 0.000E+00 | −4.776E−03 | 1.105E−04 | 7.581E−04 | 3.820E−04 | 1.756E−04 | 4.287E−05 | −2.284E−05 |
| 7 | 0.000E+00 | −1.771E−02 | −1.118E−02 | 2.232E−04 | −1.347E−04 | 4.180E−04 | 1.340E−04 | −2.559E−05 |
| 8 | 0.000E+00 | −1.104E−02 | −1.233E−02 | −1.194E−03 | 3.061E−04 | 1.997E−04 | 7.777E−05 | −7.699E−05 |
| 9 | 0.000E+00 | −1.828E−02 | −2.536E−03 | 1.514E−03 | 8.935E−05 | 5.248E−05 | −8.422E−07 | −3.091E−05 |
| 10 | 0.000E+00 | −3.625E−02 | −1.797E−04 | 1.458E−03 | 5.126E−04 | 5.902E−05 | −4.202E−05 | 9.584E−07 |
| 11 | 0.000E+00 | −4.428E−02 | −7.922E−04 | −2.418E−03 | 2.473E−05 | 3.136E−04 | 3.741E−05 | −1.846E−05 |
| 12 | 0.000E+00 | −5.702E−02 | 1.023E−02 | −2.176E−03 | −1.304E−03 | 1.126E−03 | −2.689E−04 | 2.112E−05 |
| 13 | 6.683E−01 | −8.447E−02 | 2.114E−02 | −1.227E−02 | 4.156E−03 | −6.794E−04 | 2.960E−05 | 2.383E−05 |
| 14 | −3.274E+00 | −1.553E−02 | 1.593E−02 | −8.607E−03 | 2.349E−03 | −3.051E−04 | 1.663E−05 | −4.356E−07 |
| 15 | 0.000E+00 | −2.671E−02 | 7.579E−04 | −1.326E−03 | 3.198E−04 | −5.320E−05 | 6.566E−06 | −3.865E−07 |
| 16 | 0.000E+00 | −5.475E−03 | −7.551E−04 | −5.181E−04 | 1.134E−04 | −8.081E−06 | −3.427E−08 | 2.339E−08 |
| 17 | 0.000E+00 | −6.991E−02 | 1.524E−02 | −1.781E−03 | 1.448E−04 | −8.467E−06 | 3.139E−07 | −6.420E−09 |
| 18 | −4.507E+00 | −4.529E−02 | 1.156E−02 | −2.091E−03 | 2.370E−04 | −1.594E−05 | 5.790E−07 | −6.706E−09 |

The values of the respective conditional expressions are as follows:

$f1/f=0.86$ $f2/f1=-2.59$ $f12/f=1.22$ $f3/f2=7.74$ $f23/f=-1.93$ $f34/f=-8.63$ $D34/f=0.06$ $f56/f=4.59$ $R7f/R7r=1.01$ $R8f/R8r=0.36$ $T8/T7=2.97$ $D89/f=0.12$ $f89/f=-2.24$ $R9r/f=0.48$ $f9/f=-0.90$ $TL/f=1.22$ $TL/H$ max=1.51

$f/$Dep=1.98

$f5/f=3.65$

Accordingly, the imaging lens of Numerical Data Example 4 satisfies the above-described conditional expressions.

Figure 11:
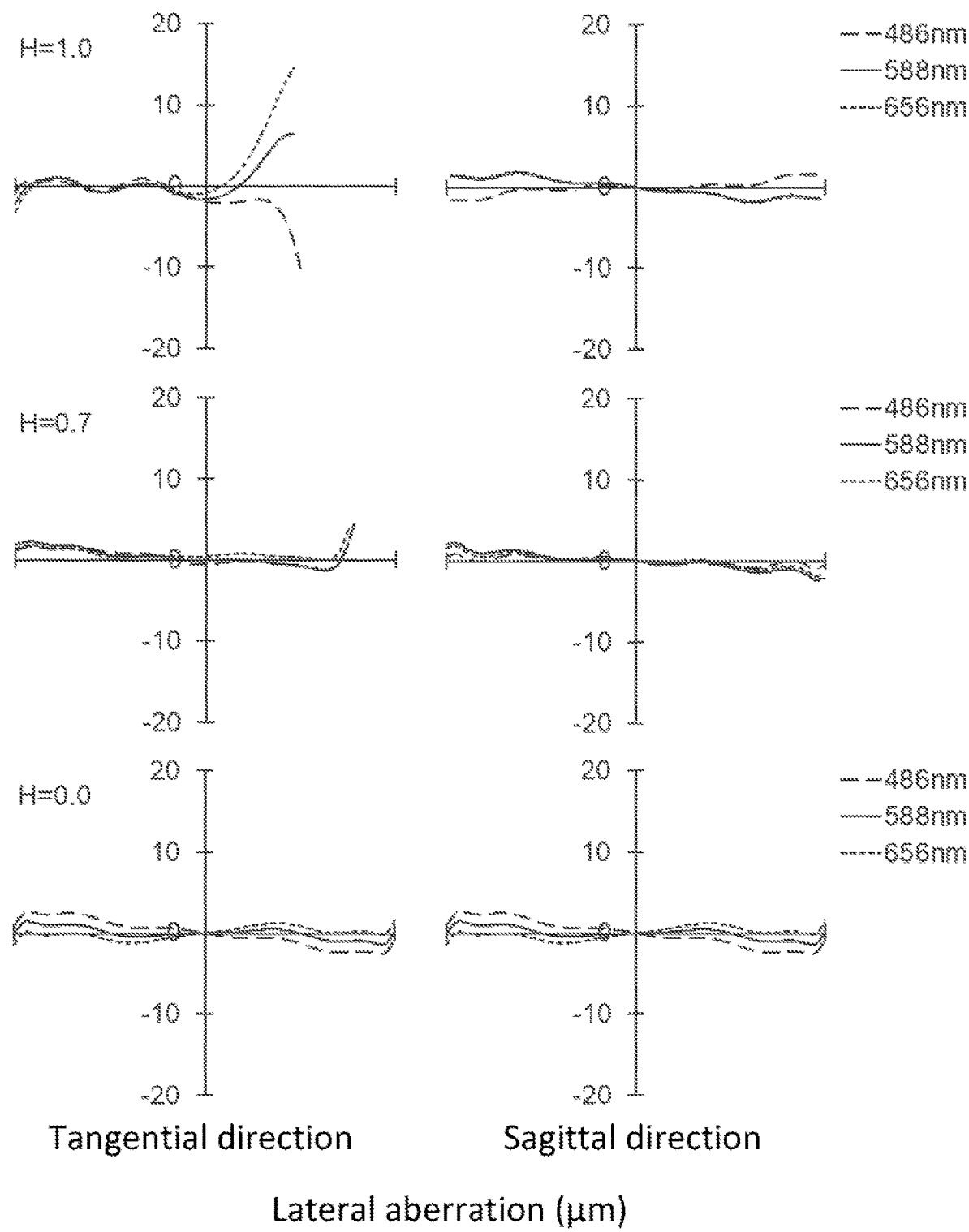
FIG. 11 is an aberration diagram showing a lateral aberration of the imaging lens of FIG. 10.
Figure 12:
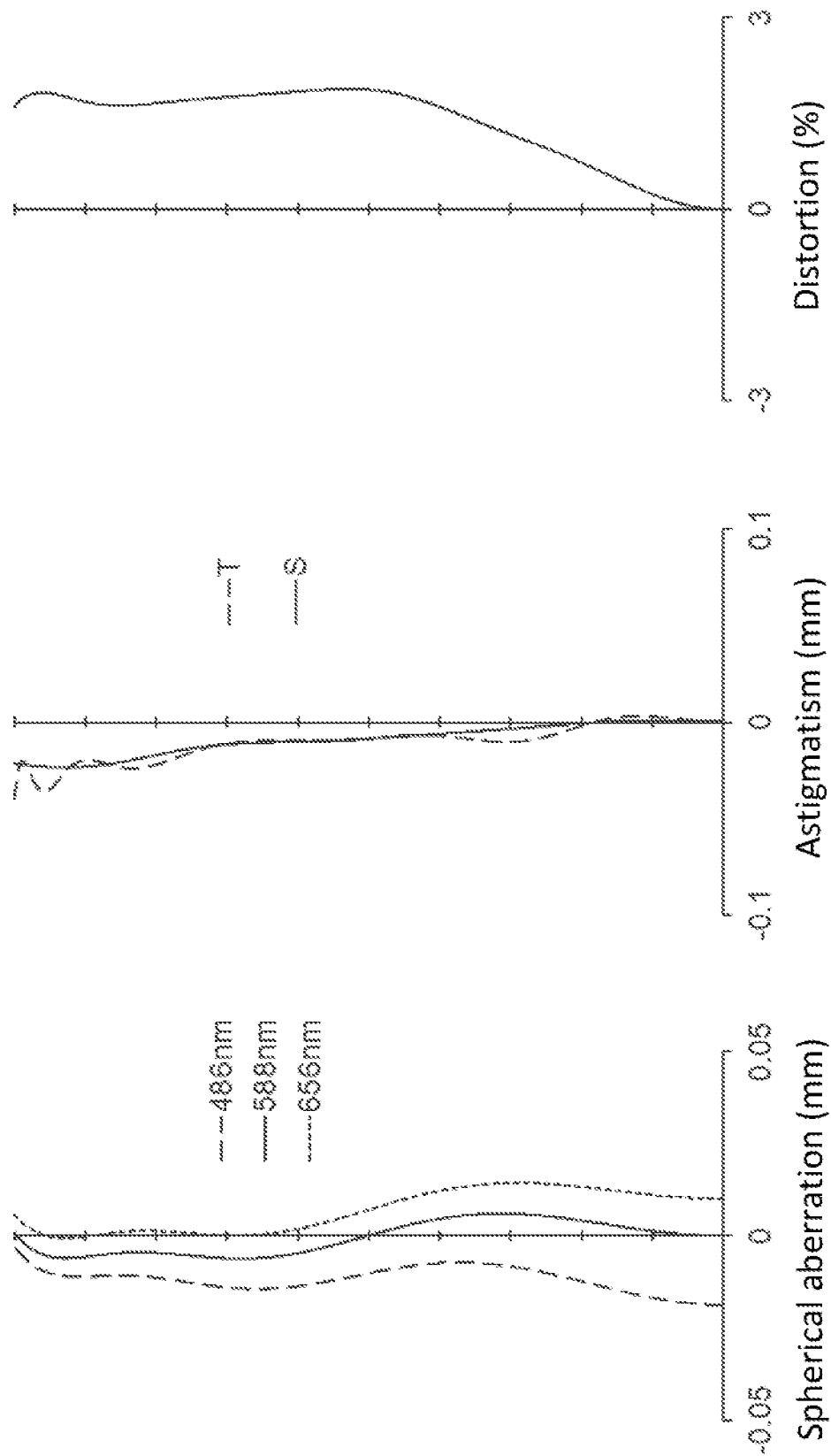
FIG. 12 is an aberration diagram showing a spherical aberration, astigmatism, and a distortion of the imaging lens of FIG. 10.
Figure 13:
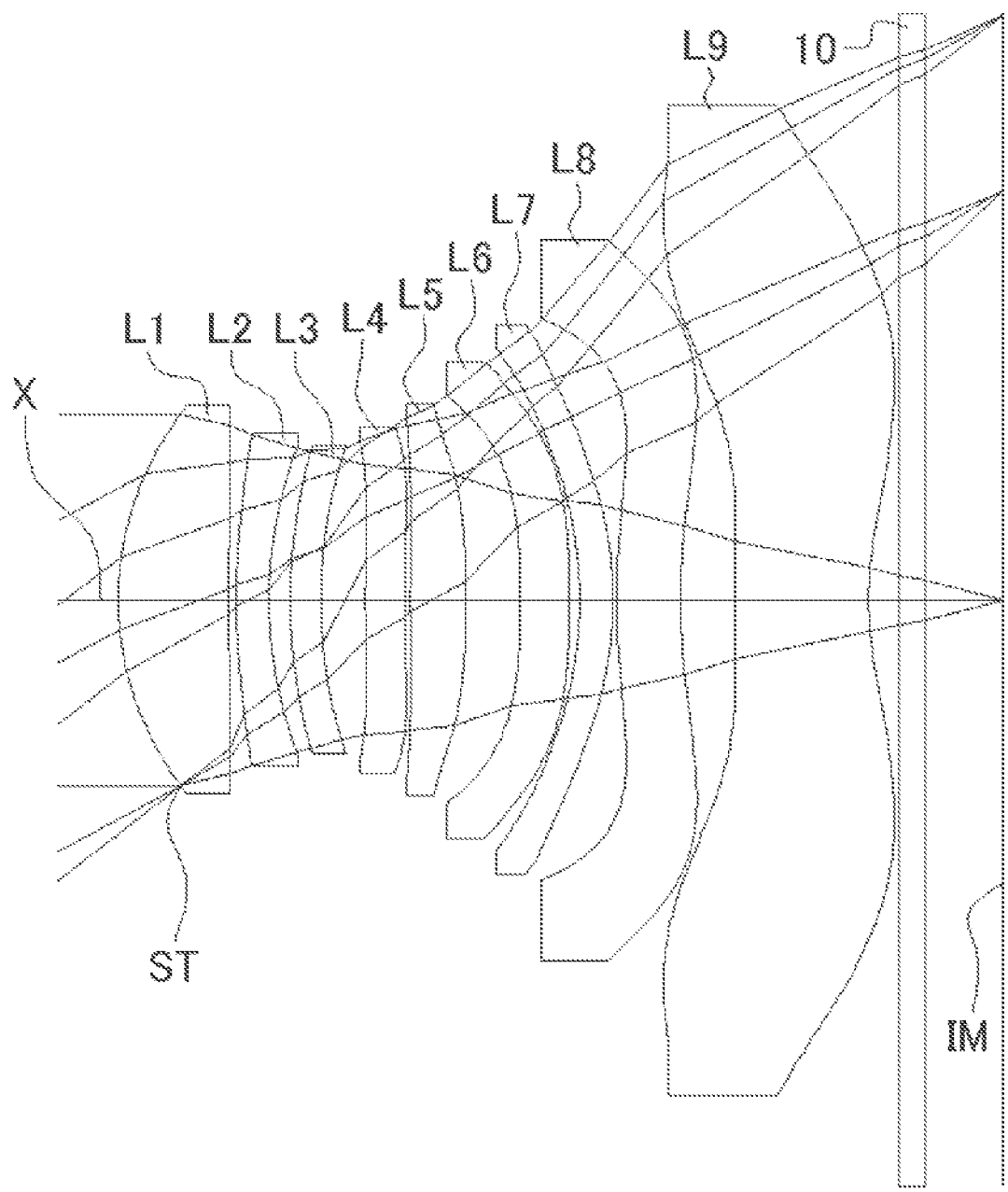
FIG. 13 is a sectional view of a schematic configuration of an imaging lens in Numerical Data Example 5 of the present invention.

FIG. 11 shows a lateral aberration that corresponds to an image height H and FIG. 12 shows a spherical aberration (mm), astigmatism (mm), and a distortion (%), respectively.

As shown in FIGS. 11 and 12, according to the imaging lens of Numerical Data Example 4, the aberrations can be also satisfactorily corrected.

Numerical Data Example 5

Basic Lens Data

TABLE 9 f = 6.03 mm Fno = 2.0 ω = 38.0°

| | i | r | d | nd | vd | [mm] |
|---|---|---|---|---|---|---|
| | | ∞ | ∞ | | | |
| L1 | 1*(ST) | 2.494 | 0.903 | 1.5443 | 55.9 | f1 = 4.888 |
| | 2* | 34.778 | 0.060 | | | |
| L2 | 3* | 5.344 | 0.267 | 1.6707 | 19.2 | f2 = −12.092 |
| | 4* | 3.157 | 0.175 | | | |
| L3 | 5* | 4.219 | 0.250 | 1.6707 | 19.2 | f3 = −100.708 |
| | 6* | 3.876 | 0.365 | | | |
| L4 | 7* | 20.760 | 0.320 | 1.5443 | 55.9 | f4 = −100.502 |
| | 8* | 14.957 | 0.047 | | | |
| L5 | 9* | 31.815 | 0.454 | 1.5443 | 55.9 | f5 = 13.206 |
| | 10* | −9.239 | 0.444 | | | |
| L6 | 11* | −9.205 | 0.402 | 1.5443 | 55.9 | f6 = −100.348 |
| | 12* | −11.242 | 0.083 | | | |
| L7 | 13* | −3.485 | 0.274 | 1.6707 | 19.2 | f7 = 28.766 |
| | 14* | −3.045 | 0.030 | | | |
| L8 | 15* | 5.979 | 0.522 | 1.5443 | 55.9 | f8 = −100.292 |
| | 16* | 5.223 | 0.439 | | | |
| L9 | 17* | 10.189 | 1.098 | 1.5443 | 55.9 | f9 = −7.353 |
| | 18* | 2.764 | 0.250 | | | |
| | 19 | ∞ | 0.210 | 1.5168 | 64.2 | |
| | 20 | ∞ | 0.635 | | | |
| (IM) | | ∞ | | | | | f12 = 7.123 mm
f23 = −10.558 mm
f34 = −50.623 mm
f56 = 15.340 mm
f89 = −6.955 mm
f123 = 7.341 mm
f456 = 18.136 mm
f789 = −9.672 mm
D34 = 0.365 mm
D89 = 0.439 mm
T7 = 0.274 mm
T8 = 0.522 mm
TL = 7.155 mm
Hmax = 4.71 mm
Dep = 3.044 mm

TABLE 10

Aspherical surface data

| i | k | A4 | A6 | A8 | A10 | A12 | A14 | A16 |
|---|---|---|---|---|---|---|---|---|
| 1 | 1.818E-01 | -1.545E-03 | -7.320E-04 | 5.620E-04 | -5.877E-04 | 1.907E-04 | -1.539E-05 | -7.938E-06 |
| 2 | 0.000E+00 | -1.851E-02 | 2.205E-02 | -1.435E-02 | 4.935E-03 | -7.476E-04 | -4.049E-05 | 1.546E-05 |
| 3 | -1.712E+01 | -2.299E-02 | 2.342E-02 | -1.350E-02 | 4.936E-03 | -9.115E-04 | 1.890E-04 | -3.769E-05 |
| 4 | -1.056E+01 | 2.236E-02 | -1.459E-02 | 1.133E-02 | -5.301E-03 | 2.233E-03 | -3.491E-04 | 1.425E-04 |
| 5 | 0.000E+00 | -5.564E-03 | -2.326E-03 | 9.238E-04 | 5.661E-04 | 2.000E-04 | 1.347E-04 | -2.143E-05 |
| 6 | 0.000E+00 | -7.083E-03 | 7.700E-04 | 1.159E-03 | 5.149E-04 | 1.904E-04 | 2.712E-05 | -2.812E-05 |
| 7 | 0.000E+00 | -1.625E-02 | -1.085E-02 | 3.261E-04 | -1.222E-04 | 4.272E-04 | 1.494E-04 | -1.624E-05 |
| 8 | 0.000E+00 | -1.220E-02 | -1.170E-02 | -1.234E-03 | 2.204E-04 | 1.755E-04 | 7.920E-05 | -7.466E-05 |
| 9 | 0.000E+00 | -1.656E-02 | -2.273E-03 | 1.724E-03 | 1.667E-04 | 6.538E-05 | -1.845E-06 | -3.022E-05 |
| 10 | 0.000E+00 | -3.563E-02 | -1.660E-04 | 1.462E-03 | 5.270E-04 | 6.627E-05 | -3.859E-05 | 2.679E-06 |
| 11 | 0.000E+00 | -5.099E-02 | 1.293E-05 | -2.388E-03 | -6.698E-05 | 2.809E-04 | 3.049E-05 | -1.984E-05 |
| 12 | 0.000E+00 | -5.933E-02 | 1.080E-02 | -2.204E-03 | -1.292E-03 | 1.128E-03 | -2.689E-04 | 2.077E-05 |
| 13 | 8.763E-01 | -4.459E-02 | 2.083E-02 | -1.226E-02 | 4.150E-03 | -6.803E-04 | 2.865E-05 | 2.392E-06 |
| 14 | -2.987E+00 | -1.518E-02 | 1.583E-02 | -8.539E-03 | 2.349E-03 | -3.059E-04 | 1.687E-05 | -4.442E-07 |
| 15 | 0.000E+00 | -1.838E-02 | -1.437E-03 | -1.078E-03 | 3.153E-04 | -5.729E-05 | 5.580E-06 | -3.283E-07 |
| 16 | 0.000E+00 | -1.635E-02 | 1.874E-04 | -5.227E-04 | 1.099E-04 | -8.307E-06 | -2.986E-03 | 2.543E-08 |
| 17 | 0.000E+00 | -7.074E-02 | 1.518E-02 | -1.783E-03 | 1.449E-04 | -8.449E-06 | 3.144E-07 | -5.416E-09 |
| 18 | -3.601E+00 | -4.739E-02 | 1.153E-02 | -2.086E-03 | 2.373E-04 | -1.594E-05 | 5.768E-07 | -8.744E-09 |

The values of the respective conditional expressions are as follows:

$f1/f=0.81$ $f2/f1=-2.47$ $f12/f=1.18$ $f3/f2=8.33$ $f23/f=-1.75$ $f34/f=-8.40$ $D34/f=0.06$ $f56/f=2.55$ $R7f/R7r=1.14$ $R8f/R8r=1.14$ $T8/T7=1.91$ $D89/f=0.07$ $f89/f=-1.15$ $R9r/f=0.46$ $f9/f=-1.22$ $TL/f=1.19$ $TL/H\,max=1.52$ $f/Dep=1.98$ $f5/f=2.19$ Accordingly, the imaging lens of Numerical Data Example 5 satisfies the above-described conditional expressions.

Figure 14:
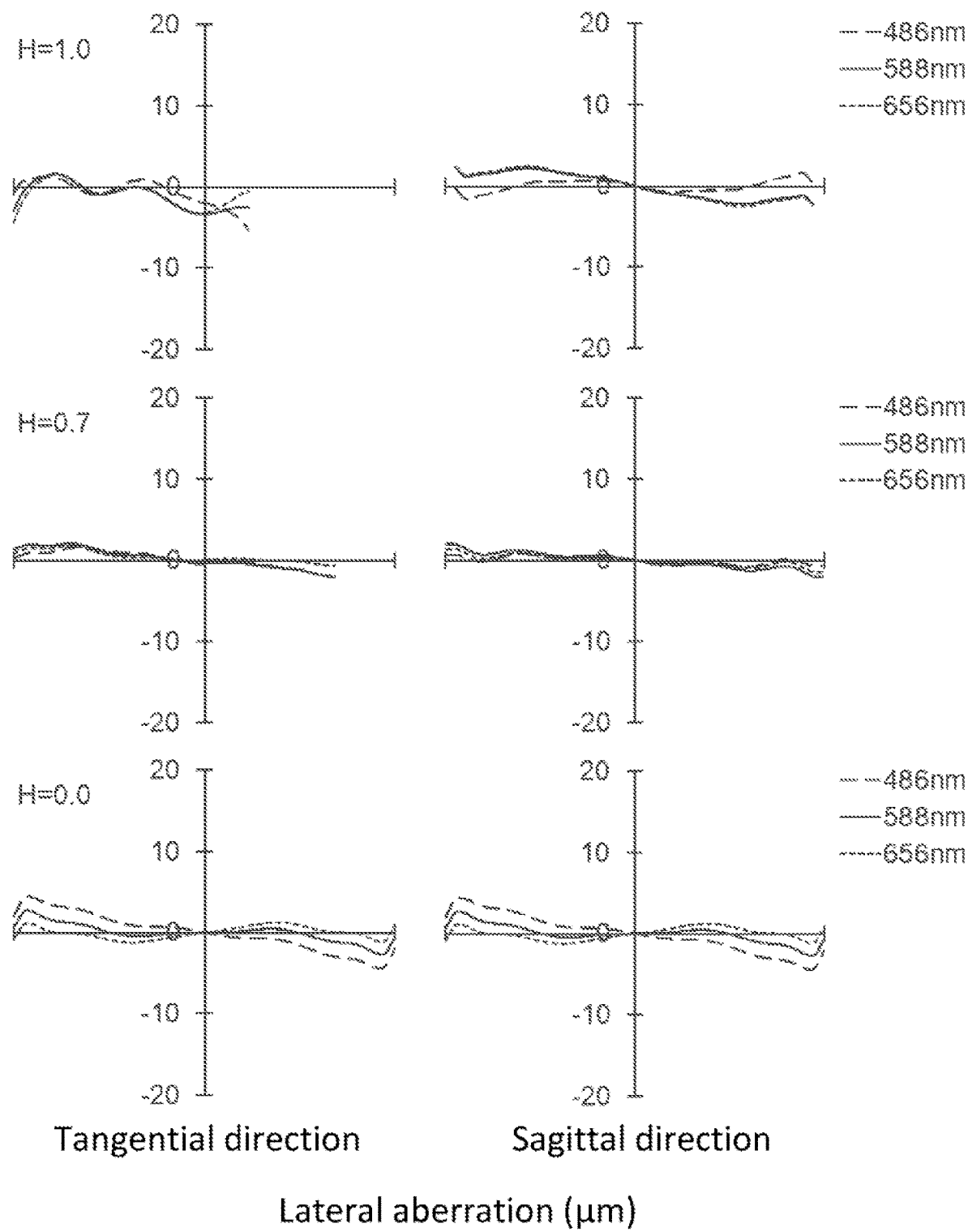
FIG. 14 is an aberration diagram showing a lateral aberration of the imaging lens of FIG. 13.
Figure 15:
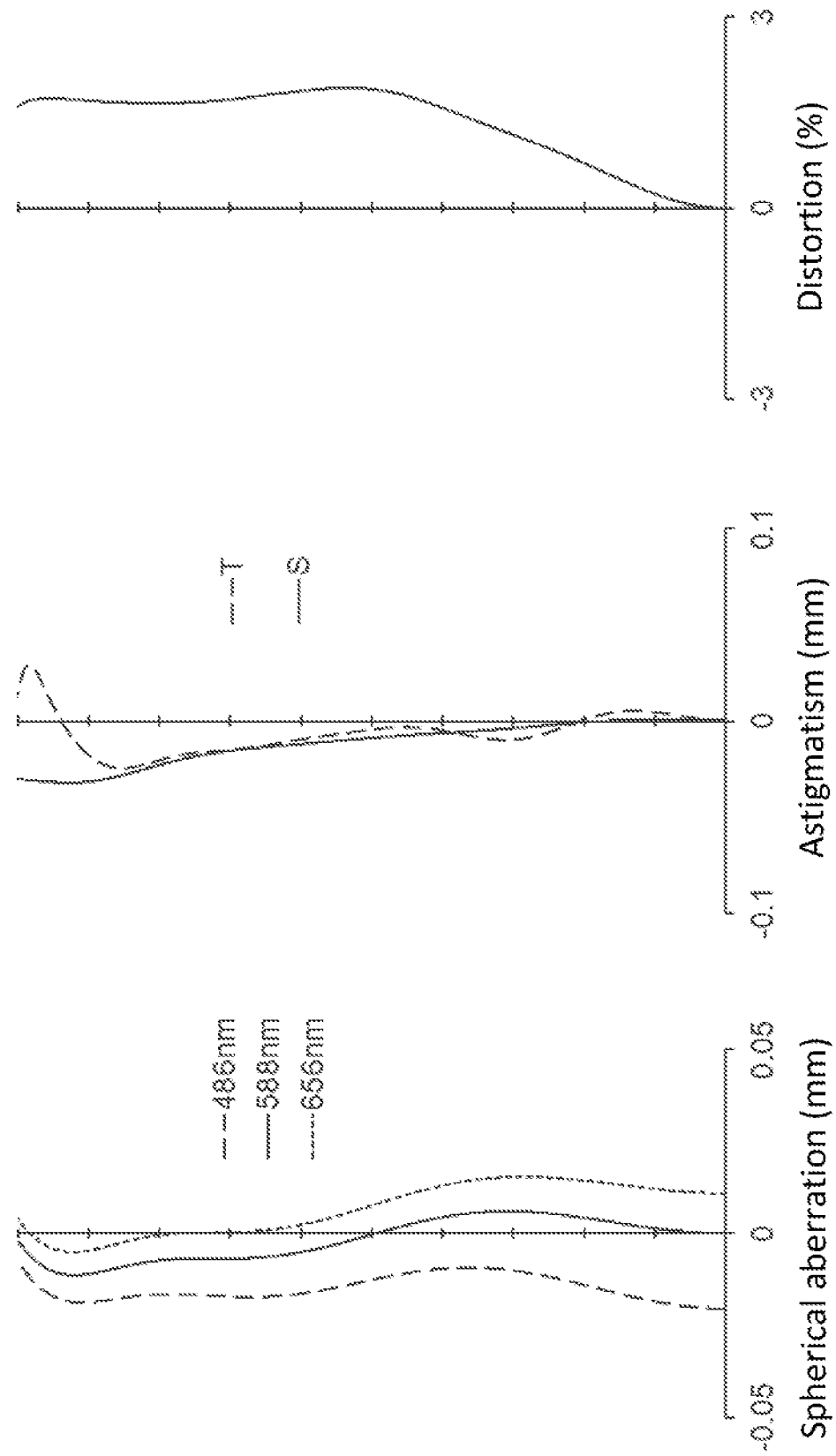
FIG. 15 is an aberration diagram showing a spherical aberration, astigmatism, and a distortion of the imaging lens of FIG. 13.
Figure 16:
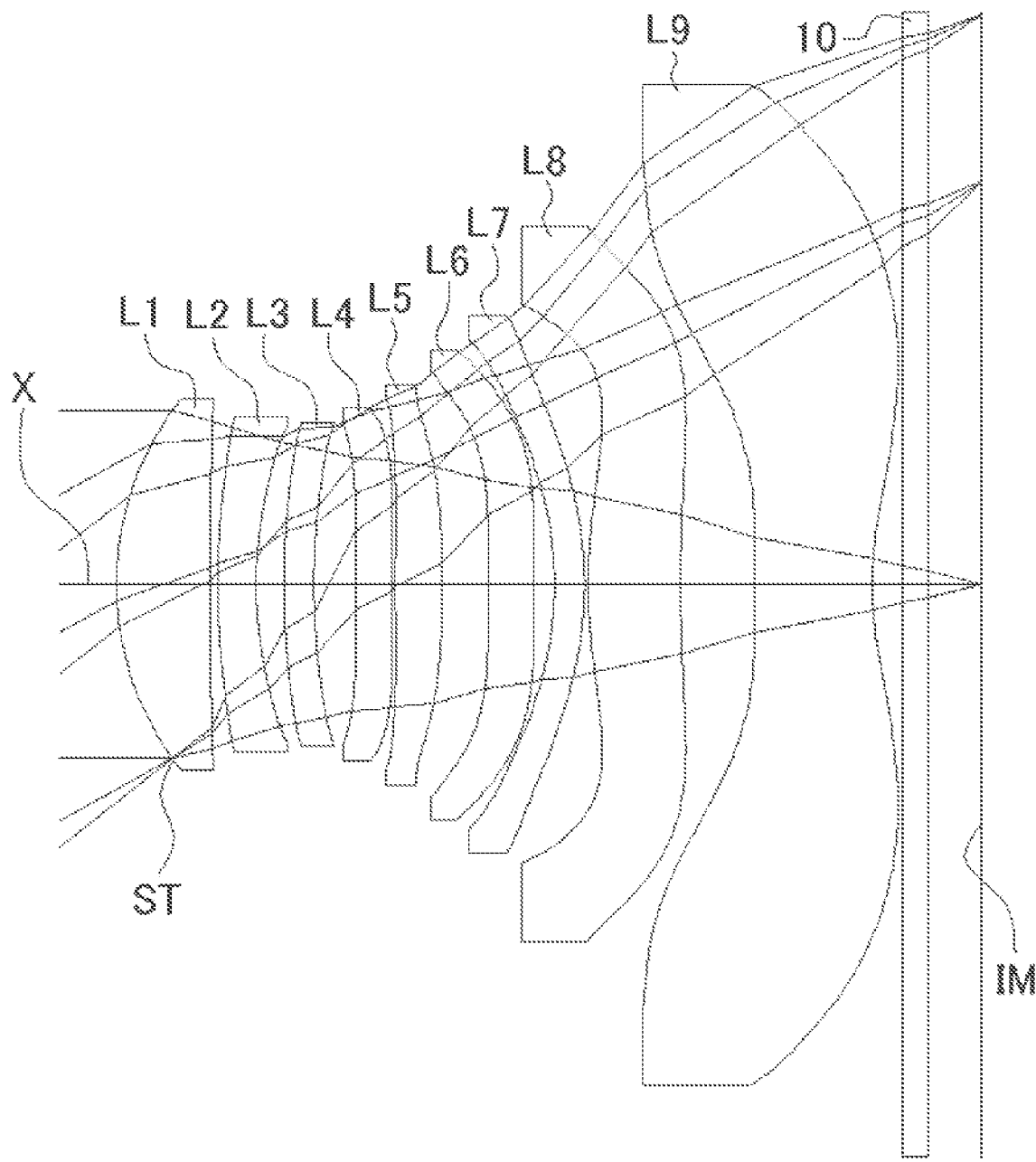
FIG. 16 is a sectional view of a schematic configuration of an imaging lens in Numerical Data Example 6 of the present invention.

FIG. 14 shows a lateral aberration that corresponds to an image height H and FIG. 15 shows a spherical aberration (mm), astigmatism (mm), and a distortion ( ), respectively.

As shown in FIGS. 14 and 15, according to the imaging lens of Numerical Data Example 5, the aberrations can be also satisfactorily corrected.

Numerical Data Example 6

Basic Lens Data

TABLE 11 f = 5.88 mm Fno = 2.0 ω = 38.3°

| | i | r | d | nd | vd | [mm] |
|---|---|---|---|---|---|---|
| | | ∞ | ∞ | | | |
| L1 | 1*(ST) | 2.520 | 0.779 | 1.5443 | 65.9 | f1 = 4.983 |
| | 2* | 30.841 | 0.061 | | | |
| L2 | 3* | 5.199 | 0.322 | 1.6707 | 19.2 | f2 = -13.163 |
| | 4* | 3.192 | 0.232 | | | |
| L3 | 5* | 6.256 | 0.250 | 1.6707 | 19.2 | f3 = -100.852 |
| | 6* | 5.634 | 0.353 | | | |
| L4 | 7* | 1465.518 | 0.300 | 1.5443 | 55.9 | f4 = -100.340 |
| | 8* | 52.649 | 0.029 | | | |
| L5 | 9* | 34.457 | 0.387 | 1.5443 | 55.9 | f5 = 18.663 |
| | 10* | -14.348 | 0.388 | | | |
| L6 | 11* | -420.304 | 0.384 | 1.5443 | 55.9 | f6 = -100.572 |
| | 12* | 62.959 | 0.168 | | | |
| L7 | 13* | -2.961 | 0.250 | 1.6707 | 19.2 | f7 = -100.541 |
| | 14* | -3.224 | 0.030 | | | |
| L8 | 15* | 4.309 | 0.774 | 1.5443 | 65.9 | f8 = 11.210 |
| | 16* | 13.735 | 0.616 | | | |
| L9 | 17* | 127.049 | 0.983 | 1.5443 | 55.9 | f9 = -5.321 |
| | 18* | 2.824 | 0.250 | | | |
| | 19 | ∞ | 0.210 | 1.5168 | 64.2 | |
| | 20 | ∞ | 0.450 | | | |
| (IM) | | ∞ | | | | | f12 = 7.056 mm
f23 = -11.487 mm
f34 = -50.565 mm
f56 = 22.727 mm
f89 = -15.253 mm
f123 = 7.328 mm
f456 = 29.365 mm
f789 = -12.302 mm
D34 = 0.353 mm
D89 = 0.616 mm
T7 = 0.250 mm
T8 = 0.774 mm
TL = 7.145 mm
Hmax = 4.65 mm
Dep = 2.897 mm

TABLE 12

Aspherical surface data

| i | k | A4 | A6 | A8 | A10 | A12 | A14 | A16 |
|---|---|---|---|---|---|---|---|---|
| 1 | 2.359E−01 | −4.735E−04 | −4.184E−04 | 5.773E−04 | −5.665E−04 | 2.054E−04 | −1.219E−05 | −1.030E−06 |
| 2 | 0.000E+00 | −1.781E−02 | 2.246E−02 | −1.424E−02 | 4.937E−03 | −7.538E−04 | −4.167E−05 | 1.767E−05 |
| 3 | −1.816E+01 | −2.277E−02 | 2.348E−02 | −1.360E−02 | 4.899E−03 | −9.401E−04 | 1.751E−04 | −2.494E−05 |
| 4 | −1.162E+01 | 2.104E−02 | −1.432E−02 | 1.168E−02 | −5.501E−03 | 1.998E−03 | −3.983E−04 | 1.990E−04 |
| 5 | 0.000E+00 | −5.065E−03 | −1.621E−03 | 5.205E−04 | 3.474E−04 | 1.563E−04 | 1.331E−04 | −1.806E−06 |
| 6 | 0.000E+00 | −4.776E−03 | −3.422E−05 | 7.222E−04 | 3.895E−04 | 1.813E−04 | 4.494E−05 | −1.915E−05 |
| 7 | 0.000E+00 | −1.765E−02 | −1.120E−02 | 4.364E−05 | −2.128E−04 | 4.111E−04 | 1.460E−04 | −1.651E−05 |
| 8 | 0.000E+00 | −1.120E−02 | −1.252E−02 | −1.325E−03 | 2.591E−04 | 1.849E−04 | 7.335E−05 | −7.731E−05 |
| 9 | 0.000E+00 | −1.815E−02 | −2.606E−03 | 1.489E−03 | 8.009E−05 | 6.011E−05 | −3.984E−07 | −3.040E−05 |
| 10 | 0.000E+00 | −3.678E−02 | 9.728E−05 | 1.481E−03 | 5.128E−04 | 6.294E−05 | −3.862E−05 | 2.785E−06 |
| 11 | 0.000E+00 | −4.536E−02 | −1.000E−03 | −2.482E−03 | 1.971E−05 | 3.159E−04 | 3.886E−05 | −1.790E−05 |
| 12 | 0.000E+00 | −6.524E−02 | 1.008E−02 | −2.172E−03 | −1.305E−03 | 1.123E−03 | −2.895E−04 | 2.099E−05 |
| 13 | 6.137E−01 | −6.764E−02 | 2.134E−02 | −1.227E−02 | 4.152E−03 | −6.804E−04 | 2.918E−05 | 2.303E−06 |
| 14 | −3.108E+00 | −1.594E−02 | 1.589E−02 | −8.479E−03 | 2.353E−03 | −3.060E−04 | 1.674E−05 | −4.796E−07 |
| 15 | 0.000E+00 | −2.833E−02 | 1.091E−03 | −1.408E−03 | 3.125E−04 | −5.304E−05 | 5.681E−06 | −3.522E−07 |
| 16 | 0.000E+00 | −4.972E−03 | −8.972E−04 | −5.189E−04 | 1.141E−04 | −7.999E−06 | −2.986E−08 | 2.332E−08 |
| 17 | 0.000E+00 | −6.990E−02 | 1.525E−02 | −1.781E−03 | 1.448E−04 | −8.461E−06 | 3.136E−07 | −6.434E−09 |
| 18 | −4.288E+00 | −4.503E−02 | 1.155E−02 | −2.092E−03 | 2.370E−04 | −1.595E−05 | 5.789E−07 | −8.704E−09 |

The values of the respective conditional expressions are as follows:

$f1/f = 0.85$ $f2/f1 = -2.64$ $f12/f = 1.20$ $f3/f2 = 7.65$ $f23/f = -1.95$ $f34/f = -8.60$ $D34/f = 0.06$ $f56/f = 3.86$ $R7f/R7r = 0.92$ $R8f/R8r = 0.31$ $T8/T7 = 3.09$ $D89/f = 0.10$ $f89/f = -2.59$ $R9r/f = 0.48$ $f9/f = -0.90$ $TL/f = 1.21$ $TL/H\ max = 1.54$ $f/Dep = 2.03$ $f5/f = 3.17$ Accordingly, the imaging lens of Numerical Data Example 6 satisfies the above-described conditional expressions.

Figure 17:
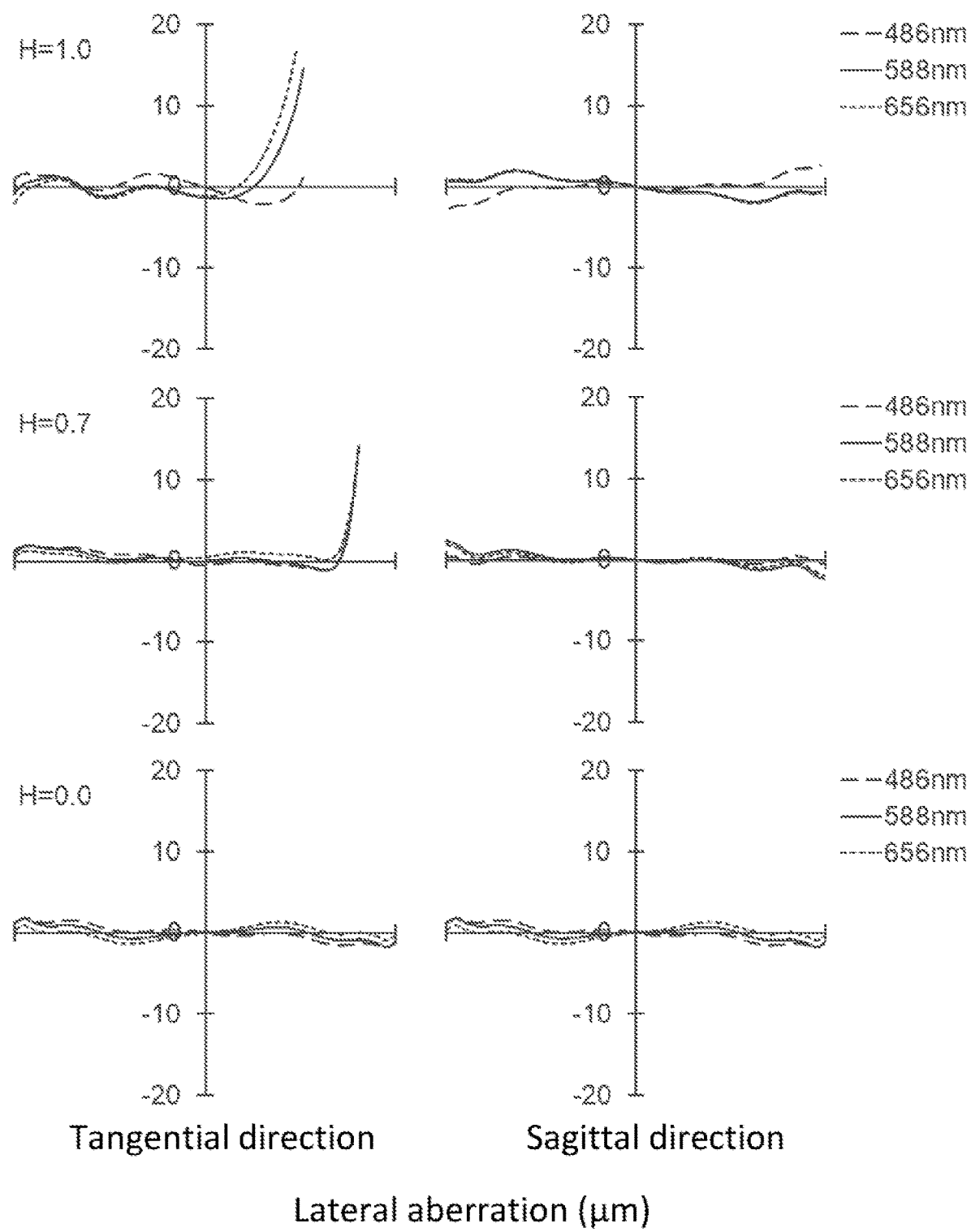
FIG. 17 is an aberration diagram showing a lateral aberration of the imaging lens of FIG. 16.
Figure 18:
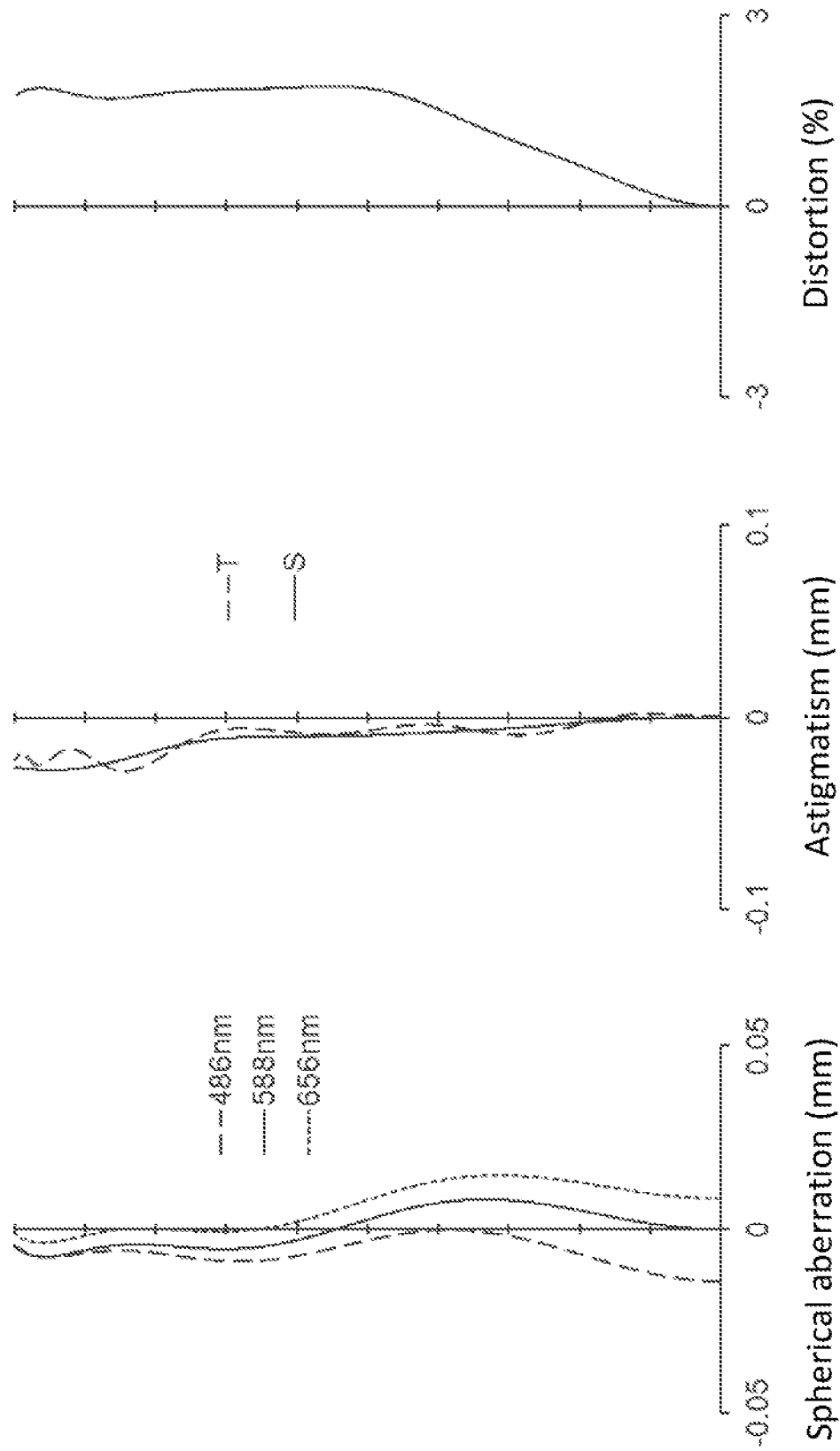
FIG. 18 is an aberration diagram showing a spherical aberration, astigmatism, and a distortion of the imaging lens of FIG. 16.
Figure 19:
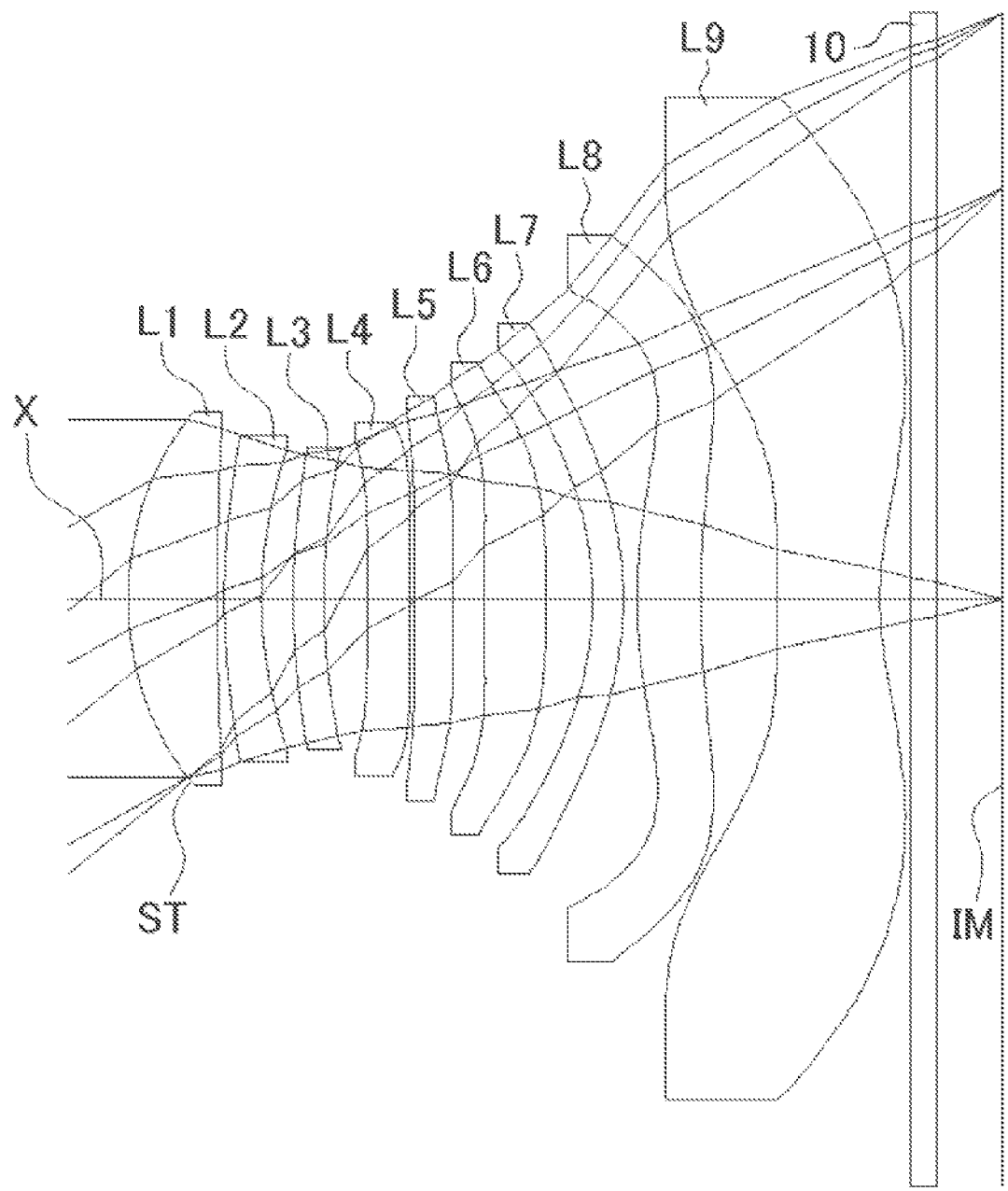
FIG. 19 is a sectional view of a schematic configuration of an imaging lens in Numerical Data Example 7 of the present invention.

FIG. 17 shows a lateral aberration that corresponds to an image height H and FIG. 18 shows a spherical aberration (mm), astigmatism (mm) and a distortion (%), respectively.

As shown in FIGS. 17 and 18, according to the imaging lens of Numerical Data Example 6, the aberrations can be also satisfactorily corrected.

Numerical Data Example 7

Basic Lens Data

TABLE 13 f = 5.78 mm Fno = 2.0 ω = 39.1°

| | i | r | d | nd | vd | [mm] |
|---|---|---|---|---|---|---|
| | | ∞ | ∞ | | | |
| L1 | 1*(ST) | 2.507 | 0.726 | 1.5443 | 55.9 | f1 = 5.153 |
| | 2* | 21.214 | 0.056 | | | |
| L2 | 3* | 5.069 | 0.306 | 1.6707 | 19.2 | f2 = −14.050 |
| | 4* | 3.216 | 0.259 | | | |
| L3 | 5* | 5.903 | 0.250 | 1.6707 | 19.2 | f3 = −96.578 |
| | 6* | 5.318 | 0.353 | | | |
| L4 | 7* | 139.911 | 0.345 | 1.5443 | 55.9 | f4 = −100.334 |
| | 8* | 39.246 | 0.038 | | | |
| L5 | 9* | 54.056 | 0.318 | 1.5443 | 55.9 | f5 = −100.330 |
| | 10* | 27.109 | 0.251 | | | |
| L6 | 11* | 12.991 | 0.513 | 1.5443 | 55.9 | f6 = 11.236 |
| | 12* | −11.396 | 0.376 | | | |
| L7 | 13* | −2.926 | 0.250 | 1.6707 | 19.2 | f7 = 102.337 |
| | 14* | −2.903 | 0.114 | | | |
| L8 | 15* | 4.149 | 0.520 | 1.5443 | 65.9 | f8 = 16.242 |
| | 16* | 7.475 | 0.629 | | | |
| L9 | 17* | −111.096 | 0.833 | 1.5443 | 55.9 | f9 = −4.939 |
| | 18* | 2.762 | 0.250 | | | |
| | 19 | ∞ | 0.210 | 1.5168 | 64.2 | |
| | 20 | ∞ | 0.539 | | | |
| (IM) | | ∞ | | | | | f12 = 7.229 mm
f23 = −12.076 mm
f34 = −49.456 mm
f56 = 12.622 mm
f89 = −8.506 mm
f123 = 7.535 mm
f456 = 14.338 mm
f789 = −9.220 mm
D34 = 0.353 mm
D89 = 0.629 mm
T7 = 0.250 mm
T8 = 0.520 mm
TL = 7.064 mm
Hmax = 4.71 mm
Dep = 2.922 mm

TABLE 14

Aspherical surface data

| i | k | A4 | A6 | A8 | A10 | A12 | A14 | A16 |
|---|---|---|---|---|---|---|---|---|
| 1 | 2.662E−01 | 1.637E−04 | −2.965E−04 | 6.088E−04 | −5.496E−04 | 2.122E−04 | −1.305E−05 | −1.284E−05 |
| 2 | 0.000E+00 | −1.735E−02 | 2.251E−02 | −1.426E−02 | 4.923E−03 | −7.586E−04 | −4.270E−05 | 1.949E−05 |
| 3 | −1.738E+01 | −2.214E−02 | 2.376E−02 | −1.356E−02 | 4.892E−03 | −9.501E−04 | 1.737E−04 | −1.479E−05 |
| 4 | −1.214E+01 | 2.048E−02 | −1.422E−02 | 1.178E−02 | −5.531E−03 | 1.969E−03 | −4.031E−04 | 1.822E−04 |
| 5 | 0.000E+00 | −6.057E−03 | −2.176E−03 | 2.525E−04 | 2.368E−04 | 9.432E−05 | 9.830E−05 | −1.411E−06 |
| 6 | 0.000E+00 | −3.276E−03 | −2.231E−04 | 4.881E−04 | 2.740E−04 | 1.281E−04 | 2.719E−05 | −1.947E−05 |
| 7 | 0.000E+00 | −2.189E−02 | −1.030E−02 | 8.650E−05 | −4.172E−04 | 2.887E−04 | 1.142E−04 | −1.340E−05 |
| 8 | 0.000E+00 | −7.859E−03 | −1.225E−02 | −1.505E−03 | 2.254E−04 | 2.009E−04 | 6.641E−05 | −7.056E−05 |
| 9 | 0.000E+00 | −1.625E−02 | −2.674E−03 | 1.554E−03 | 7.605E−05 | 4.541E−05 | 1.933E−06 | −2.471E−05 |
| 10 | 0.000E+00 | −4.544E−02 | 1.287E−04 | 1.474E−03 | 4.704E−04 | 4.789E−05 | −4.085E−05 | 3.447E−06 |
| 11 | 0.000E+00 | −4.179E−02 | −1.771E−04 | 2.483E−03 | 1.438E−05 | 3.191E−04 | 4.107E−05 | −1.703E−05 |
| 12 | 0.000E+00 | −5.288E−02 | 1.031E−02 | −2.150E−03 | −1.283E−03 | 1.131E−03 | −2.677E−04 | 2.131E−05 |
| 13 | 6.353E−01 | −1.137E−02 | 2.138E−02 | −1.220E−02 | 4.164E−03 | −6.787E−04 | 2.955E−05 | 2.363E−06 |
| 14 | −3.600E+00 | −1.746E−02 | 1.545E−02 | −8.549E−03 | 2.351E−03 | −3.049E−04 | 1.708E−05 | −4.098E−07 |
| 15 | 0.000E+00 | −1.940E−02 | −1.369E−04 | −1.221E−03 | 3.278E−04 | −5.499E−05 | 5.501E−06 | −2.570E−07 |
| 16 | 0.000E+00 | −6.471E−03 | −8.918E−04 | −5.327E−04 | 1.131E−04 | −8.039E−06 | −2.867E−08 | 2.386E−08 |
| 17 | 0.000E+00 | −6.899E−02 | 1.525E−02 | −1.783E−03 | 1.447E−04 | −8.463E−06 | 3.139E−07 | −5.373E−09 |
| 18 | −4.916E+00 | −4.480E−02 | 1.154E−02 | −2.091E−03 | 2.371E−04 | −1.594E−05 | 5.790E−07 | −8.708E−09 |

The values of the respective conditional expressions are as follows:

$f1/f=0.89$ $f2/f1=-2.73$ $f12/f=1.25$ $f3/f2=6.87$ $f23/f=-2.09$ $f34/f=-8.55$ $D34/f=0.06$ $f56/f=2.18$ $R8f/R8r=0.56$ $T8/T7=2.08$ $D89/f=0.11$ $f89/f=-1.47$ $R9r/f=0.48$ $f9/f=-0.85$ $TL/f=1.22$ $TL/H\text{ max}=1.50$ $f/\text{Dep}=1.98$ $f6/f=1.94$ Accordingly, the imaging lens of Numerical Data Example 7 satisfies the above-described conditional expressions.

Figure 20:
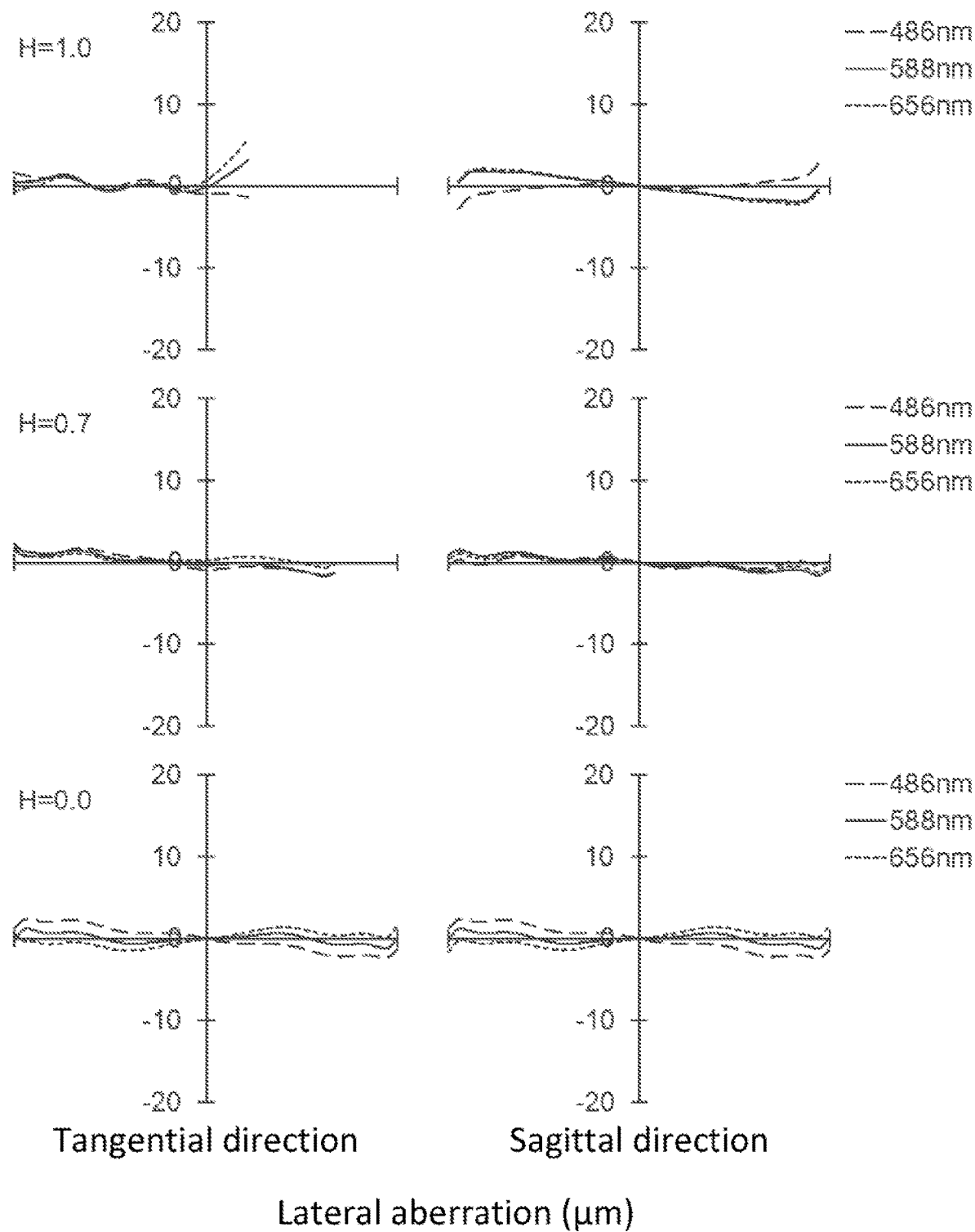
FIG. 20 is an aberration diagram showing a lateral aberration of the imaging lens of FIG. 19.
Figure 21:
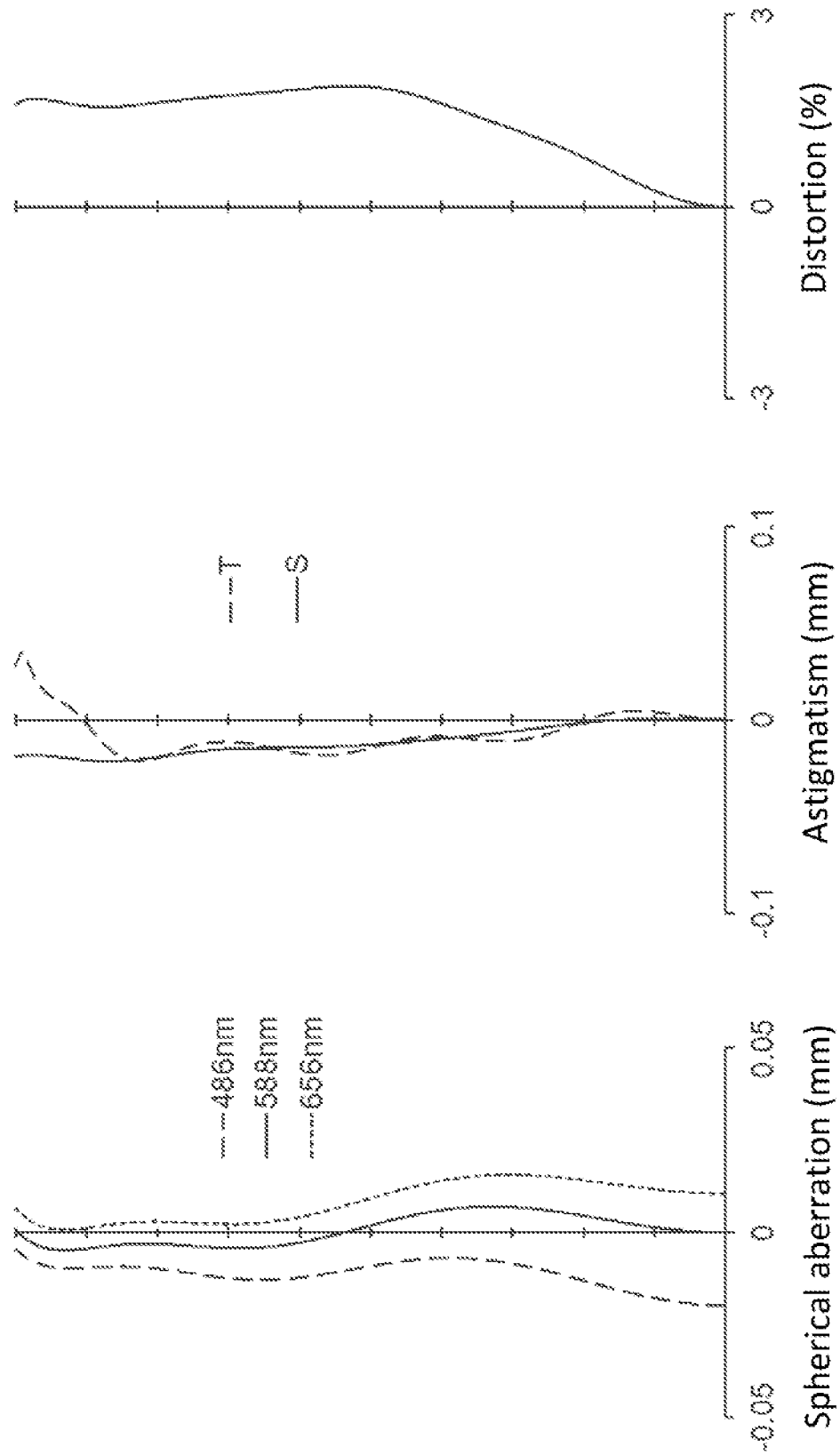
FIG. 21 is an aberration diagram showing a spherical aberration, astigmatism, and a distortion of the imaging lens of FIG. 19.
Figure 22:
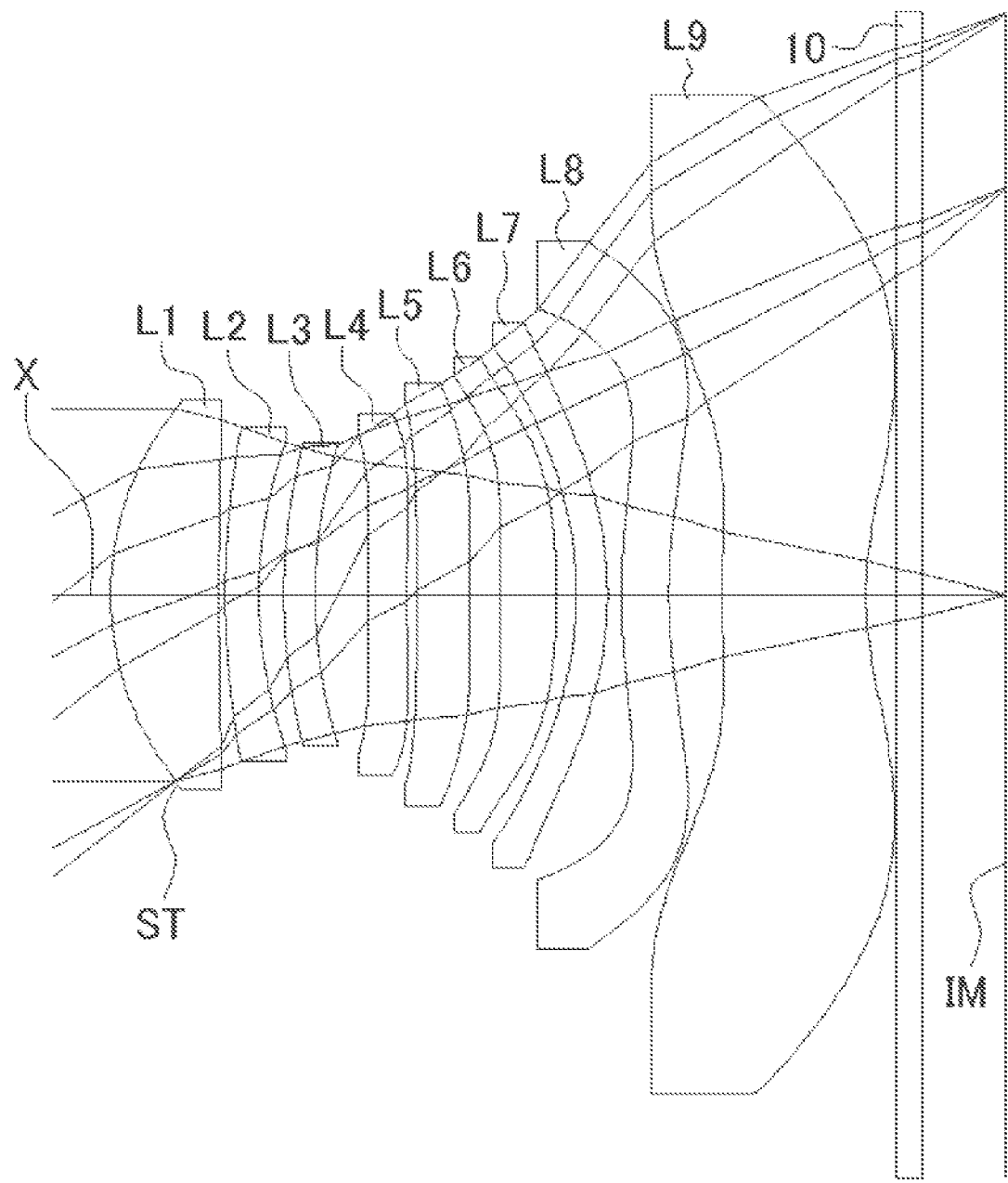
FIG. 22 is a sectional view of a schematic configuration of an imaging lens in Numerical Data Example 8 of the present invention.

FIG. 20 shows a lateral aberration that corresponds to an image height H and FIG. 21 shows a spherical aberration (mm), astigmatism (mm), and a distortion (%), respectively.

As shown in FIGS. 20 and 21, according to the imaging lens of Numerical Data Example 7, the aberrations can be also satisfactorily corrected.

Numerical Data Example 8

Basic Lens Data

TABLE 15 f = 6.06 mm  Fno = 2.0  ω = 37.8°

| | i | r | d | nd | vd | [mm] |
|---|---|---|---|---|---|---|
| | | ∞ | ∞ | | | |
| L1 | 1*(ST) | 2.470 | 0.888 | 1.5443 | 55.9 | f1 = 4.911 |
| | 2* | 28.322 | 0.050 | | | |
| L2 | 3* | 5.609 | 0.277 | 1.6707 | 19.2 | f2 = −12.777 |
| | 4* | 3.323 | 0.205 | | | |
| L3 | 5* | 4.472 | 0.260 | 1.6707 | 19.2 | f3 = −100.712 |
| | 6* | 4.097 | 0.434 | | | |
| L4 | 7* | 34.457 | 0.318 | 1.5443 | 65.9 | f4 = −100.348 |
| | 8* | 21.059 | 0.078 | | | |
| L5 | 9* | 105.646 | 0.441 | 1.5443 | 55.9 | f5 = −100.393 |
| | 10* | 35.962 | 0.246 | | | |
| L6 | 11* | 21.491 | 0.464 | 1.5443 | 65.9 | f6 = 10.004 |
| | 12* | −7.238 | 0.165 | | | |
| L7 | 13* | −3.133 | 0.255 | 1.6707 | 19.2 | f7 = 101.380 |
| | 14* | −3.093 | 0.115 | | | |
| L8 | 15* | 5.374 | 0.390 | 1.5443 | 55.9 | f8 = −97.422 |
| | 16* | 4.755 | 0.437 | | | |
| L9 | 17* | 8.773 | 1.182 | 1.5443 | 55.9 | f9 = −7.549 |
| | 18* | 2.665 | 0.250 | | | |
| | 19 | ∞ | 0.210 | 1.5163 | 64.2 | |
| | 20 | ∞ | 0.682 | | | |
| (IM) | | ∞ | | | | | f12 = 6.999 mm
f23 = −11.092 mm
f34 = −50.613 mm
f56 = 11.072 mm
f89 = −7.065 mm
f123 = 7.208 mm
f456 = 12.369 mm
f789 = −7.499 mm
D34 = 0.434 mm
D89 = 0.437 mm
T7 = 0.255 mm
T8 = 0.390 mm
TL = 7.276 mm
Hmax = 4.71 mm
Dep = 3.063 mm

TABLE 16

Aspherical surface data

| i | k | A4 | A6 | A8 | A10 | A12 | A14 | A16 |
|---|---|---|---|---|---|---|---|---|
| 1 | 2.199E−01 | −6.594E−04 | −5.236E−04 | 6.070E−04 | −5.818E−04 | 1.912E−04 | −1.569E−05 | −8.512E−06 |
| 2 | 0.000E+00 | −1.764E−02 | 2.219E−02 | −1.439E−02 | 4.917E−03 | −7.478E−04 | −3.740E−05 | −1.655E−05 |
| 3 | −1.676E+01 | −2.280E−02 | 2.374E−02 | −1.333E−02 | 4.912E−03 | −9.700E−04 | 1.710E−04 | −1.740E−05 |
| 4 | −1.216E+01 | 2.219E−02 | −1.436E−02 | 1.134E−02 | −5.460E−03 | 2.152E−03 | −3.931E−04 | 1.093E−04 |
| 5 | 0.000E+00 | −6.314E−03 | −2.763E−03 | 6.240E−04 | 4.140E−04 | 1.266E−04 | 9.873E−05 | −3.070E−05 |
| 6 | 0.000E+00 | −5.480E−03 | 5.762E−04 | 8.163E−04 | 4.009E−04 | 1.928E−04 | 4.389E−05 | −3.359E−05 |
| 7 | 0.000E+00 | −2.064E−02 | −1.059E−02 | 4.035E−04 | −2.178E−04 | 3.446E−04 | 1.113E−04 | −2.203E−05 |
| 8 | 0.000E+00 | −9.944E−03 | −1.153E−02 | −1.029E−03 | 3.535E−04 | 2.212E−04 | 8.862E−05 | −7.387E−05 |
| 9 | 0.000E+00 | −1.647E−02 | −2.572E−03 | 1.548E−03 | 8.802E−05 | 4.459E−05 | −3.966E−06 | −2.965E−05 |
| 10 | 0.000E+00 | −4.498E−02 | −2.952E−04 | 1.303E−03 | 4.486E−04 | 3.926E−05 | −4.778E−06 | −1.070E−06 |
| 11 | 0.000E+00 | −4.431E−02 | −8.291E−04 | −2.111E−03 | 7.704E−05 | 3.107E−04 | 3.334E−05 | −1.973E−05 |
| 12 | 0.000E+00 | −5.006E−02 | 1.098E−02 | −2.395E−03 | −1.320E−03 | 1.132E−03 | −2.659E−04 | 2.170E−05 |
| 13 | 6.969E−01 | −1.122E−02 | 2.100E−02 | −1.214E−02 | 4.163E−03 | −6.811E−04 | 2.917E−05 | 2.409E−06 |
| 14 | −2.539E+00 | −1.543E−02 | 1.586E−02 | −8.556E−03 | 2.352E−03 | −3.046E−04 | 1.704E−05 | −4.367E−07 |
| 15 | 0.000E+00 | −2.121E−02 | −5.220E−04 | −1.062E−03 | 3.020E−04 | −5.896E−05 | 5.530E−06 | −2.842E−07 |
| 16 | 0.000E+00 | −1.646E−02 | −1.196E−04 | −5.224E−04 | 1.097E−04 | −8.360E−06 | −3.357E−08 | 2.621E−08 |
| 17 | 0.000E+00 | −7.153E−02 | 1.515E−02 | −1.782E−03 | 1.450E−04 | −8.440E−06 | 3.144E−07 | −6.499E−09 |
| 18 | −3.150E+00 | −4.781E−02 | 1.153E−02 | −2.080E−03 | 2.372E−04 | −1.594E−05 | 5.787E−07 | −8.732E−09 |

The values of the respective conditional expressions are as follows:

$f1/f=0.81$ $f2/f1=-2.60$ $f12/f=1.15$ $f3/f2=7.88$ $f23/f=-1.83$ $f34/f=-8.35$ $D34/f=0.07$ $f56/f=1.83$ $R7f/R7r=0.0$ $R8f/R8r=1.13$ $T8/T7=1.53$ $D89/f=0.07$ $f89/f=-1.16$ $R9r/f=0.44$ $f9/f=-1.24$ $TL/f=1.20$ $TL/H\text{ max}=1.55$ $f/\text{Dep}=1.98$ $f6/f=1.65$ Accordingly, the imaging lens of Numerical Data Example 8 satisfies the above-described conditional expressions.

Figure 23:
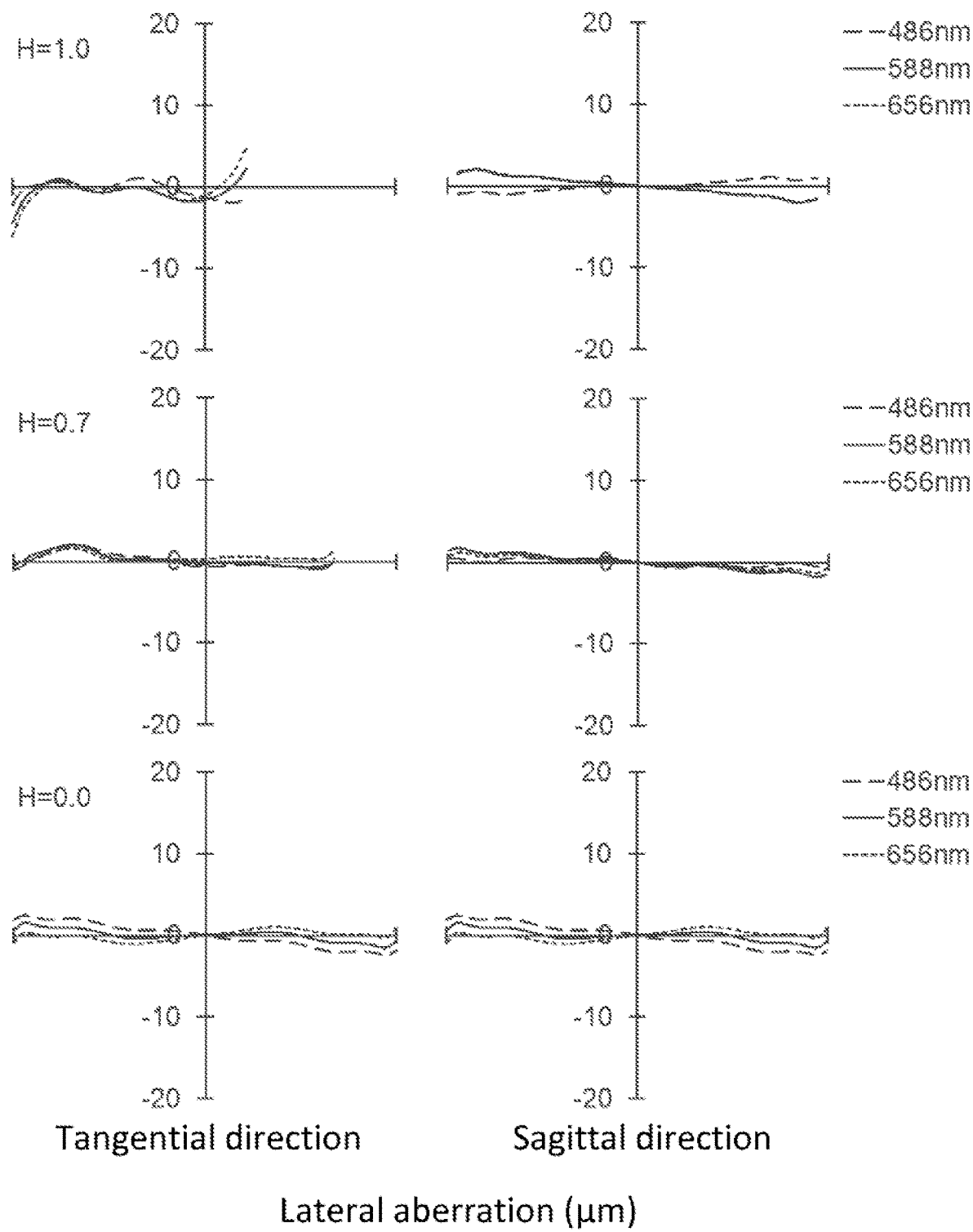
FIG. 23 is an aberration diagram showing a lateral aberration of the imaging lens of FIG. 22.
Figure 24:
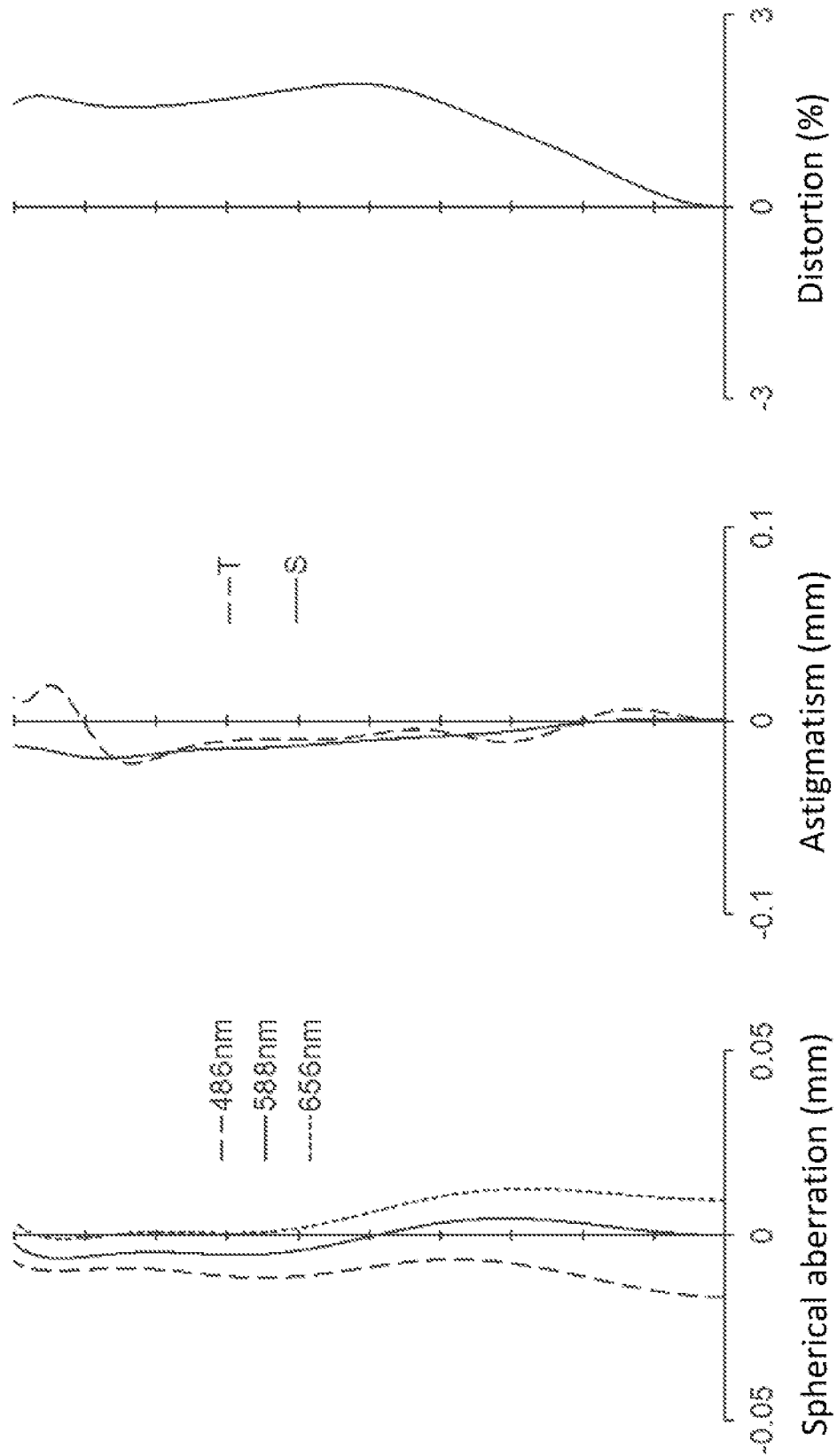
FIG. 24 is an aberration diagram showing a spherical aberration, astigmatism, and a distortion of the imaging lens of FIG. 22.
Figure 25:
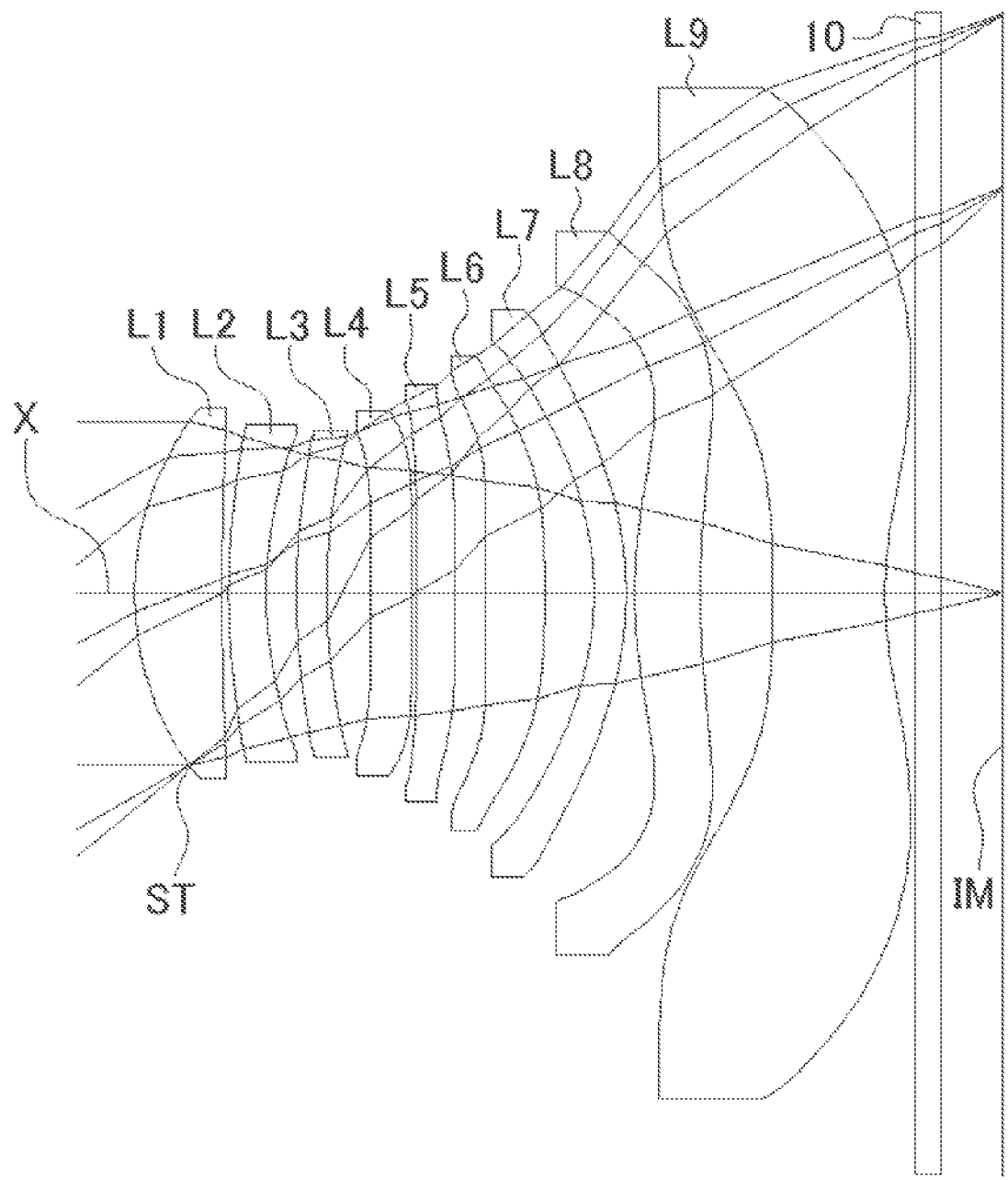
FIG. 25 is a sectional view of a schematic configuration of an imaging lens in Numerical Data Example 9 of the present invention.

FIG. 23 shows a lateral aberration that corresponds to an image height H and FIG. 24 shows a spherical aberration (mm), astigmatism (mm) and a distortion (%), respectively.

As shown in FIGS. 23 and 24, according to the imaging lens of Numerical Data Example 8, the aberrations can be also satisfactorily corrected.

Numerical Data Example 9

Basic Lens Data

TABLE 17 f = 5.80 mm Fno = 2.0 ω = 39.1°

| | i | r | d | nd | vd | [mm] |
|---|---|---|---|---|---|---|
| | | ∞ | ∞ | | | |
| L1 | 1*(ST) | 2.505 | 0.720 | 1.5443 | 55.9 | f1 = 5.121 |
| | 2* | 22.216 | 0.054 | | | |
| L2 | 3* | 5.135 | 0.312 | 1.6707 | 19.2 | f2 = −13.973 |
| | 4* | 3.236 | 0.250 | | | |
| L3 | 5* | 5.725 | 0.250 | 1.6707 | 19.2 | f3 = −100.809 |
| | 6* | 5.186 | 0.364 | | | |
| L4 | 7* | 146.071 | 0.331 | 1.5443 | 55.9 | f4 = −100.334 |
| | 8* | 39.719 | 0.040 | | | |
| L5 | 9* | 44.257 | 0.319 | 1.5443 | 55.9 | f5 = −100.331 |
| | 10* | 24.364 | 0.250 | | | |
| L6 | 11* | 12.345 | 0.497 | 1.5443 | 55.9 | f6 = 10.625 |
| | 12* | −10.726 | 0.403 | | | |
| L7 | 13* | −2.836 | 0.266 | 1.6707 | 19.2 | f7 = −102.330 |
| | 14* | −3.069 | 0.071 | | | |
| L8 | 15* | 4.001 | 0.543 | 1.5443 | 55.9 | f8 = 14.678 |
| | 16* | 7.632 | 0.591 | | | |
| L9 | 17* | −249.837 | 0.931 | 1.5443 | 55.9 | f9 = −5.075 |
| | 18* | 2.797 | 0.250 | | | |
| | 19 | ∞ | 0.210 | 1.5163 | 64.2 | |
| | 20 | ∞ | 0.509 | | | |
| (IM) | | ∞ | | | | | f12 = 7.180 mm
f23 = −12.076 mm
f34 = −50.564 mm
f56 = 11.861 mm
f89 = −9.656 mm
f123 = 7.458 mm
f456 = 13.359 mm
f789 = −8.294 mm
D34 = 0.364 mm
D89 = 0.591 mm
T7 = 0.266 mm
T8 = 0.543 mm
TL = 7.088 mm
Hmax = 4.71 mm
Dep = 2.842 mm

TABLE 18

Aspherical surface data

| i | k | A4 | A6 | A8 | A10 | A12 | A14 | A16 |
|---|---|---|---|---|---|---|---|---|
| 1 | 2.656E−01 | 1.680E−04 | −3.047E−04 | 6.071E−04 | −5.513E−04 | 2.113E−04 | −1.317E−05 | −1.272E−05 |
| 2 | 0.000E+00 | −1.726E−02 | 2.253E−02 | −1.426E−02 | 4.923E−03 | −7.589E−04 | −4.252E−05 | 1.983E−05 |
| 3 | −1.721E+01 | −2.211E−02 | 2.380E−02 | −1.354E−02 | 4.884E−03 | −9.605E−04 | 1.707E−04 | −1.256E−05 |
| 4 | −1.217E+01 | 2.063E−02 | −1.413E−02 | 1.174E−02 | −5.642E−03 | 1.975E−03 | −4.017E−04 | 1.738E−04 |
| 5 | 0.000E+00 | −6.090E−03 | −2.246E−04 | 2.805E−04 | 2.612E−04 | 9.861E−05 | 9.423E−05 | −5.508E−06 |
| 6 | 0.000E+00 | −3.324E−03 | −2.065E−04 | 5.026E−04 | 2.871E−04 | 1.364E−04 | 2.911E−05 | −2.275E−05 |
| 7 | 0.000E+00 | −2.177E−02 | −1.027E−02 | 5.058E−05 | −4.391E−04 | 2.809E−04 | 1.129E−04 | −1.239E−05 |
| 8 | 0.000E+00 | −8.089E−03 | −1.229E−02 | −1.510E−03 | 2.227E−04 | 1.992E−04 | 8.598E−05 | −7.040E−05 |
| 9 | 0.000E+00 | −1.623E−02 | −2.694E−03 | 1.545E−03 | 7.326E−05 | 4.479E−05 | 1.752E−06 | −2.479E−05 |
| 10 | 0.000E+00 | −4.539E−02 | 1.045E−04 | 1.448E−03 | 4.620E−04 | 4.553E−05 | −4.153E−05 | 3.148E−05 |
| 11 | 0.000E+00 | −4.219E−02 | −2.686E−04 | −2.474E−03 | 1.914E−05 | 3.196E−04 | 4.093E−05 | −1.716E−05 |
| 12 | 0.000E+00 | −5.265E−02 | 1.040E−02 | −2.135E−03 | −1.281E−03 | 1.131E−03 | −2.676E−04 | 2.132E−05 |
| 13 | 6.147E−01 | −1.030E−02 | 2.153E−02 | −1.218E−02 | 4.166E−03 | −6.784E−04 | 2.958E−05 | 2.364E−06 |
| 14 | −3.296E+00 | −1.799E−02 | 1.544E−02 | −8.541E−03 | 2.352E−03 | −3.048E−04 | 1.708E−06 | −4.103E−07 |
| 15 | 0.000E+00 | −2.160E−02 | 7.676E−05 | −1.244E−03 | 3.266E−04 | −5.471E−05 | 6.539E−06 | −2.502E−07 |
| 16 | 0.000E+00 | −6.717E−03 | −9.389E−04 | −5.273E−04 | 1.135E−04 | −8.025E−06 | −2.979E−08 | 2.344E−08 |
| 17 | 0.000E+00 | −6.915E−02 | 1.525E−02 | −1.782E−03 | 1.447E−04 | −8.462E−06 | 3.138E−07 | −6.398E−09 |
| 18 | −4.435E+00 | −4.473E−02 | 1.153E−02 | −2.092E−03 | 2.370E−04 | −1.595E−05 | 5.790E−07 | −8.704E−09 |

The values of the respective conditional expressions are as follows:

$f1/f = 0.88$ $f2/f1 = -2.73$ $f12/f = 1.24$ $f3/f2 = 7.21$ $f23/f = -2.08$ $f34/f = -8.72$ $D34/f = 0.06$ $f56/f = 2.05$ $R7f/R7r = 0.92$ $R8f/R8r = 0.52$ $T8/T7 = 2.04$ $D89/f = 0.10$ $f89/f = -1.67$ $R9r/f = 0.48$ $f9/f = -0.88$ $TL/f = 1.22$ $TL/H\ max = 1.51$ $f/Dep = 2.04$ $f6/f = 1.83$ Accordingly, the imaging lens of Numerical Data Example 9 satisfies the above-described conditional expressions.

Figure 26:
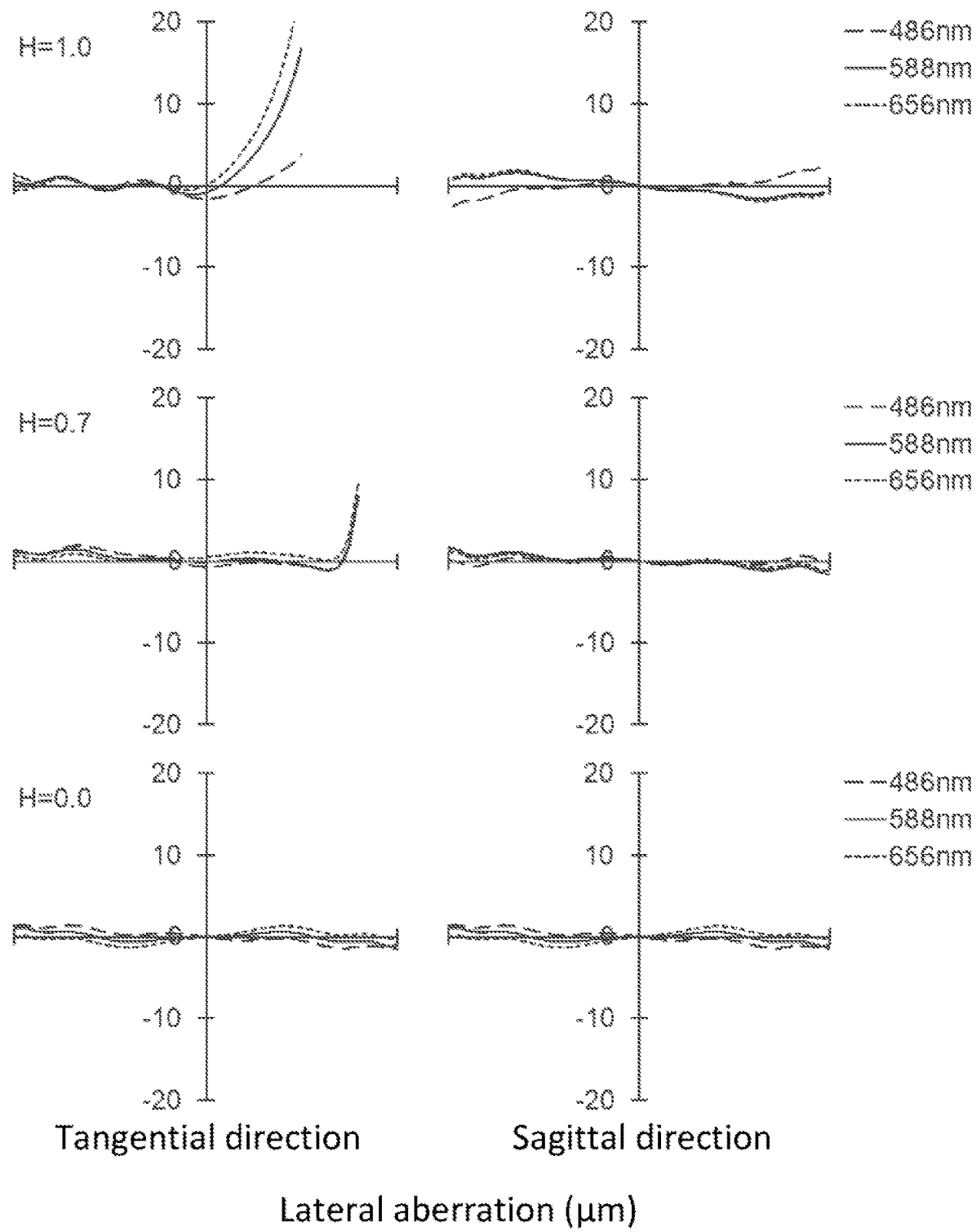
FIG. 26 is an aberration diagram showing a lateral aberration of the imaging lens of FIG. 25.
Figure 27:
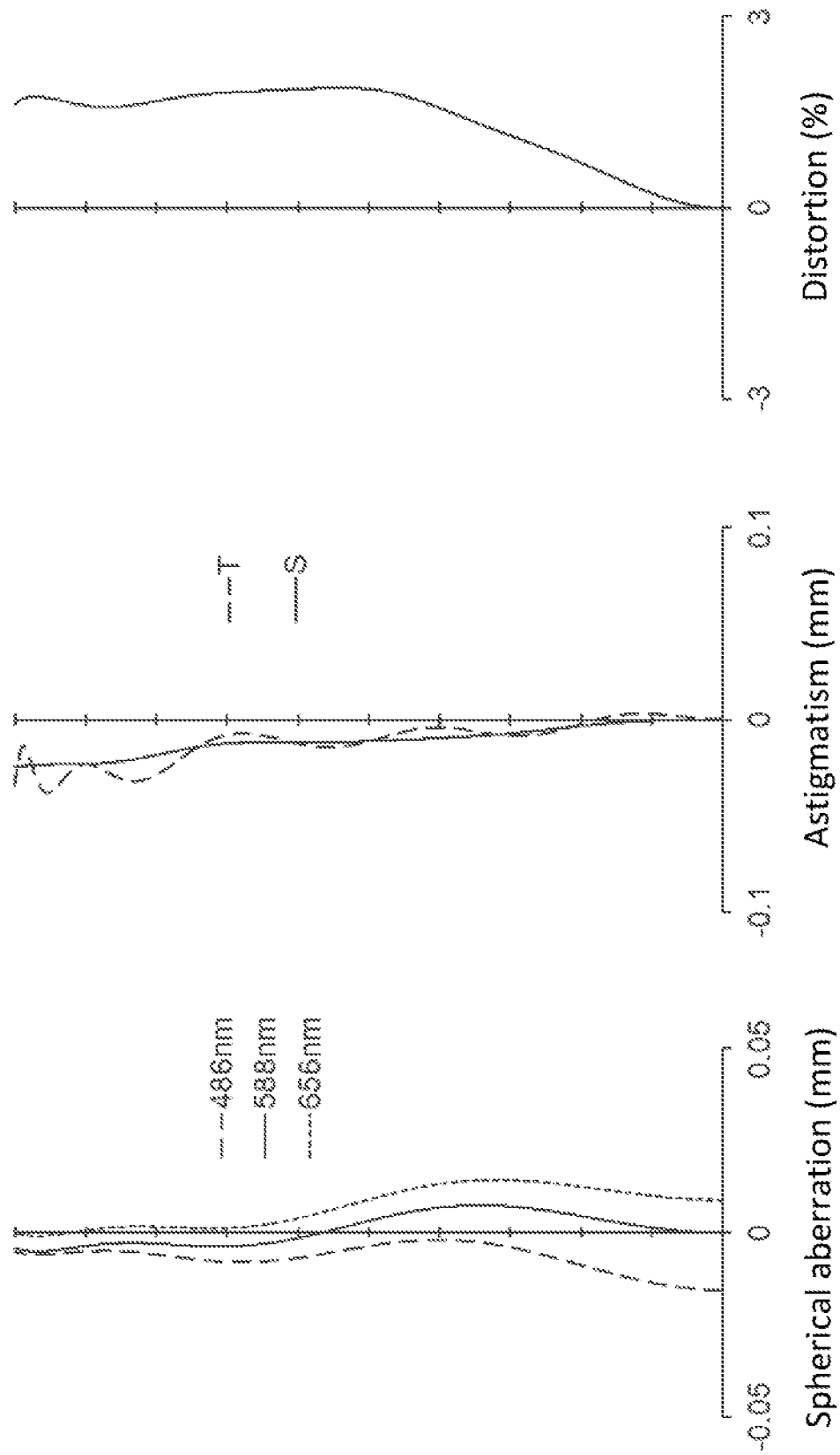
FIG. 27 is an aberration diagram showing a spherical aberration, astigmatism, and a distortion of the imaging lens of FIG. 25.
Figure 28:
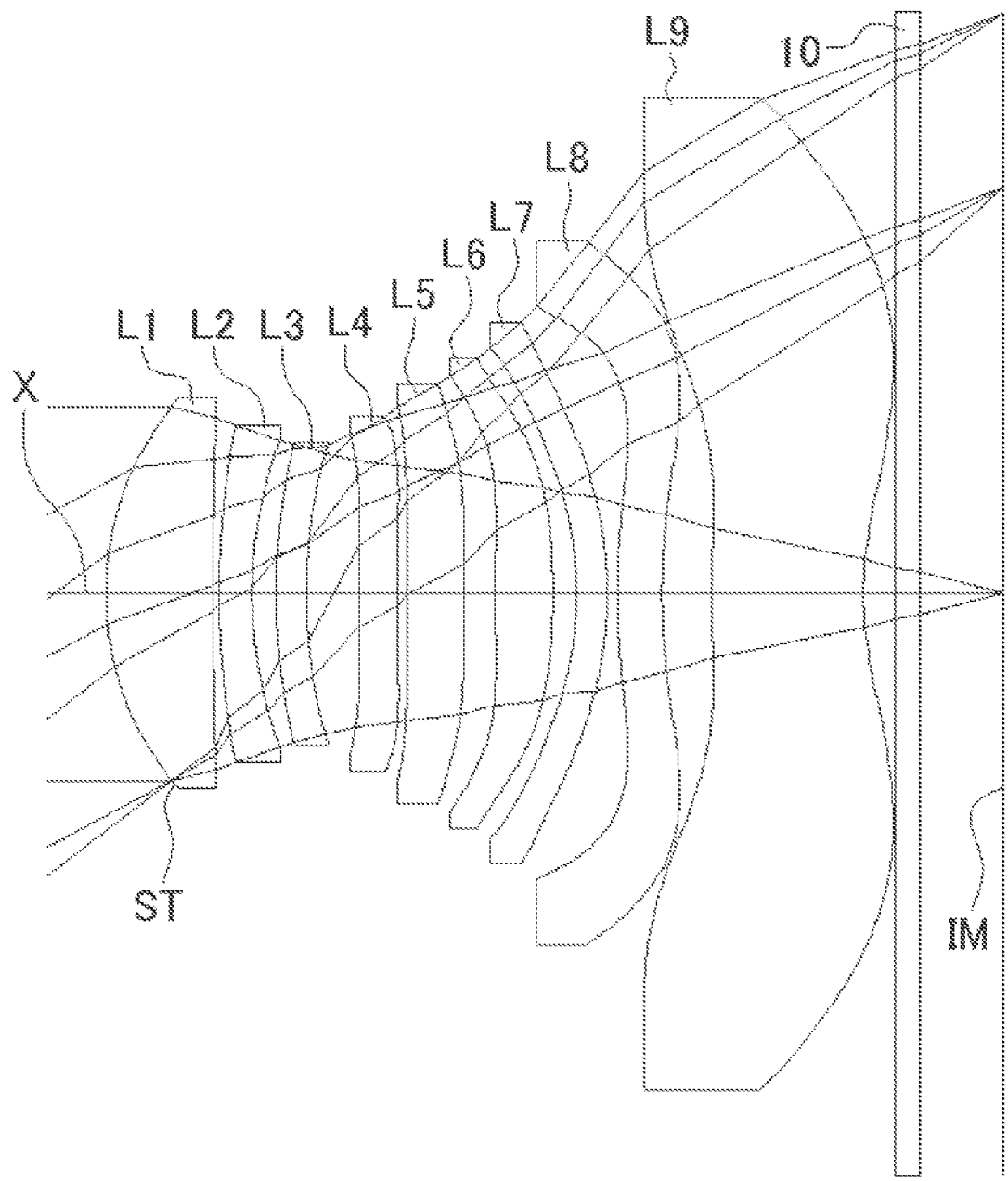
FIG. 28 is a sectional view of a schematic configuration of an imaging lens in Numerical Data Example 10 of the present invention.

FIG. 26 shows a lateral aberration that corresponds to an image height H and FIG. 27 shows a spherical aberration (mm), astigmatism (mm), and a distortion (%), respectively.

As shown in FIGS. 26 and 27, according to the imaging lens of Numerical Data Example 9, the aberrations can be also satisfactorily corrected.

Numerical Data Example 10

Basic Lens Data

TABLE 19 f = 6.11 mm Fno = 2.0 ω = 37.6°

| | i | r | d | nd | vd | [mm] |
|---|---|---|---|---|---|---|
| | | ∞ | ∞ | | | |
| L1 | 1*(ST) | 2.463 | 0.882 | 1.5443 | 55.9 | f1 = 4.905 |
| | 2* | 27.709 | 0.049 | | | |
| L2 | 3* | 5.548 | 0.272 | 1.6707 | 19.2 | f2 = −12.934 |
| | 4* | 3.322 | 0.195 | | | |
| L3 | 5* | 4.744 | 0.252 | 1.6707 | 19.2 | f3 = −91.45 |
| | 6* | 4.306 | 0.430 | | | |
| L4 | 7* | 25.133 | 0.317 | 1.5443 | 65.9 | f4 = −100.374 |
| | 8* | 17.138 | 0.083 | | | |
| L5 | 9* | 91.364 | 0.464 | 1.5443 | 55.9 | f5 = −100.672 |
| | 10* | 34.191 | 0.258 | | | |
| L6 | 11* | 16.195 | 0.474 | 1.5443 | 55.9 | f6 = 9.049 |
| | 12* | −7.005 | 0.195 | | | |
| L7 | 13* | −3.014 | 0.253 | 1.6707 | 19.2 | f7 = −100.624 |
| | 14* | −3.251 | 0.082 | | | |
| L8 | 15* | 5.500 | 0.365 | 1.5443 | 55.9 | f8 = −100.153 |
| | 16* | 4.879 | 0.411 | | | |
| L9 | 17* | 7.880 | 1.249 | 1.5443 | 55.9 | f9 = −8.049 |
| | 18* | 2.658 | 0.260 | | | |
| | 19 | ∞ | 0.210 | 1.5168 | 64.2 | |
| | 20 | ∞ | 0.677 | | | |
| (IM) | | ∞ | | | | | f12 = 6.942 mm
f23 = −11.142 mm
f34 = −47.984 mm
f56 = 9.911 mm
f89 = −7.492 mm
f123 = 7.204 mm
f456 = 10.944 mm
D34 = 0.430 mm
D89 = 0.411 mm
T7 = 0.253 mm
T8 = 0.365 mm
TL = 7.309 mm
Hmax = 4.71 mm
Dep = 3.084 mm

TABLE 20

| Aspherical surface data | | | | | | | | |
|---|---|---|---|---|---|---|---|---|
| i | k | A4 | A6 | A8 | A10 | A12 | A14 | A16 |
| 1 | 2.215E−01 | −5.797E−04 | −5.454E−04 | 5.973E−04 | −5.808E−04 | 1.924E−04 | −1.583E−05 | −8.913E−05 |
| 2 | 0.000E+00 | −1.774E−02 | 2.216E−02 | −1.430E−02 | 4.918E−03 | −7.476E−04 | −3.766E−05 | 1.690E−05 |
| 3 | −1.603E+01 | −2.275E−02 | 2.369E−02 | 1.338E−02 | 4.915E−03 | −9.543E−04 | 1.778E−04 | −2.006E−05 |
| 4 | −1.201E+01 | 2.216E−02 | −1.436E−02 | 1.136E−02 | −5.407E−03 | 2.151E−03 | −3.818E−04 | 1.254E−04 |
| 5 | 0.000E+00 | −5.857E−03 | −2.603E−03 | 6.406E−04 | 4.342E−04 | 1.459E−04 | 1.105E−04 | −2.291E−05 |
| 6 | 0.000E+00 | −5.419E−03 | 7.105E−04 | 9.089E−04 | 4.102E−04 | 1.765E−04 | 3.426E−05 | −3.141E−05 |
| 7 | 0.000E+00 | −1.911E−02 | −1.075E−02 | 2.839E−04 | −2.529E−04 | 3.276E−04 | 1.037E−04 | −2.675E−05 |
| 8 | 0.000E+00 | −9.847E−03 | −1.155E−02 | −1.139E−03 | 3.088E−04 | 2.113E−04 | 8.781E−05 | −7.315E−05 |
| 9 | 0.000E+00 | −1.610E−02 | −2.563E−03 | 1.590E−03 | 1.025E−04 | 4.575E−05 | −5.285E−05 | −3.078E−05 |
| 10 | 0.000E+00 | −4.389E−02 | −9.404E−05 | 1.351E−03 | 4.505E−04 | 3.867E−05 | −4.754E−05 | −6.514E−07 |
| 11 | 0.000E+00 | −4.553E−02 | −1.065E−03 | −2.180E−03 | 7.176E−05 | 3.130E−04 | 3.497E−05 | −1.927E−05 |
| 12 | 0.000E+00 | −4.980E−02 | 1.102E−02 | −2.378E−03 | −1.322E−03 | 1.131E−03 | −2.660E−04 | 2.181E−05 |
| 13 | 6.866E−01 | −9.569E−03 | 2.110E−02 | −1.215E−02 | 4.165E−03 | −5.808E−04 | 2.940E−05 | 2.275E−06 |
| 14 | −2.009E+00 | −1.631E−02 | 1.586E−02 | −8.543E−03 | 2.352E−03 | −3.047E−04 | 1.698E−05 | −4.507E−07 |
| 15 | 0.000E+00 | −2.322E−02 | −1.611E−04 | −1.070E−03 | 3.023E−04 | −5.917E−05 | 5.569E−05 | −2.210E−07 |
| 16 | 0.000E+00 | −1.583E−02 | −2.333E−04 | −5.125E−04 | 1.111E−04 | −8.303E−05 | −3.632E−08 | 2.514E−08 |
| 17 | 0.000E+00 | −7.197E−02 | 1.515E−02 | −1.782E−03 | 1.451E−04 | −8.439E−05 | 3.143E−07 | −5.534E−09 |
| 18 | −2.810E+00 | −4.789E−02 | 1.154E−02 | −2.086E−03 | 2.372E−04 | −1.594E−05 | 5.787E−07 | −8.735E−09 |

The values of the respective conditional expressions are as follows:

$f1/f=0.80$ $f2/f1=-2.65$ $f12/f=1.14$ $f3/f2=7.02$ $f23/f=-1.82$ $f34/f=-7.86$ $D34/f=0.07$ $f56/f=1.62$ $R7f/R7r=0.92$ $R8f/R8r=1.13$ $T8/T7=1.45$ $D89/f=0.07$ $f89/f=-1.23$ $R9r/f=0.44$ $f9/f=-1.32$ $TL/f=1.20$ $TL/H\,max=1.55$ $f/\text{Dep}=1.98$ $f6/f=1.48$ Accordingly, the imaging lens of Numerical Data Example 10 satisfies the above-described conditional expressions.

Figure 29:
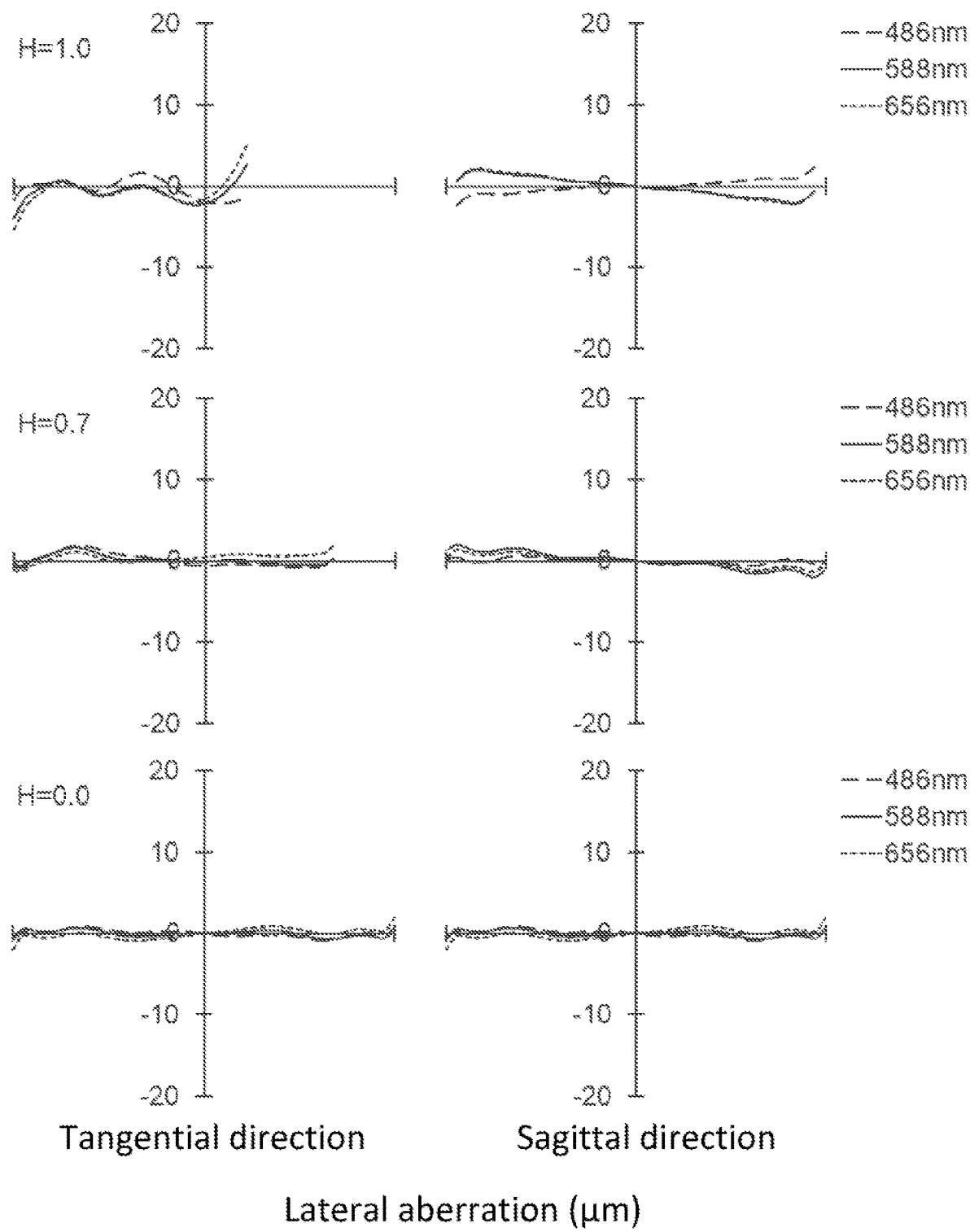
FIG. 29 is an aberration diagram showing a lateral aberration of the imaging lens of FIG. 28.
Figure 30:
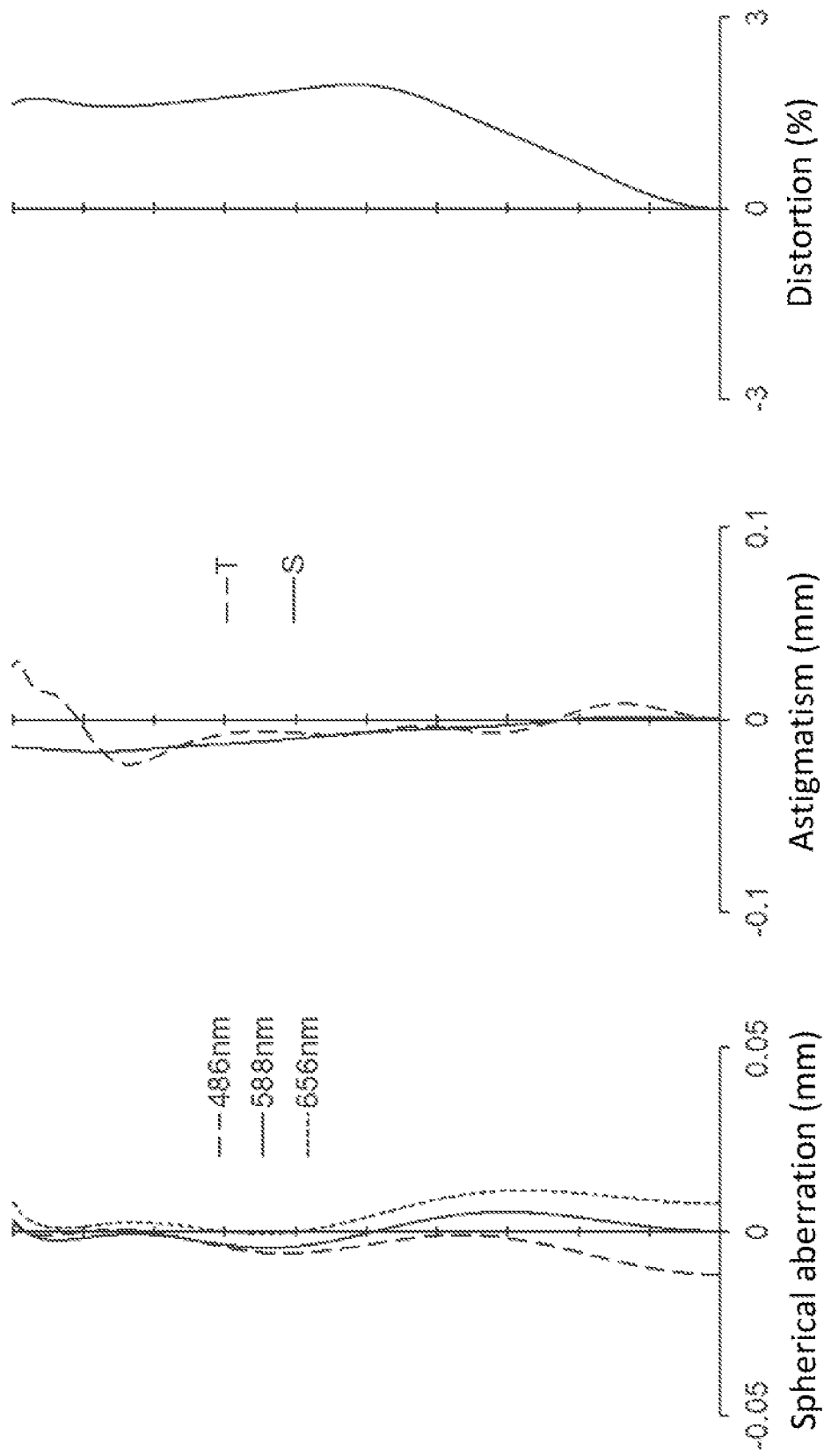
FIG. 30 is an aberration diagram showing a spherical aberration, astigmatism, and a distortion of the imaging lens of FIG. 28.

FIG. 29 shows a lateral aberration that corresponds to an image height H and FIG. 30 shows a spherical aberration (mm), astigmatism (mm), and a distortion (Q), respectively. As shown in FIGS. 29 and 30, according to the imaging lens of Numerical Data Example 10, the aberrations can be also satisfactorily corrected.

According to the embodiment of the invention, the imaging lenses have very wide angles of view (2ω) of 65° or greater. More specifically, the imaging lenses of Numerical Data Examples 1 through 10 have angles of view (2ω) of 75.2° to 79.1°. According to the imaging lens of the embodiment, it is possible to take an image over a wider range than that taken by a conventional imaging lens.

In recent years, with advancement in digital-zoom technology to enlarge any range of an image obtained through an imaging lens, an imaging element with a higher pixel count has been often applied in combination with an imaging lens of higher resolution. In case of an imaging element with a high pixel count, a light-receiving area per pixel often decreases, so that an image tends to be dark. According to the imaging lenses of Numerical Data Examples 1 through 10, the Fnos are as small as 2.0. According to the imaging lenses of the embodiment, it is achievable to take a sufficiently bright image even with the above-described imaging element with a higher pixel count.

Accordingly, when the imaging lens of the above-described embodiment is applied in an imaging optical system such as cameras built in mobile devices (e.g., cellular phones, smartphones, and mobile information terminals), digital still cameras, security cameras, onboard cameras, and network cameras, it is possible to attain both high performance and downsizing of the cameras.

The present invention is applicable in an imaging lens that is mounted in a relatively small-sized camera, such as cameras built in mobile devices (e.g., cellular phones, smartphones, and mobile information terminals), digital still cameras, security cameras, onboard cameras, and network cameras.

The disclosure of Japanese Patent Application No. 2019-032943, filed on Feb. 26, 2019, is incorporated in the application by reference.

While the present invention has been explained with reference to the specific embodiment of the present invention, the explanation is illustrative and the present invention is limited only by the appended claims.

What is claimed is:

1. An imaging lens comprising:
a first lens having positive refractive power;
a second lens having negative refractive power;
a third lens having negative refractive power;
a fourth lens having negative refractive power;

a fifth lens;
a sixth lens;
a seventh lens;
an eighth lens; and
a ninth lens having negative refractive power, arranged in this order from an object side to an image plane side,
wherein said second lens has a shape of a meniscus lens directing a convex surface thereof to the object side near an optical axis,
said ninth lens is formed in a shape so that a surface thereof on the image plane side has an aspherical shape having an inflection point, and
said imaging lens has a total of nine lenses.

2. The imaging lens according to claim 1, wherein said first lens has a focal length f1 and said second lens has a focal length f2 so that the following conditional expression is satisfied:

$-6 < f2/f1 < -1.$

3. The imaging lens according to claim 1, wherein said second lens has a focal length f2 and said third lens has a focal length f3 so that the following conditional expression is satisfied:

$4 < f3/f2 < 12.$

4. The imaging lens according to claim 1, wherein said ninth lens is formed in a shape so that a surface thereof on the image plane side has a paraxial curvature radius R9r so that the following conditional expression is satisfied:

$0.2 < R9r/f < 0.8,$ where f is a focal length of a whole lens system.

5. The imaging lens according to claim 1, wherein said ninth lens has a focal length f9 so that the following conditional expression is satisfied:

$-3.5 < f9/f < -0.2,$ where f is a focal length of a whole lens system.

* * * * *